United States Patent [19]
Gudmundson et al.

[11] Patent Number: 5,680,619
[45] Date of Patent: Oct. 21, 1997

[54] HIERARCHICAL ENCAPSULATION OF INSTANTIATED OBJECTS IN A MULTIMEDIA AUTHORING SYSTEM

[75] Inventors: Norman K. Gudmundson, San Mateo; R. Hamish Forsythe, Palo Alto; Wayne A. Lee, San Mateo, all of Calif.

[73] Assignee: mFactory, Inc., Burlingame, Calif.

[21] Appl. No.: 415,848

[22] Filed: Apr. 3, 1995

[51] Int. Cl.$^6$ ................................................... G06F 9/40
[52] U.S. Cl. ................................................... 395/701
[58] Field of Search ............................... 395/650, 700, 395/701

[56] References Cited

U.S. PATENT DOCUMENTS

| | | | |
|---|---|---|---|
| 5,287,447 | 2/1994 | Miller et al. | 395/157 |
| 5,423,041 | 6/1995 | Burke et al. | 395/700 |
| 5,493,680 | 2/1996 | Danforth | 395/700 |
| 5,499,333 | 3/1996 | Doudnikoff et al. | 395/600 |
| 5,499,371 | 3/1996 | Henninger et al. | 395/700 |

OTHER PUBLICATIONS

Booch, "Elements of the Object Model", Object Oriented Analysis and Design with Applications, 2nd Ed. 1994, pp. 40–77.

*Primary Examiner*—Kevin A. Kriess
*Assistant Examiner*—John I. Chavis
*Attorney, Agent, or Firm*—Daniel R. Siegel; Ariel Reich

[57] ABSTRACT

An application development system, optimized for authoring multimedia titles, enables its users to create selectively reusable object containers merely by defining links among instantiated objects. Employing a technique known as Hierarchical Encapsulation, the system automatically isolates the external dependencies of the object containers created by its users, thereby facilitating reusability of object containers and the objects they contain in other container environments. Authors create two basic types of objects: Elements, which are the key actors within an application, and Modifiers, which modify an Element's characteristics. The object containers (Elements and Behaviors—i.e., Modifier containers) created by authors spawn hierarchies of objects, including the Structural Hierarchy of Elements within Elements, and the Behavioral Hierarchy, within an Element, of Behaviors (and other Modifiers) within Behaviors. The system utilizes an Element's dual hierarchies to make that Element an environmental frame of reference to the objects it contains. Through techniques known as Hierarchical Message Broadcasting, Hierarchical Variable Scoping and Hierarchical Relative Positioning, objects automatically receive messages sent to their object container and access data known to their object container. An Element's position is even determined relative to the position of its parent Element container. The system is highly extensible through a Component API in which Modifiers and Services that support them can be added and integrated seamlessly into the system. The system's architecture is substantially platform-independent, automatically allowing most author's titles to run on multiple platforms. In addition, the entire authoring environment can be ported relatively easily to a variety of platforms due to the isolation a platform-dependent layer within the system.

48 Claims, 46 Drawing Sheets

| | | |
|---|---|---|
| Window X + MinMax | | 2200 |
| Name | | 2201 |
| BoundingRect_TopLeft | | 2202 |
| BoundingRect_BottomRight | | 2203 |
| Graphic Modifier | | 2204 |
| Image Effect Modifier | | 2205 |
| CREATE Window | | 2206 |
| MinMaxResponse | | 2207 |
| Max Response | | 2208 |
| Min Response | | 2209 |
| TitleBar | | 2220 |
| Text Style Modifier | | 2221 |
| Graphic Modifier | | 2222 |
| TitleRect_TopLeft | | 2223 |
| TitleRect_BottomRight | | 2224 |
| CREATE TitleBar | | 2225 |
| MinMaxResponse | | 2226 |
| MinBox | | 2240 |
| Image Effect Modifier | | 2241 |
| Graphic Modifier | | 2242 |
| MinFlag | | 2243 |
| BoxRect_TopLeft | | 2244 |
| BoxRect_BottomRight | | 2245 |
| MinICONDimensions | | 2246 |
| CREATE MinBox | | 2247 |
| MinMaxBehavior | | 2248 |
| DetectMinBoxSelect | | 2249 |
| MinMax Response | | 2250 |

FIG. 35(b)

| | | Window X +MinMax + Drag | 2300 |
|---|---|---|---|
| | | Name | 2301 |
| | | BoundingRect_TopLeft | 2302 |
| | | BoundingRect_BottomRight | 2303 |
| | | Graphic Modifier | 2304 |
| | | Image Effect Modifier | 2305 |
| | | CREATE Window | 2306 |
| ▷ | | MinMaxResponse | 2307 |
| ▽ | | Window DRAG Behavior | 2308 |
| | | Follow Mouse | 2309 |
| ▽ | | TitleBar | 2320 |
| | | Text Style Modifier | 2321 |
| | | Graphic Modifier | 2322 |
| | | TitleRect_TopLeft | 2323 |
| | | TitleRect_BottomRight | 2324 |
| | | CREATE TitleBar | 2325 |
| ▷ | | MinMaxResponse | 2326 |
| ▽ | | TitleBar DRAG Behavior | 2327 |
| | | MouseOffset | 2328 |
| | | MouseDown | 2329 |
| | | CalcMouseOffset | 2330 |
| | | TitleBarMouseTracking | 2331 |
| | | MouseUp | 2332 |
| ▷ | | MinBox | 2340 |

FIG. 35(c)

| | | Window X' | 2400 |
|---|---|---|---|
| ▽ | | Name | 2401 |
| | | BoundingRect_TopLeft | 2402 |
| | | BoundingRect_BottomRight | 2403 |
| | | Graphic Modifier | 2404 |
| | | CREATE Window | 2405 |
| ▷ | | TitleBar | 2420 |

FIG. 35(d)

| | | | |
|---|---|---|---|
| ▽ | □ | Window X' + WindowShade | 2500 |
| | abc | Name | 2501 |
| | y⌐x | BoundingRect_TopLeft | 2502 |
| | y⌐x | BoundingRect_BottomRight | 2503 |
| | | Graphic Modifier | 2504 |
| | S | CREATE Window | 2505 |
| ▽ | | WINDOW WinShadeResponse | 2506 |
| | if | ShadeDown Response | 2507 |
| | if | ShadeUp Response | 2508 |
| ▽ | A | TitleBar | 2520 |
| | aA | Text Style Modifier | 2521 |
| | | Graphic Modifier | 2522 |
| | y⌐x | TitleRect_TopLeft | 2523 |
| | y⌐x | TitleRect_BottomRight | 2524 |
| | S | CREATE TitleBar | 2525 |
| ▽ | | WinShadeBehavior | 2526 |
| | T/F | WinShadeFlag | 2527 |
| | | WinShade Sound | 2528 |
| | S | INITFlag | 2529 |
| ▽ | | DetectDoubleClick | 2530 |
| | T/F | ClickFlag | 2531 |
| | S | INITFlag | 2532 |
| | S | MouseUpResponse | 2533 |
| | | Clicktimer | 2534 |
| | S | SingleClick | 2535 |

FIG. 35(e)

| | | Window X + WindowShade + Drag | 2600 |
|---|---|---|---|
| | | Name | 2601 |
| | | BoundingRect_TopLeft | 2602 |
| | | BoundingRect_BottomRight | 2603 |
| | | Graphic Modifier | 2604 |
| | | Image Effect Modifier | 2605 |
| | | CREATE Window | 2606 |
| ▷ | | WINDOW WinShadeResponse | 2607 |
| ▷ | | Window DRAG Behavior | 2608 |
| | | TitleBar | 2620 |
| | | Text Style Modifier | 2621 |
| | | Graphic Modifier | 2622 |
| | | TitleRect_TopLeft | 2623 |
| | | TitleRect_BottomRight | 2624 |
| | | CREATE TitleBar | 2625 |
| ▷ | | WinShadeBehavior | 2626 |
| ▷ | | TitleBar DRAG Behavior | 2627 |

FIG. 35(f)

|  |  |  |
|---|---|---|
| ▽ ▢ | ALL | 2700 |
| Name | 2701 |
| BoundingRect_TopLeft | 2702 |
| BoundingRect_BottomRight | 2703 |
| Graphic Modifier | 2704 |
| Image Effect Modifier | 2705 |
| CREATE Window | 2706 |
| ▷ MinMaxResponse | 2707 |
| ▷ WINDOW WinShadeResponse | 2708 |
| ▷ Window DRAG Behavior | 2709 |
| ▽ TitleBar | 2720 |
| Text Style Modifier | 2721 |
| Graphic Modifier | 2722 |
| TitleRect_TopLeft | 2723 |
| TitleRect_BottomRight | 2734 |
| CREATE TitleBar | 2725 |
| ▷ MinMaxResponse | 2726 |
| ▷ WinShadeBehavior | 2727 |
| ▷ TitleBar DRAG Behavior | 2728 |
| ▽ MinBox | 2740 |
| Image Effect Modifier | 2741 |
| Graphic Modifier | 2742 |
| MinFlag | 2743 |
| BoxRect_TopLeft | 2744 |
| BoxRect_BottomRight | 2745 |
| MinICONDimensions | 2746 |
| CREATE MinBox | 2747 |
| ▷ MinMaxBehavior | 2748 |
| ▷ MINBOX WinShadeResponse | 2749 |

FIG. 35(g)

HIERARCHICAL ENCAPSULATION OF INSTANTIATED OBJECTS IN A MULTIMEDIA AUTHORING SYSTEM

I. BACKGROUND
  A. Field of the Invention
  B. Description of the Related Art
    1. Reusability and the Modular Interface
    2. Encapsulation and the Object Interface
    3. The Need for Selective Reusability of "User Objects"
      a. An OOP Windowing Example
    4. The Lack of Selective Reusability in Multimedia Authoring Systems
II. SUMMARY OF THE INVENTION
III. BRIEF DESCRIPTION OF THE DRAWINGS
IV. DETAILED DESCRIPTION
  A. External Architecture—"Author's-Eye View"
    1. Objects: Elements and Modifiers
    2. Object Containers: Elements and Behaviors
    3. Object Hierarchies: Structural Hierarchy and Behavioral Hierarchy
      a. Types of Elements in the Structural Hierarchy
        (1) Projects
        (2) Sections
        (3) Subsections
        (4) Scenes
        (5) Media Elements
      b. Isolation of External Dependencies of Object Containers
        (1) Hierarchical Message Broadcasting
        (2) Hierarchical Variable Scoping
        (3) Hierarchical Relative Positioning
      c. Selective Reusability through Adoption and Transplantation
    4. Object Authoring Interface
      a. Layout View
      b. Layers View
      c. Structure View
      d. Asset Palette
      e. Library
      f. Alias Palette
      g. Messaging Log
      h. mToon Editor
      i. Modifier Palettes
      j. Drag and Drop
    5. Object Messaging
      a. Categories of Messages
        (1) Author Messages
        (2) Environment Messages
        (3) Commands
      b. Parts of a Message
        (1) Message Name
        (2) Message Destination
        (3) Message Data
        (4) Message Path
    6. Object Configuration
      a. Elements
      b. Modifiers
        (1) Behavior
        (2) Variables
        (3) Capabilities
  B. Core System Architecture
    1. Edit Mode Functionality
      a. Connecting Objects
        (1) Element To Element Connection
        (2) Modifier Connections
        (3) Player and Asset Connections
        (4) Touch-Up Process
      b. Aliasing
    2. Saving Projects and Titles
    3. Runtime Functionality
      a. Message Targeting and Dispatching
      b. Event Loop Processing
  C. Component API—"Programmer's-Eye View"
    1. Object Model
    2. Component Methods
    3. Registration Process
    4. Core and Service Utilities
  D. Examples
    1. Snake
    2. Fish
    3. Windowing System

TABLES

Table I. System Messages And Commands
Table II. Message Destinations
Table III. Message Data Structure
Table IV. Base Component Class Functions
Table V. Sample Instance Data Structure

FIGURES

FIG. 1 Dual Hierarchy
FIG. 2 Layout View With Tool, Object Information And Modifier Palettes
FIG. 3 Layers View
FIG. 4 Structure View
FIG. 5 Asset Palette
FIG. 6 Library
FIG. 7 Alias Palette
FIG. 8 Messaging Log
FIGS. 9(a)–(d) mToon Editor
FIG. 10 Element Configuration Dialog
FIG. 11 Behavior Interface
FIGS. 12(a)–(h) Variable Interfaces
FIGS. 13(a)–(g) Messenger Interfaces
FIGS. 14(a)–(c) Scene-Based Modifier Interfaces
FIG. 15 Scene Change And Return Modifiers
FIGS. 16(a)–(d) Motion Modifier Dialogs
FIGS. 17(a)–(d) Visual Modifier Dialogs
FIGS. 18(a)–(d) Sound Modifier Dialogs
FIG. 19 Style Modifier Dialog
FIG. 20 Cursor Modifier Dialog
FIG. 21 Miniscript Modifier Dialog
FIG. 22 Classification Modifier Dialog
FIG. 23 Set Value Modifier Dialog
FIG. 24 System Architecture
FIG. 25 Object Interconnections
FIG. 26 Service Connections
FIG. 27 Title Storage
FIG. 28 Event Loop Processing
FIG. 29 Interfaces Architecture
FIG. 30 Operation Of Object Model
FIG. 31 Loading Of Components
FIG. 32 Implementation Of A Snake
FIG. 33 Implementation Of Fish FIGS. 34(a)-(g) Selectively Reusable Windows Example FIGS. 35(a)-(g) Implementation Of Windows Example

I. BACKGROUND

A. Field of the Invention

This invention relates to application development systems generally, and in particular to systems for authoring interactive multimedia applications.

B. Description of the Related Art

Since the advent of computers many decades ago, computer scientists have labored to build increasingly powerful computer hardware that is faster and cheaper to build than its predecessors. Today's computers can perform, in one second, many millions of "add," "shift," "load," "store" and other relatively simple functions.

To perform tasks of any significant complexity, however, one must somehow cause computers to perform vast numbers of these simple functions in some sequence. Computer software, in its most basic form, comprises programs or sequences of instructions, each of which directs a computer to perform the function corresponding to that instruction.

Yet, even as computers have become more powerful, developers of computer software continue to struggle to create complex programs without having to "reinvent the wheel" for each task they direct computers to perform. This need for "reusability" permeates virtually every aspect of software development, and is driven ultimately by the end user's desire for "ease of use."

1. Reusability and the Modular Interface.

Although there are many varied approaches to this basic problem of reusability, one technique remains constant—"modular programming," i.e., the "bootstrapping" of multiple simple functions into "modules" of greater and greater complexity that can be reused through higher-level "modular interfaces." Virtually all software relies on modular programming to some extent.

For example, assemblers and compilers enable programmers to bootstrap from the machine language defined by a computer's instruction set to a higher-level, more human-readable language. Similarly, operating systems perform many of the low-level support tasks commonly needed by applications software developers (e.g., file system, memory management, basic GUI routines, etc.), and then provide developers with a library of "reusable" modules.

In essence, all application development systems provide to their users a language, an application programming interface ("API"), or some other form of modular interface designed to facilitate development of general purpose or highly specialized applications. Such modular interfaces provide reusability of the "hidden" functionality which implements that interface.

2. Encapsulation and the Object Interface.

One of the most popular current trends designed to promote the creation of reusable software is in the field of object-oriented programming ("OOP"). There are a variety of OOP languages and application development tools on the market today (e.g., C++ and Kaleida Labs' "ScriptX™"), as well as a number of "pseudo-OOP" tools (e.g., "HyperCard™" from Apple Computer and "Visual Basic™" from Microsoft which borrow some, but not all, of the basic principles of OOP.

OOP systems generally are intended to extend reusability to all portions of a computer program, not just to particular modules. This is accomplished by distributing control of the various tasks performed by a program to individual "objects" with well-defined modular interfaces. These objects typically communicate by directly calling one another's capabilities or "methods."

OOP application development systems generally require their users to define abstract "classes" of objects that define the characteristics of the objects in that class. The actual objects in the user's application are instantiated as needed at "runtime" from this class "template." Such systems also typically include certain built-in reusable class libraries to provide the user with an initial base of functionality.

The instantiated objects that perform the various tasks within the user's application are reusable in large part due to a process known as "encapsulation." Encapsulation involves defining a class of objects with a well-defined external interface, and "hiding" within the objects the code and data necessary to implement that interface. In other words, the implementation of an object's interface is "encapsulated" entirely within the object.

Thus, programmers can reuse objects in various different contexts within their application. All other objects that are aware of this interface can "reuse" this object because its external dependencies are isolated within its modular "object interface."

Programmers also can use a process known as "inheritance" to "specialize" or modularly extend an object's functionality by reusing some or all of that object's characteristics via its interface or class definition—i.e., the public methods and data structures that define the template for instances of that class. For example, programmers may wish to extend the base functionality of an existing class (whether created by the programmer or provided in a reusable class library) by adding a new method to objects in that class, or replacing (i.e., overriding) or supplementing (i.e., overloading) an existing method.

By defining a sub-class of objects that "inherit" the characteristics of the "parent" class, the programmer can reuse (as well as add to, replace or supplement) those inherited characteristics. For example, a "car" or "bus" sub-class might inherit characteristics from a more general "vehicle" class. A car is a "kind of" vehicle, and may inherit, for example, a vehicle's color and speed properties, as well as steering and braking methods.

3. The Need for Selective Reusability of "User Objects".

Despite their facilities for reusability of objects, OOP application development systems remain difficult to use. It is far simpler for application developers to create and configure instantiated objects directly, as opposed to defining abstract classes each time they need to create a slightly different object or to model the relationships or interaction among existing objects.

This problem is exacerbated when an application developer creates and desires to reuse compound or aggregate "user objects"—i.e., a group of objects that are related in the context of a particular application, but do not necessarily share common characteristics. These "user objects," in addition to requiring extensive inter-object communication, often involve "part of" or "container" relationships that occur frequently in any modularly designed application.

Inheritance and encapsulation are well-suited to model "kind of" relationships to further specialize the atomic objects from which an application will be built. All modular systems require certain atomic "building blocks" which are reusable and provide sufficient performance, even if difficult to modify.

To create applications of any significant complexity, however, one must combine these atomic objects into more complex "user objects" that interact with one another. It is this common modular process that illustrates the significant limitations on reusability imposed by traditional OOP systems.

OOP systems allow developers to "reuse" an existing class of objects by: (i) creating a class of objects that inherits from and "specializes" that existing class; (ii) creating a class of objects that encapsulates that existing class within its private (hidden) data structures and methods; or (iii) creating a distinct class of objects that communicates with (i.e., invokes methods of) that existing class of objects.

Yet, in all three cases, the new class of objects is tightly coupled to, and thus highly dependent upon, the existing class of objects. Mere communication among otherwise unrelated objects provides virtually no reusability, and creates many explicit dependencies. Although inheritance and encapsulation provide reusability of objects at various levels of complexity, a class of objects at any given level of complexity remains highly dependent upon the particular characteristics it encapsulates or inherits from its less complex superclasses.

It therefore remains quite difficult, if not impossible, to "selectively reuse" characteristics from (and interaction among) complex "user objects" in new environments. One cannot, for example, easily "mix and match" object characteristics across class libraries and choose "some from column A and some from column B." At any given level of complexity, a developer cannot simply replace undesired characteristics of a complex object from one class library with the more desirable characteristics of another complex object from a different class library. Until such selective reusability is achieved, the ultimate promise of OOP cannot be considered fulfilled.

a. An OOP Windowing Example.

Consider the following example involving simple windowing functionality, a very common application for traditional OOP systems. Imagine two independent developers ("A" and "B") creating windowing systems in a typical OOP development environment.

Developer A might create a "Window" class of window objects with a name ("Window X"), a particular size (specified by a bounding rectangle), a title bar (specified by another bounding rectangle), a color and a beveled border. Its only functionality might be to create, destroy and draw these window objects, via three respective methods.

To enhance the functionality of these window objects in a modular manner, Developer A might create a "Minimize" subclass that inherits from the Window class and adds a "minimize" capability. When a user clicks on the small minimize box in the upper right hand corner of the window, the minimize object transforms the window object into a small icon at the bottom of the screen. When the user clicks on the icon, the window is restored.

This Minimize subclass would require "minimize" and "maximize" methods to perform these functions, as well as a minimize box (specified by a bounding rectange), a minimize flag (indicating the state of the window—i.e., whether it is currently minimized), and data for a minimize icon (pattern, size, position, etc.). In addition, the Minimize subclass would overload the create, destroy and draw methods of the Window class—i.e., to cream, destroy and draw the minimize box and/or icon as well as the window.

Finally, Developer A might add additional "drag" functionality to these window objects, which would enable the user to drag the window by its title bar. This subclass could inherit all data and methods from the Minimize subclass (which itseft inherits from the Window class), and simply add a "drag" method.

Developer B independently might take a similar approach. But, the class of Window objects created by Developer B (named Window X') might not include the beveled border. Moreover, Developer B might add a "window shade" capability that differs slightly from the minimize capability created by Developer A. When the user "double clicks" on the title bar of Window X', the Window might "roll up," showing only the title bar. Developer B might implement this capability by creating a "Window Shade" subclass that inherits from (and overloads the methods of) the Window class, and adds a drag method to implement this "window shade" capability. That subclass might also include a flag to track whether the window currently is "pulled up."

Assume that Developers A and B distribute their respective object classes in class libraries containing the public interface (i.e., the methods and data identified above), but not the private code and data that implements that interface. Selective reusability would allow Developer "C" to reuse all or any modular portion of the functionality created by Developers A and B, without recompiling these classes or obtaining access to any such private code.

It is true that Developer C could reuse the Window class, the Minimize subclass or the Drag subclass, thereby reusing functionality at various levels of abstraction. But, what if Developer C wanted to reuse the window and the drag capability created by Developer A, but integrate the window shade capability of Window X' in lieu of the minimize capability of Window X?

In short, Developer C cannot easily accomplish this task. The problem is that the private data and methods of the Minimize and Drag subclasses are dependent upon the public data and methods of the classes from which they inherit. The code might not even link.

The Drag subclass inherits from, and thus assumes the existence of, the Minimize class. The drag method might, for example, modify the bounding rectangle of a Minimize object to "move" that object (as well as the rest of the window) across the screen as the user drags the window. This dependency effectively prevents Developer C from replacing the Minimize class with the Window Shade class. The drag method would attempt to modify data that no longer exists.

Developer C would be forced to rewrite the Window Shade and Drag classes (potentially a significant amount of code) merely to reuse the Window class. Reusability therefore is substantially impaired by the external (inter-class or inter-object) dependencies of a subclass on its superclass. As noted above, encapsulating these dependencies or invoking other objects' methods within a class' private methods (as opposed to relying on inheritance) creates similar dependencies and perhaps even less reusability.

Any system of reasonable complexity will contain many levels of these external dependencies, making selective reusability of complex "user objects" across class libraries extremely difficult, if not practically impossible. As discussed below, today's application development systems create similar external dependencies that impair selective reusability.

4. The Lack of Selective Reusability in Multimedia Authoring Systems.

Consider, for example, the field of multimedia authoring systems to which an embodiment of the present invention is directed. Although there exist many such systems with almost as many different techniques, these systems all impose significant limitations on the author's ability to selectively reuse complex "user objects" across different environments.

Certain systems, such as Macromedia's Director,™ employ traditional metaphors with which authors are familiar and quite comfortable. Director employs a frame-based metaphor that requires authors to determine precisely which objects will be present in each frame of a sequence. This metaphor is familiar to animators, and frequently is used for constructing sequential animation sequences containing relatively little interactivity.

Constructing highly interactive applications, however, is quite difficult within the confines of a frame-based environment. Even with a scripting language included to provide greater control over the sequence in which characters appear, interactivity frequently is limited to that provided by one or more scripts within a frame.

It is quite difficult to reuse any of the characteristics of a particular object, because the object is highly dependent upon its environment (i.e., the scripts of other objects that "call" it, as well as the confines of the frames in which it appears, relative to other objects). Extensive reliance on scripting to model interactivity makes it difficult to isolate an object's external dependencies within a single script, and virtually impossible to isolate such dependencies across multiple scripts.

Rigorous OOP tools (such as the ScriptX™ language from Kaleida Labs and the more visually oriented Quest™ from Allen Communication) still require significant programming expertise on the part of their users. Despite offering extensive libraries of reusable "high-level" objects, such products remain relatively low-level development tools—i.e., OOP programming languages (or perhaps visual programming languages), as opposed to authoring tools.

As noted above, such tools impair selective reusability by creating external (inter-object) dependencies as a result of inheritance and encapsulation. Visual programming techniques facilitate the author's task of creating complex applications, but still frequently require scripting and/or programming to modify an object's characteristics or to model inter-object communication. The visual interface, at best, masks the programming that controls the user's application beneath the surface. In any event, the external dependencies remain, and reusability is impaired.

Other systems employ "pseudo-OOP" techniques in an attempt to combine the power of reusable objects with the flexibility of customizing the characteristics of particular objects and modeling inter-object communication. Forms-based authoring systems, such as Apple Computer's Hyper-Card™ and Microsoft's Visual Basic™, provide authors with significant freedom to create and configure individual objects using highly visual interfaces. Yet, such systems still rely heavily on scripting to implement an object's functionality, as well as inter-object communication and other forms of interaction.

Though these systems often contain many built-in types of objects, it is extremely difficult to create new object types. An object's unique characteristics therefore are determined by its script. Because objects communicate with one another directly via scripts, these scripts are highly dependent upon one another, and cannot easily be reused in other environments. Moving an object from one environment to another generally requires reading the scripts not only for that object, but for other objects in its former environment.

One category of products (e.g., Apple Computer's Apple Media Tool™) provides a highly visual approach to authoring with virtually no scripting or programming involved. In other words, as opposed to visual programming languages (which, in essence, are merely "easy to use" scripting languages), such products provide true "object-based authoring"—i.e., the author creates and configures actual instantiated objects (or pseudo-objects) with little or no scripting or programming.

One problem with such tools is that they are extremely limited and inflexible. Authors typically cannot create custom events or messages, much less add functionality to an existing object or group objects together in any meaningful way. Moreover, such systems provide no mechanism for modeling modular "container" relationships among objects, and reusing these more complex "user objects" in different container environments.

All of the approaches noted above suffer from a lack of support for the creation of complex "user objects" that can be selectively reused in other environments. An object is only reusable to the extent that its dependencies on its external environment are isolated within (i.e., known to) that object. An object is only selectively reusable to the extent that it is loosely coupled to the objects it contains, thereby permitting authors to modify this relationship.

What is needed is a system that models this "container" relationship among objects in a manner that permits authors to selectively reuse object containers and the objects they contain across different container environments.

II. SUMMARY OF THE INVENTION

The present invention encompasses an application development system that enables its users to create reusable "object containers" merely by defining links among instantiated objects. Employing a technique referred to herein as Hierarchical Encapsulation, the system automatically isolates the external dependencies of the object containers created by its users. This isolation of external dependencies resolves the problems addressed above regarding selective reusability of "user objects," thereby facilitating the development of applications of increasing complexity.

Objects contained within other objects are not "hidden" within or tightly coupled to their object container environments. Rather, they are loosely coupled with those environments, and therefore can more easily be reused in other environments. By virtue of being contained within another object, the contained object automatically is afforded access to its environment. Its object container is, in essence, an "environmental frame of reference" for the objects it contains. For example, unless overridden by the author, objects automatically receive messages sent to their object container. They automatically can access data known to their object container. Their position is even determined relative to their object container.

Moreover, objects are decoupled from their characteristics. By defining two distinct types of objects (one of which modifies the characteristics of the other), and loosely coupling (i.e., temporarily linking) these two types of objects, the system provides a mechanism for authors to modify an object's characteristics merely by deeming one object to be contained within another. Removing that object from its container removes that characteristic. In this manner, authors easily can modify an object's characteristics and reuse it in other environments.

In one embodiment described herein, the system is optimized for the development of interactive multimedia applications or "titles." This multimedia authoring system provides its users ("authors") with a visual authoring interface that requires little, if any, scripting or programming. The system employs a form of object-based authoring in which authors create and configure instantiated objects directly, typically by "dragging and dropping" icons and configuring dialog boxes.

Authors can create two basic types of objects: Elements and Modifiers. Elements represent the actual characters or actors that interact with one another in the author's title. Elements generally can be linked to external media (such as text, sounds, pictures, animations and movies), and possess certain inherent characteristics relating to that media.

Authors can supplement an Element's inherent characteristics by incorporating Modifiers within that Element. These Modifiers provide the Element with properties (known as Variables) that further define what the Element is and capabilities that further determine what the Element does. A special type of Modifier, known as a Behavior, can contain additional Behaviors and other Modifiers, providing the author with a mechanism to create a complex Element "personality."

Both Elements and Behaviors are "object containers"—in this embodiment, object instances that can "contain" (i.e., be linked to) other object instances. Elements can contain Modifiers as well as other Elements; and Behaviors can contain Modifiers, including other Behaviors.

By incorporating Elements within Elements, authors create a Structural Hierarchy of Elements, each Element providing an environmental "frame of reference" for the Elements it contains. These "parent" Elements enable authors to provide structure for their titles and to model relationships among their Elements.

Elements can communicate with one another at a high "Element level," without regard to their child Elements. In one respect, Elements "encapsulate" their child Elements by creating a modular interface through which an Element's child Elements can communicate with objects external to that Element container.

Similarly, by incorporating Behaviors (and other Modifiers) within Behaviors, all inside an Element, authors create a Behavioral Hierarchy within the Element—i.e., the Element's internal "personality." Within the context of an Element "personality," each Behavior provides an environmental "frame of reference" for the Modifiers it contains. These "parent" Behaviors enable authors to model the relationships among the various Behaviors within an Element's overall personality.

Elements, in effect, "inherit" the characteristics provided by their internal Behavioral Hierarchy. Because Elements and Modifiers are distinct, loosely coupled objects, authors can modify an Element's characteristics merely by adding Modifiers to (or removing Modifiers from) an Element.

The system provides for significant reusability of object containers by utilizing the Structural and Behavioral Hierarchies to isolate the external dependencies of Elements and Behaviors. In essence, the system automatically "encapsulates" an author's object containers. Once encapsulated, they can be reused in other "environments." Moreover, by loosely coupling an Element to the Modifiers it contains, the system enables authors to modify their Elements so as to "inherit" and "disinherit" characteristics while maintaining an evolving hierarchical encapsulation vis-a-vis the Element's external environment.

Using a technique known as Adoption, an author can cause an Element to be "adopted" by a new parent Element. Using a similar technique known as Transplantation, an author can "transplant" an Element's Behavior (or its entire "personality") into another Element.

Because Hierarchical Encapsulation is integrated into the Structural and Behavioral Hierarchies determined by the author's object containers, authors obtain the benefits of this technique automatically. Their Elements and Behaviors are thus selectively reusable.

For example, a mechanism known as Hierarchical Message Broadcasting provides a structured messaging system that broadcasts messages from their initial destination down the Structural and Behavioral Hierarchies to all descendant Elements and Modifiers. This mechanism isolates an object container as a centralized abstract destination for all messages intended for "any object within that object container." This mechanism facilitates reusability of object containers in other environments in that an object container's new "parent" Element will provide it with messages automatically.

Another mechanism, known as Hierarchical Variable Scoping, makes a Variable accessible automatically to all descendant objects of the Variable's parent Element or Behavior. This mechanism isolates an object container's dependencies on Variables that are external to that object container, but still within its ancestral "environment." By making such Variables "known" to those objects in the object container that rely on that Variable, the object container can be moved to another environment with a well-defined external interface that "knows" which external Variables are assumed to be present in that environment.

Yet another mechanism, known as Hierarchical Relative Positioning, determines the position of a child Element relative to the position of its parent Element. As a result, the child Element moves with its parent Element automatically. This mechanism isolates an Element's external positional dependencies—i.e., the effects of an Element's environment on the Element's position.

In addition to the "built-in" Elements and Modifiers, the system is quite extensible via a "Component API." This Component API enables programmers to seamlessly integrate new Modifiers (and "Services" that support them) into the system.

Finally, the architecture of the system is substantially platform-independent. Titles can be "played" on multiple platforms. Moreover, the entire authoring environment can be ported to a variety of platforms with relatively little modification due to the isolation of a platform-dependent layer within the system.

III. BRIEF DESCRIPTION OF THE DRAWINGS

FIGS. 9(a)–(d) are screen displays showing the mToon editor windows of the graphical user interface under one embodiment of the invention.

Figure 10:
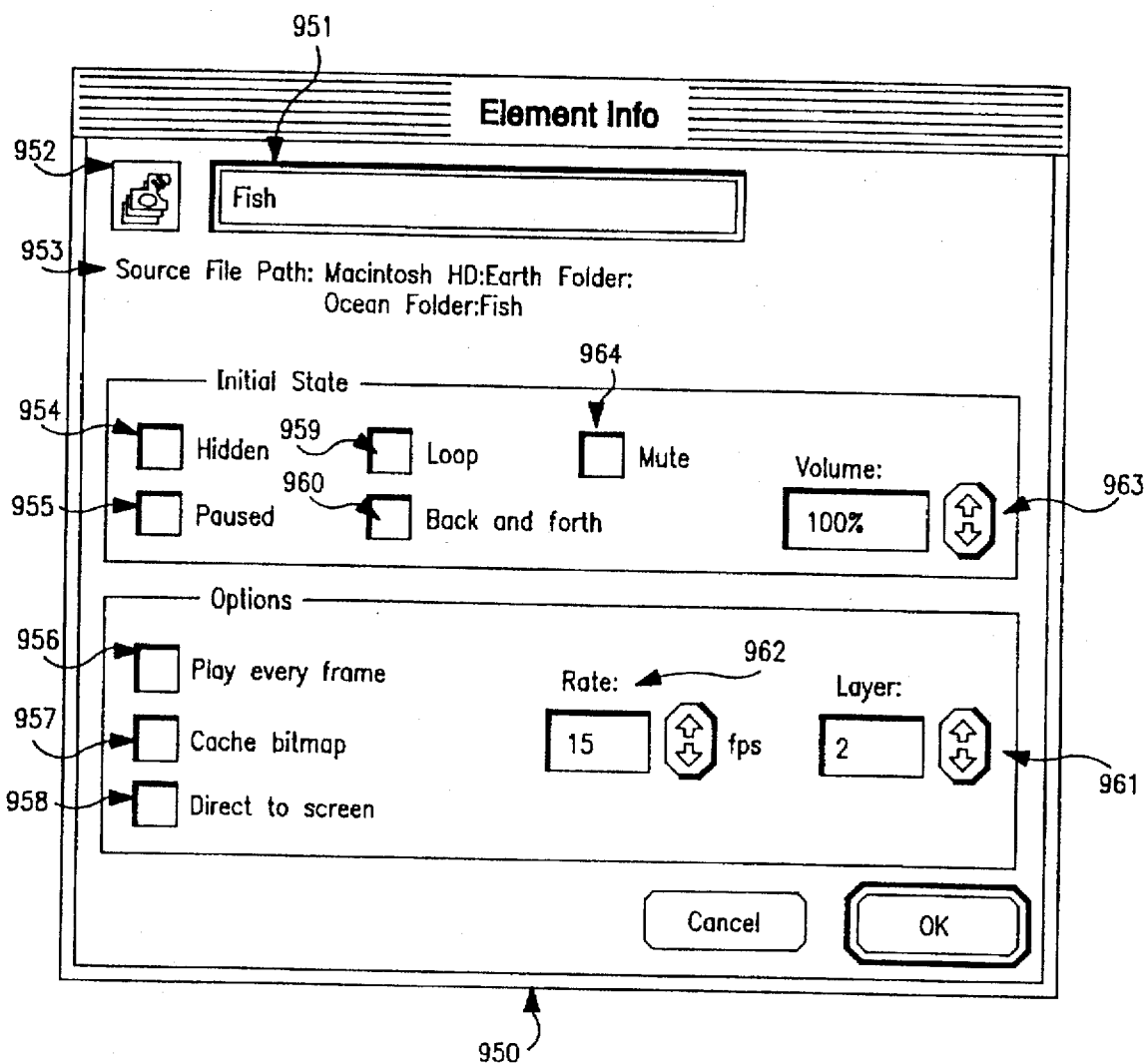

FIG. 10 is a screen display. showing the Element configuration dialog of the graphical user interface under one embodiment of the invention.

Figure 11:
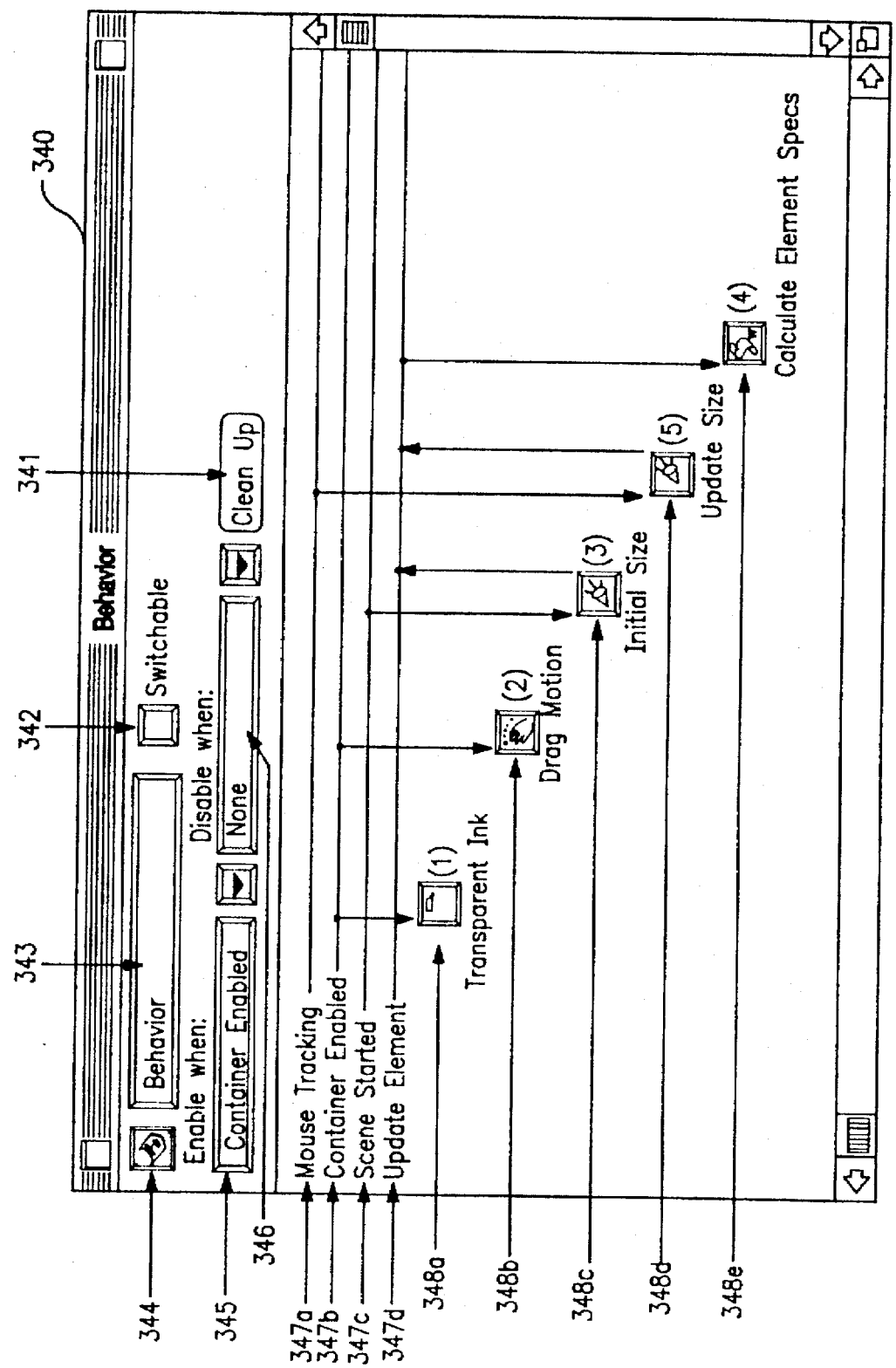

FIG. 11 is a screen display of a Behavior configuration dialog in the graphical user interface under one embodiment of the invention.

FIGS. 12(a)–(h) are screen displays showing the Modifier configuration dialogs for Variables in the graphical user interface under one embodiment of the invention.

FIGS. 13(a)–(g) are screen displays showing the Modifier configuration dialogs for Messengers in the graphical user interface under one embodiment of the invention.

Figure 14A:
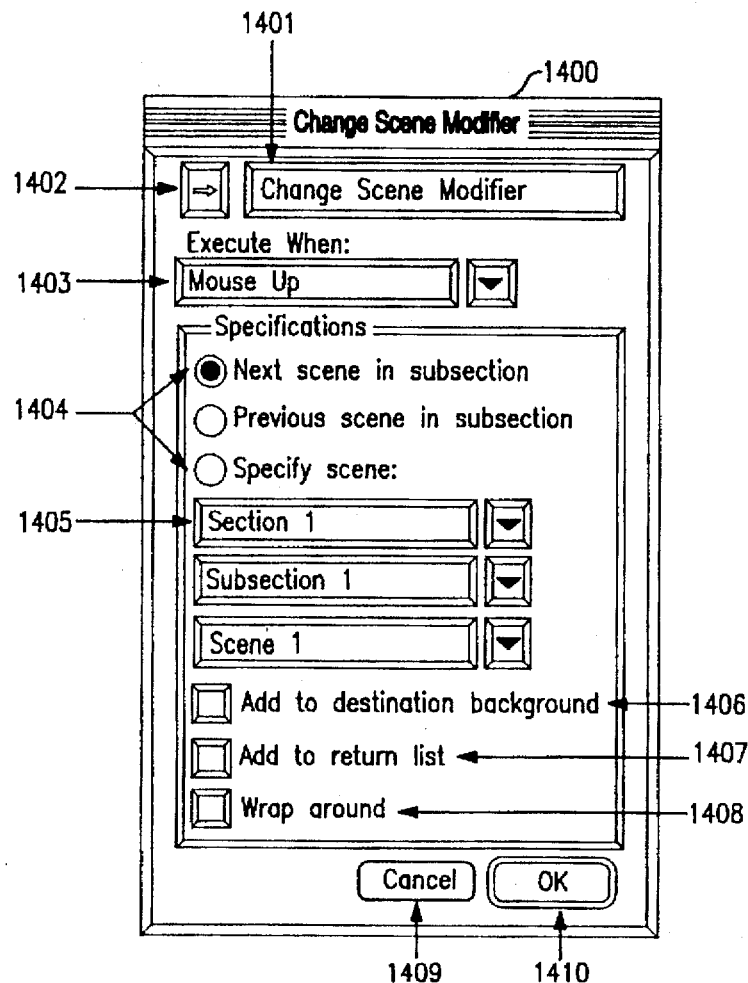
Figure 14B:
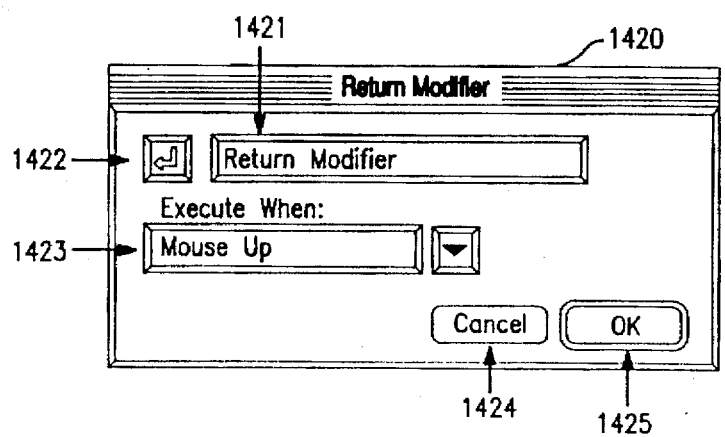
Figure 14C:
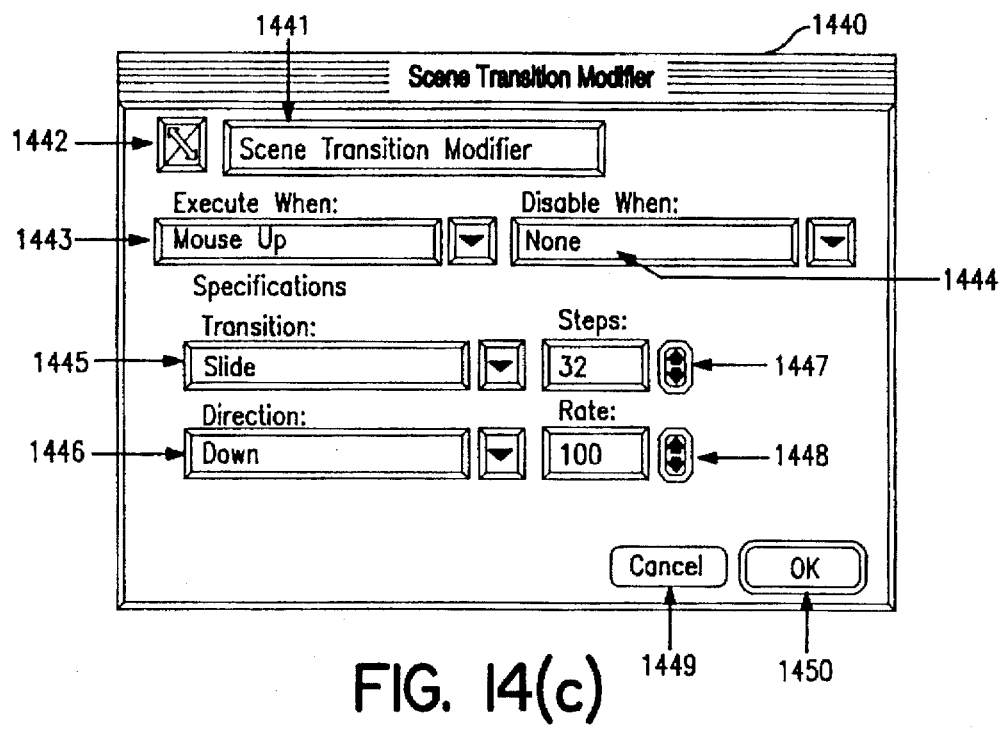

FIGS. 14(a)–(c) are screen displays showing the Modifier configuration dialogs for Scene-based Modifiers in the graphical user interface under one embodiment of the invention.

Figure 15:
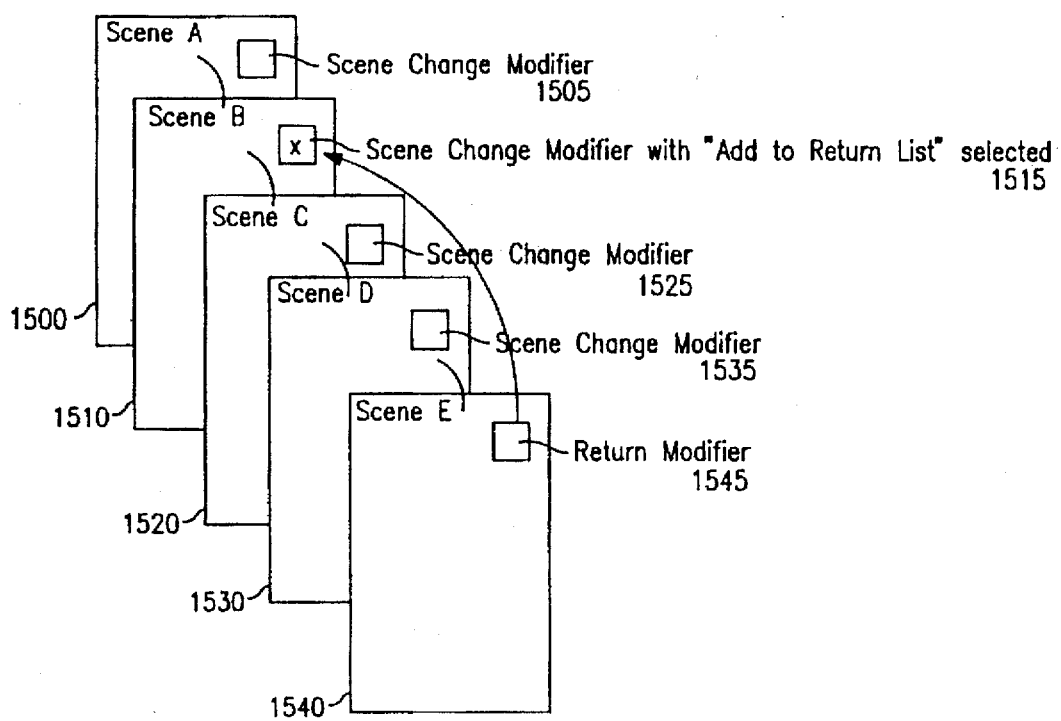

FIG. 15 is a diagram showing the operation of the Scene change Modifier of FIG. 14(a) in conjunction with the return Scene Modifier of FIG. 14(b).

FIGS. 16(a)–(d) are screen displays showing the Modifier configuration dialogs for Motion Modifiers in the graphical user interface under one embodiment of the invention.

FIGS. 17(a)–(d) are screen displays showing the Modifier configuration dialogs for Graphics Modifiers in the graphical user interface under one embodiment of the invention.

Figure 18A:
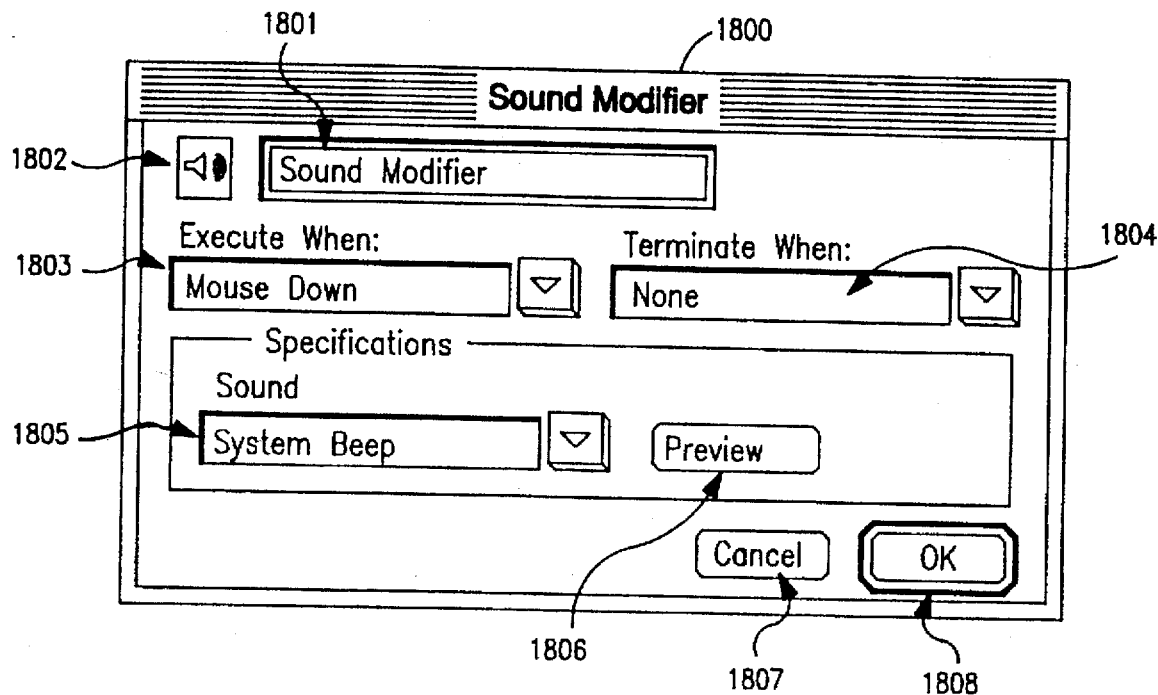
Figure 18B:
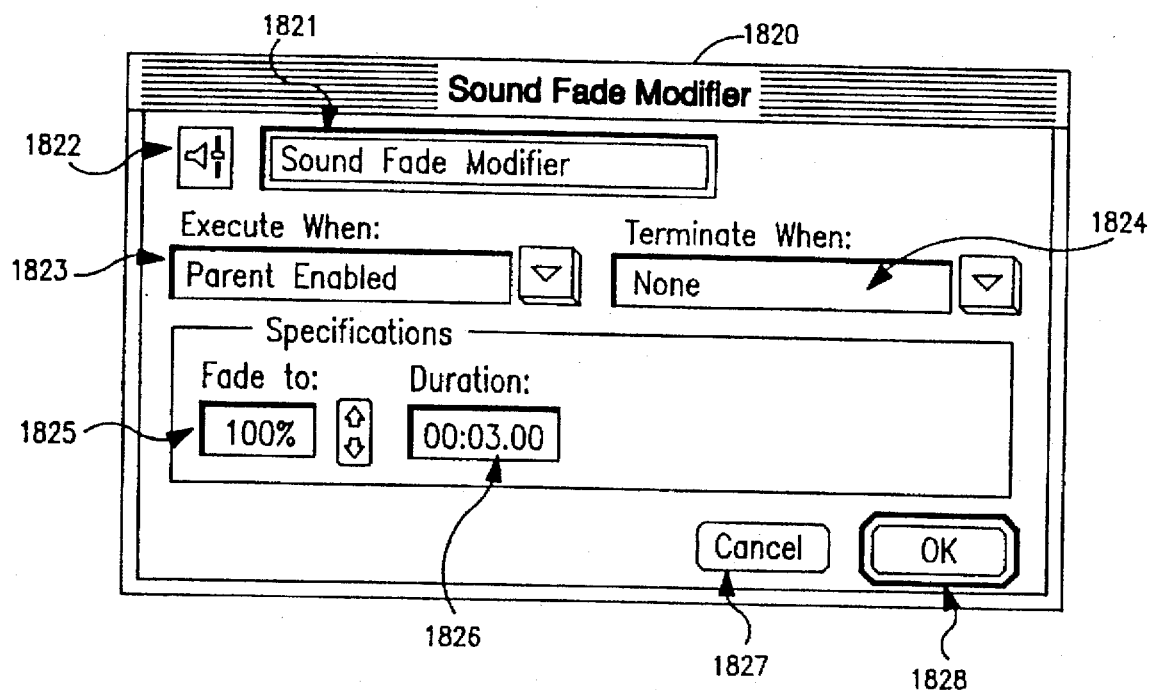

FIGS. 18(a)–(b) are screen displays showing the Modifier configuration dialogs for Sound Modifiers in the graphical user interface under one embodiment of the invention.

Figure 19:
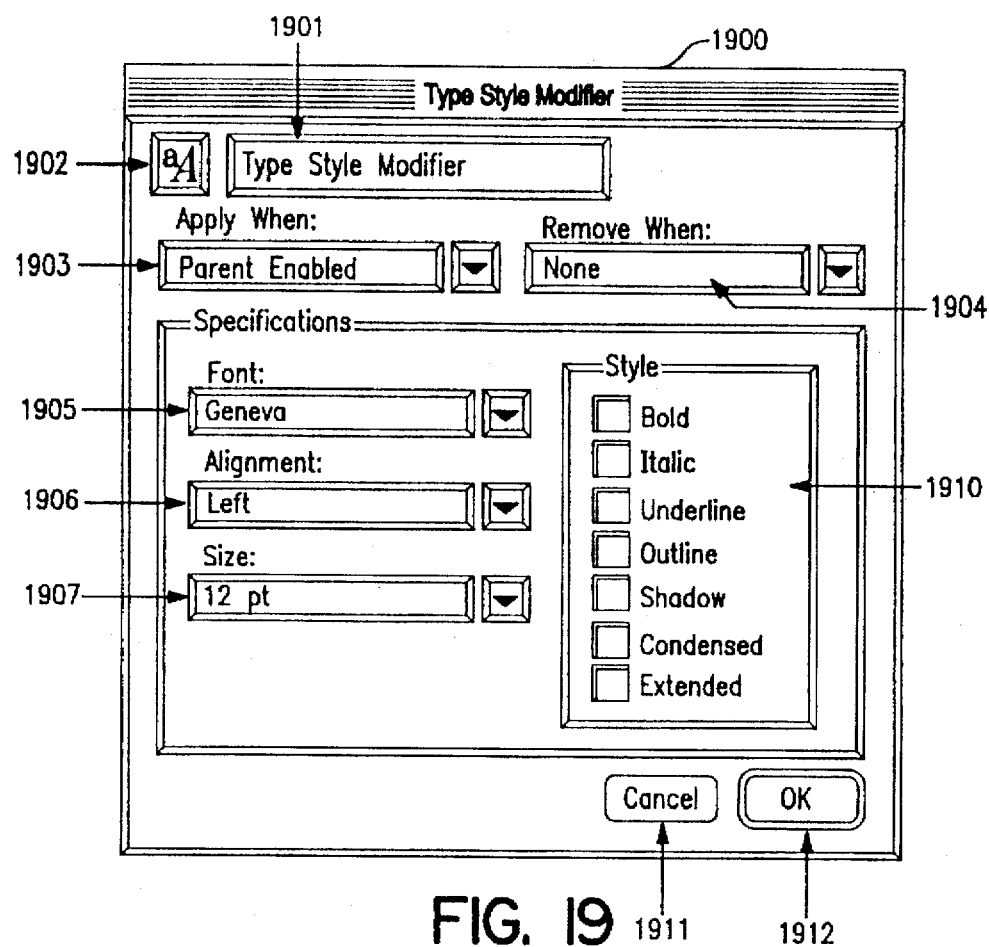

FIG. 19 is a screen display showing the Modifier configuration dialog for the style Modifier in the graphical user interface under one embodiment of the invention.

Figure 20:
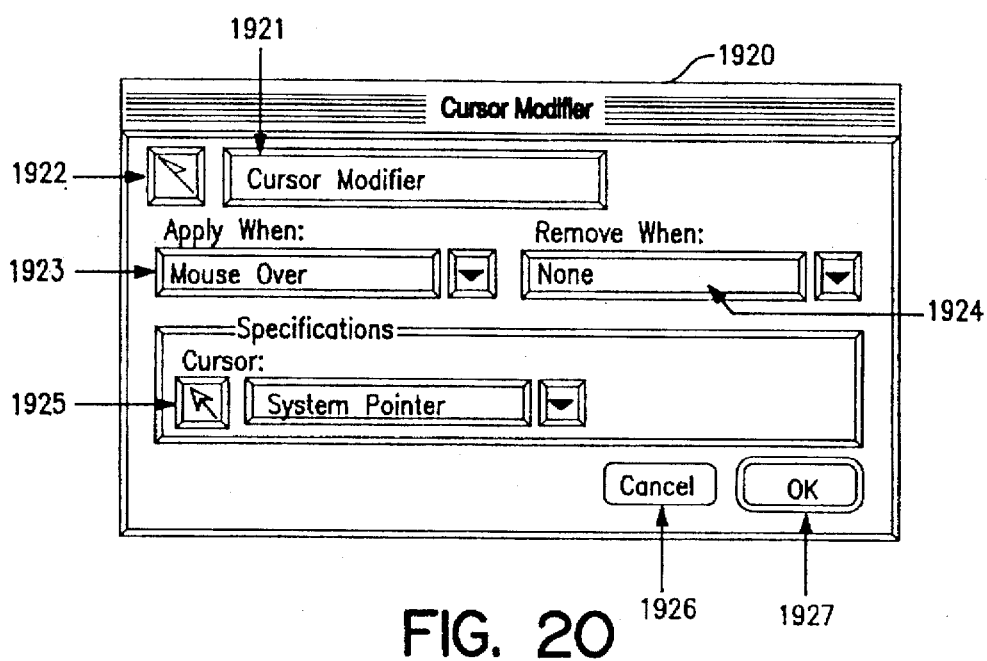

FIG. 20 is a screen display showing the Modifier configuration dialog for the cursor Modifier in the graphical user interface under one embodiment of the invention.

Figure 21:
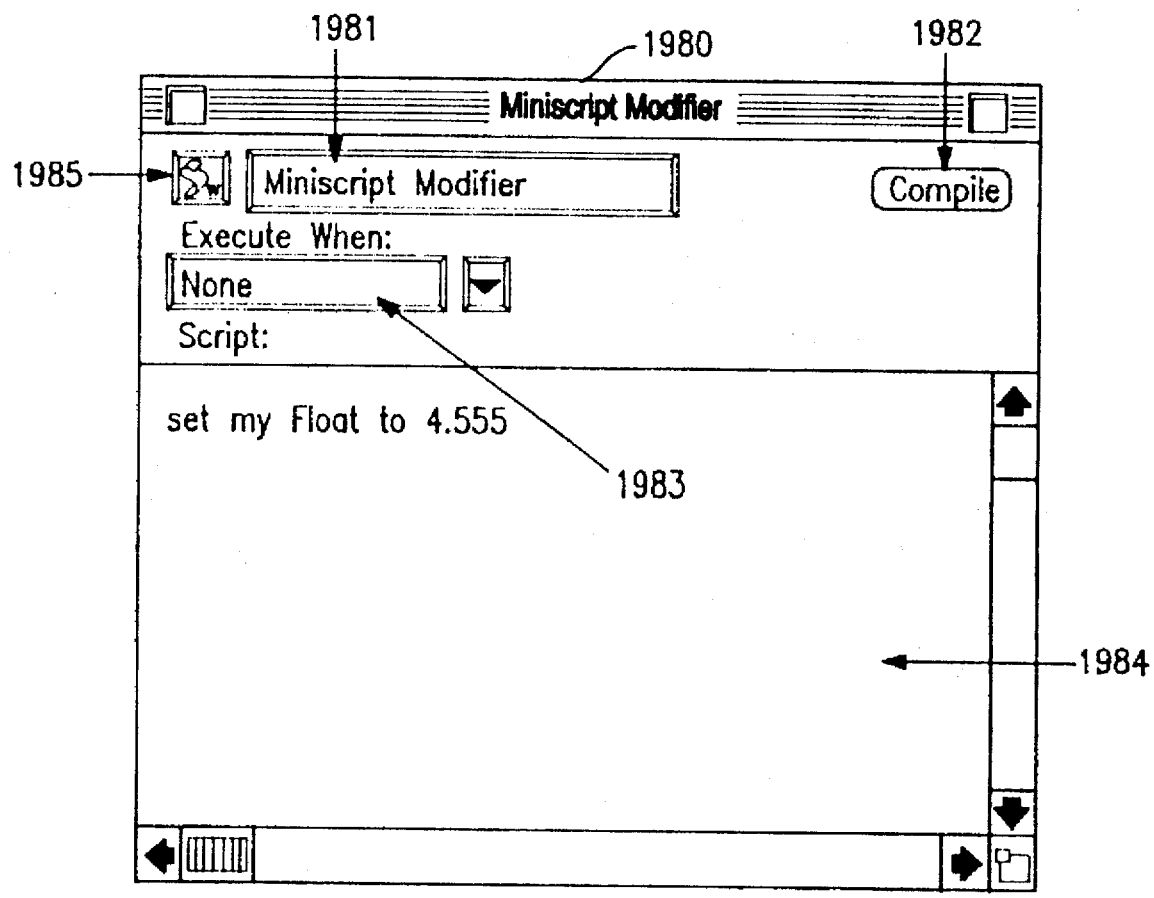

FIG. 21 is a screen display showing the Modifier configuration dialog for the set Miniscript Modifier in the graphical user interface under one embodiment of the invention.

Figure 22:
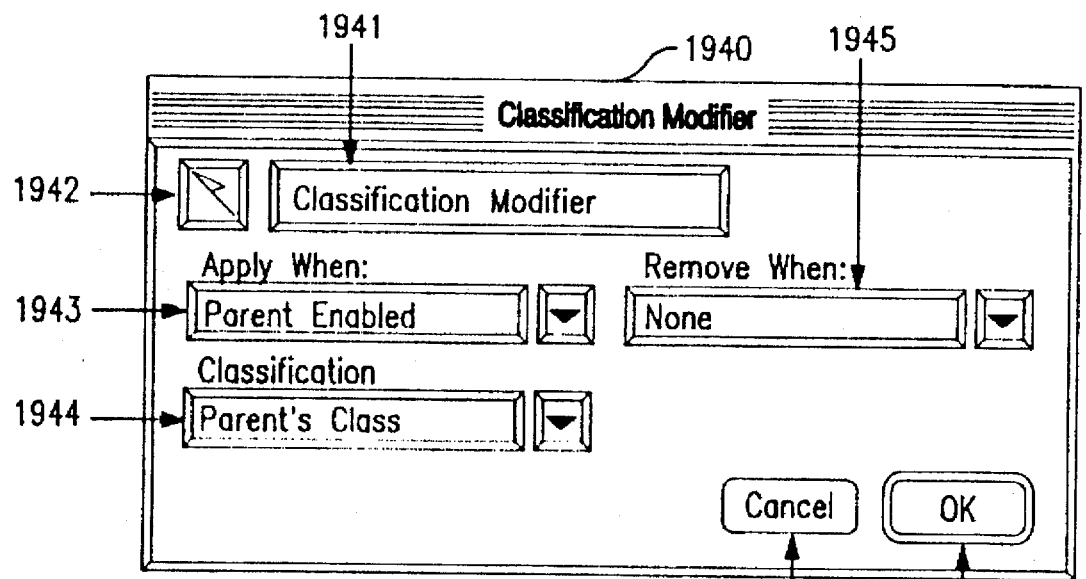

FIG. 22 is a screen display showing the Modifier configuration dialog for the classification Modifier in the graphical user interface under one embodiment of the invention.

Figure 23:
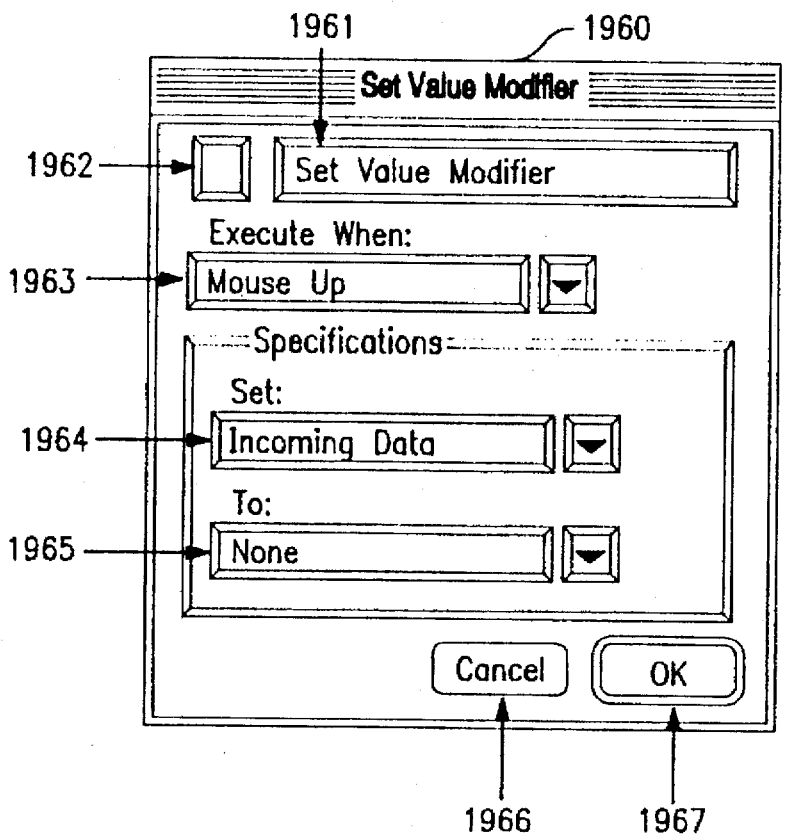

FIG. 23 is a screen display showing the Modifier configuration dialog for the set value Modifier in the graphical user interface under one embodiment of the invention.

Figure 24:
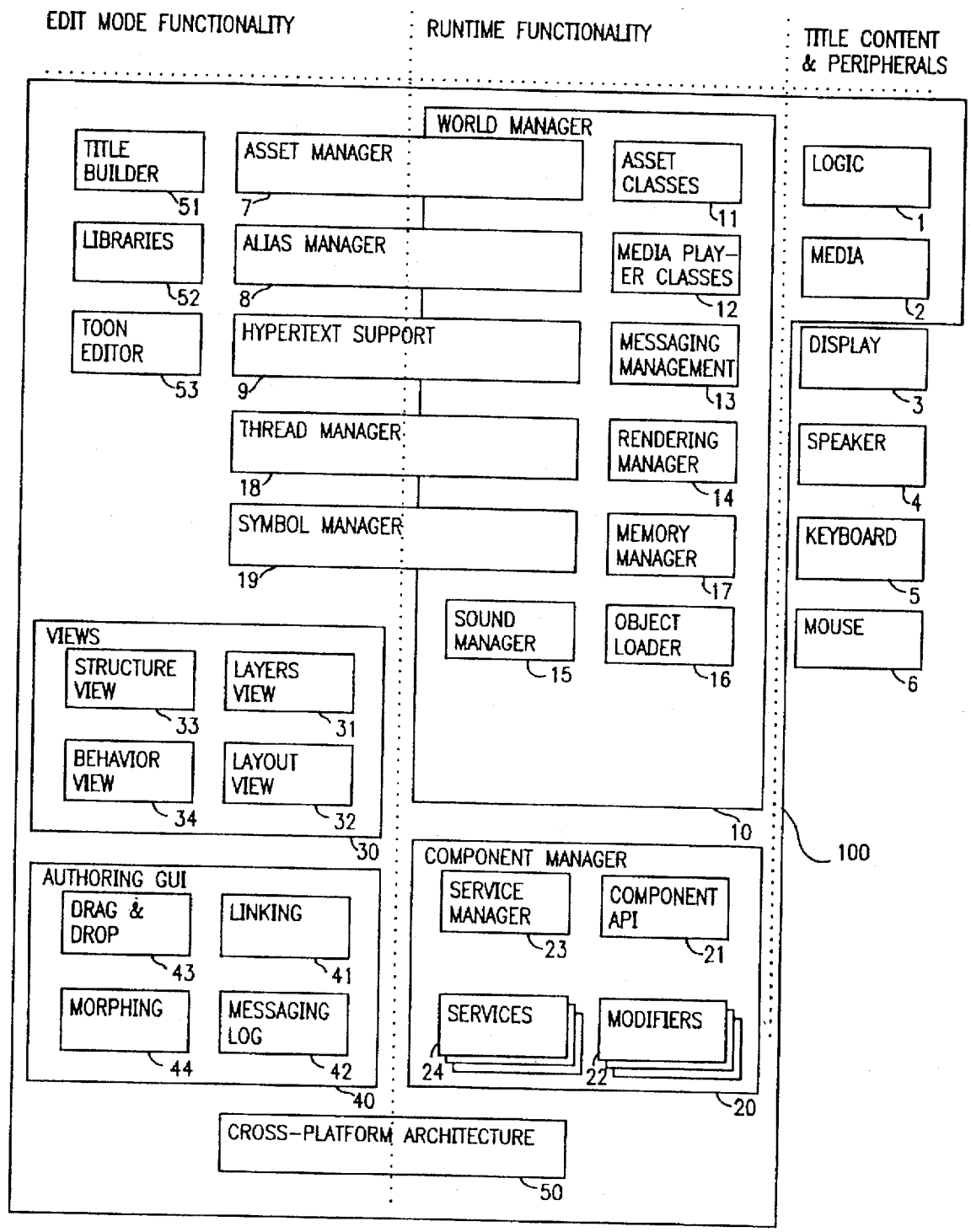

FIG. 24 is a high level block diagram of the implementation of one embodiment of the present invention.

Figure 25:
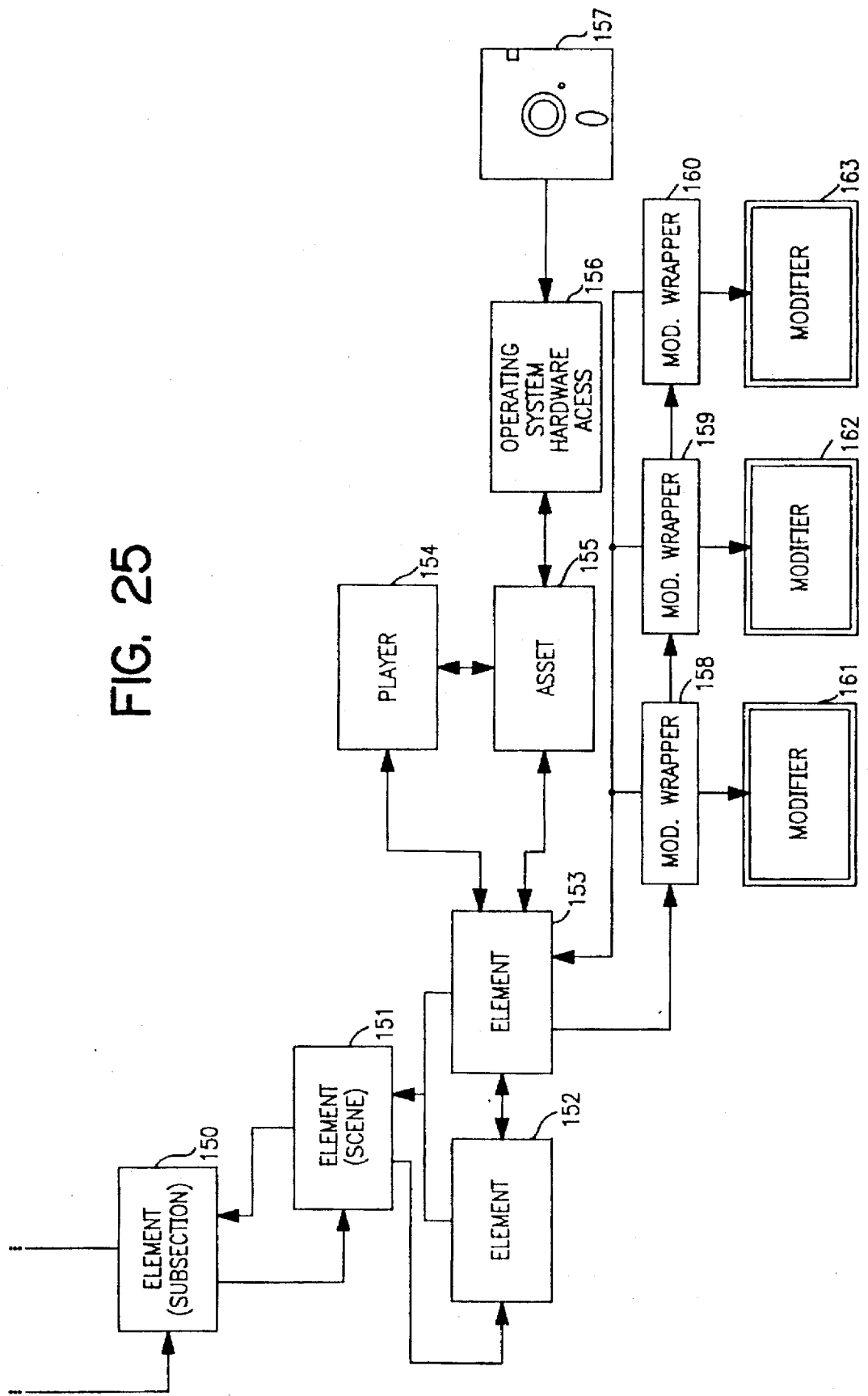

FIG. 25 is a diagram showing the interconnection of the various classes in the object model of the present invention.

Figure 26:
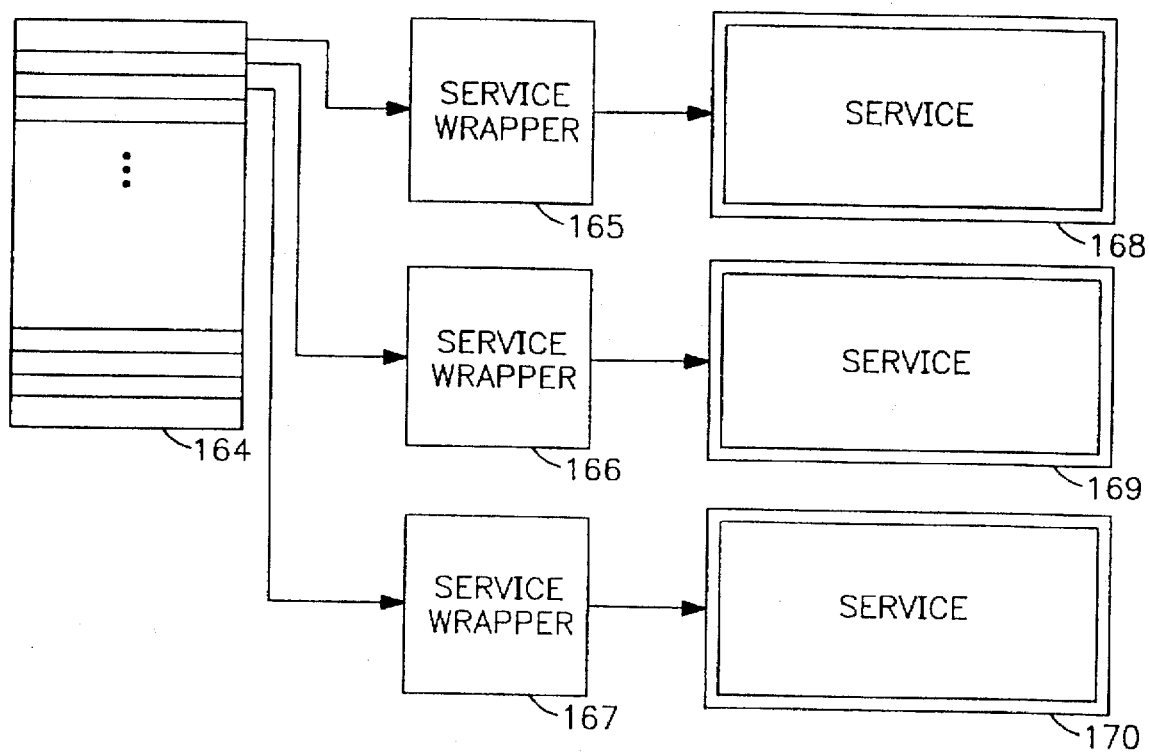

FIG. 26 is a diagram showing the interconnection of the Service classes in the object model of the present invention.

Figure 27:
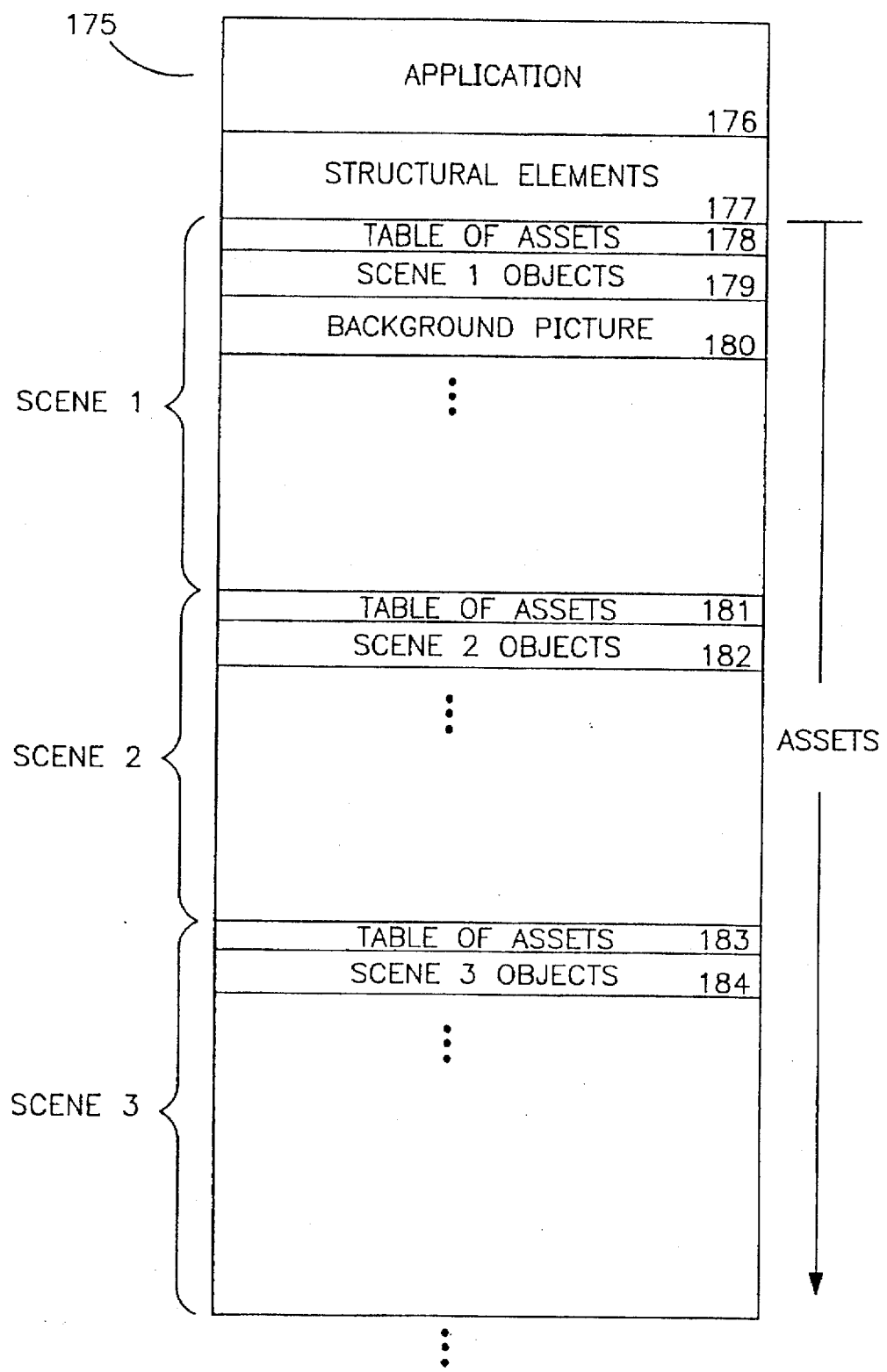

FIG. 27 is a diagram showing the storage layout for a multimedia title in one embodiment of the present invention.

Figure 28:
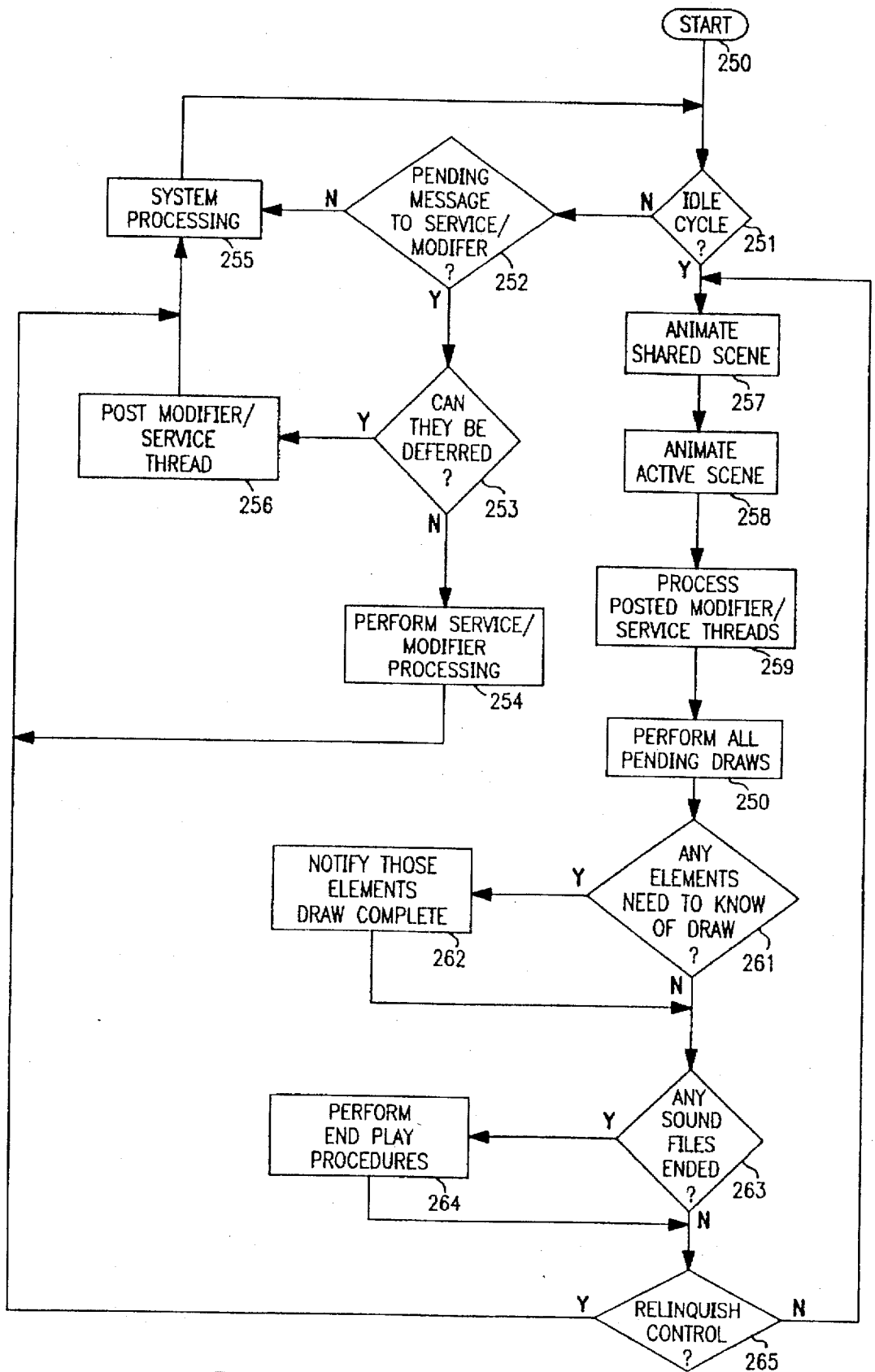

FIG. 28 is a flowchart showing the event processing loop under one embodiment of the invention.

Figure 29:
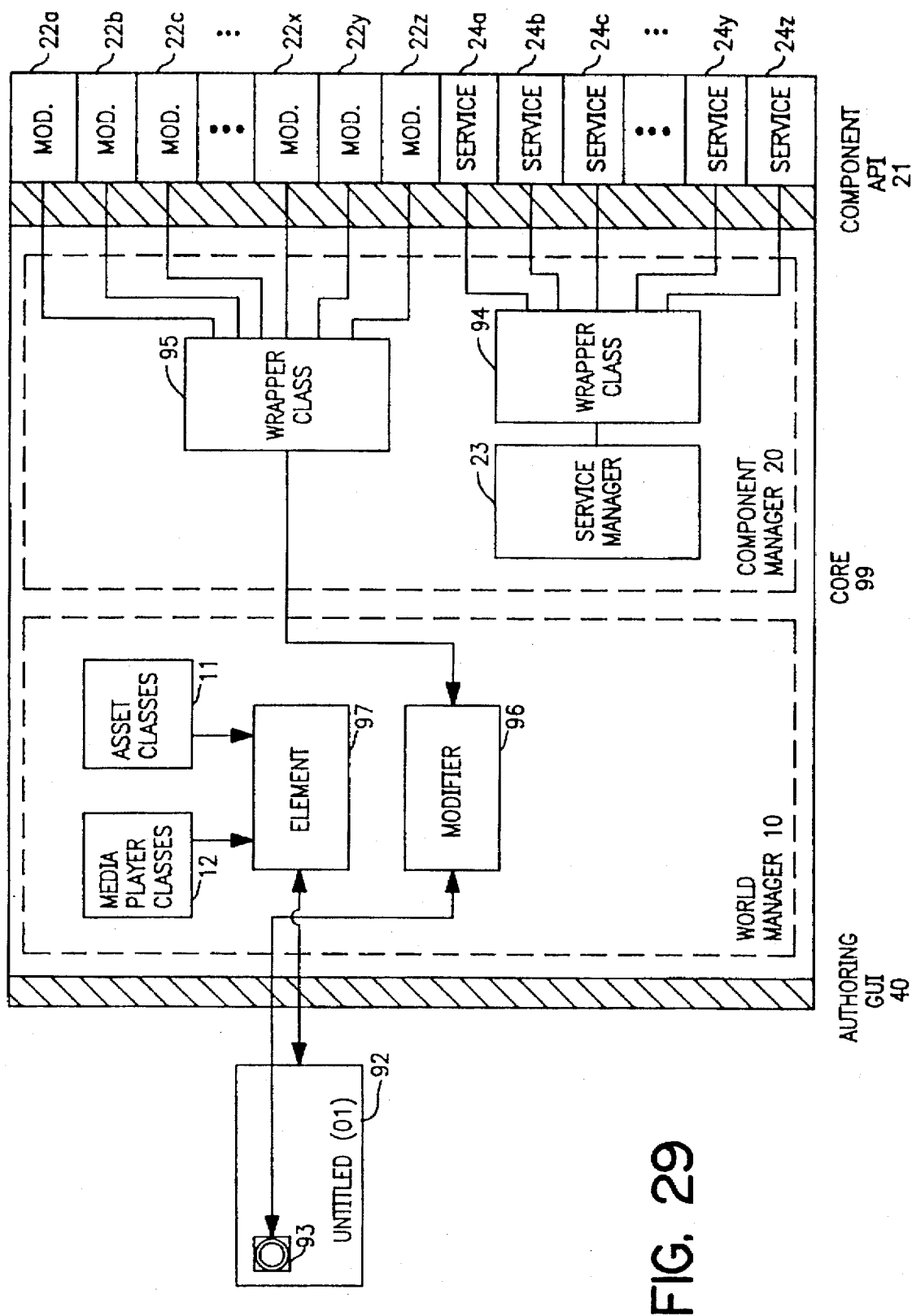

FIG. 29 is a diagram showing the architecture of both the Component API and authoring GUI according to the present invention.

Figure 30:
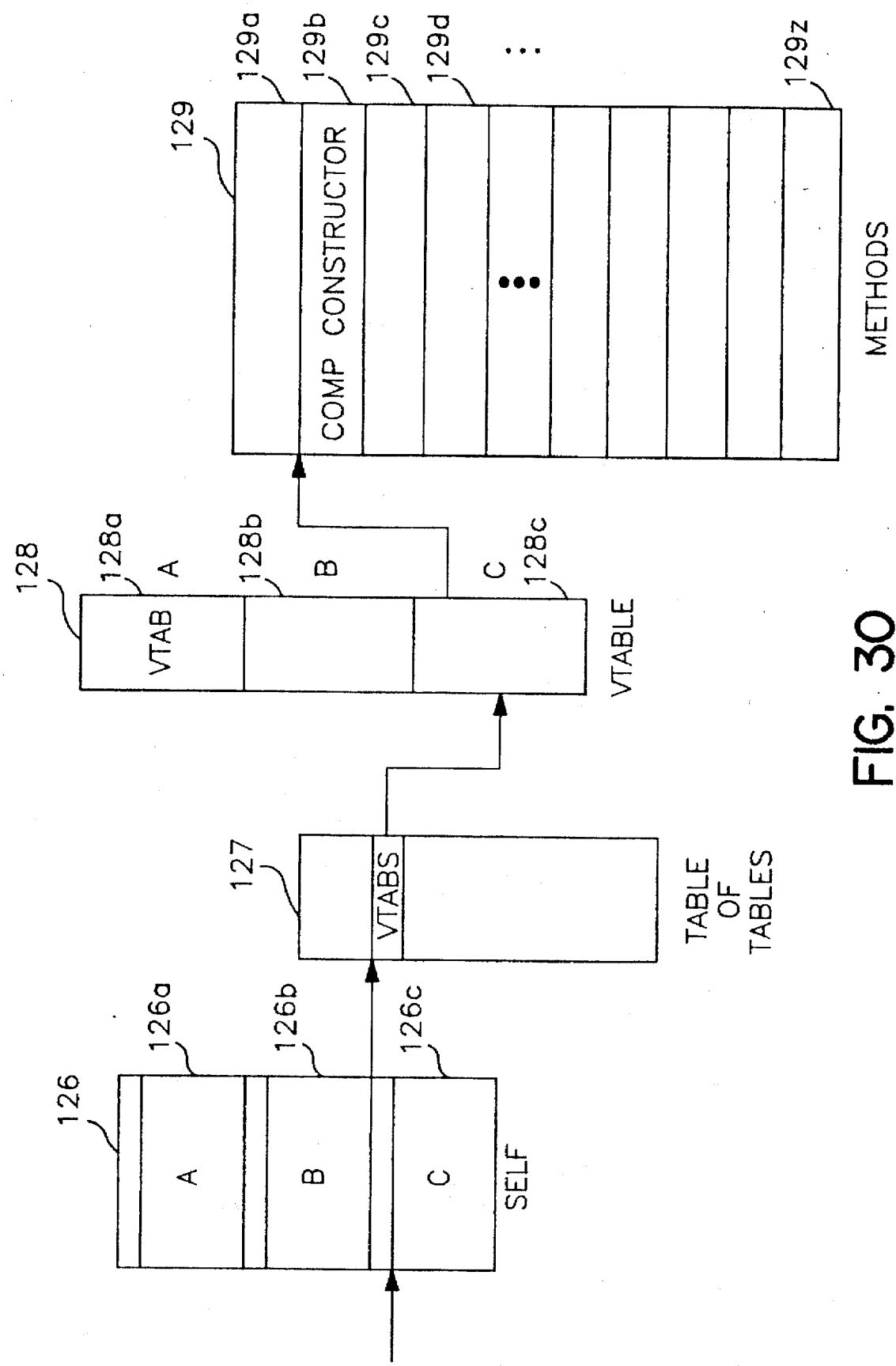

FIG. 30 is a diagram showing the operation of the object model of the present invention.

Figure 31:
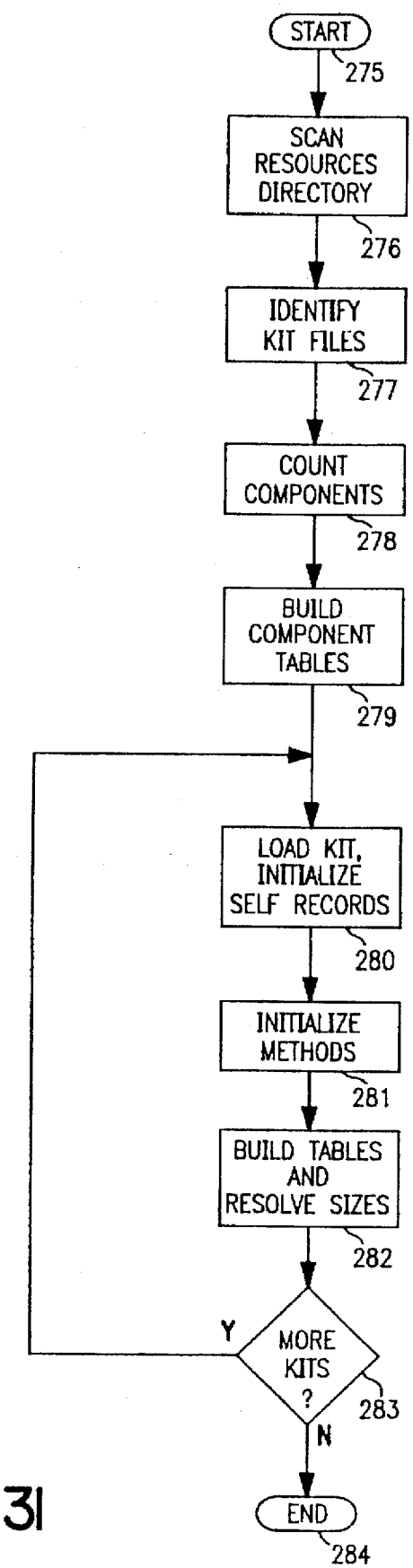

FIG. 31 is a flowchart showing the loading of Components (Modifiers, Services) at boot-up time of the program under one embodiment of the invention.

Figure 32:
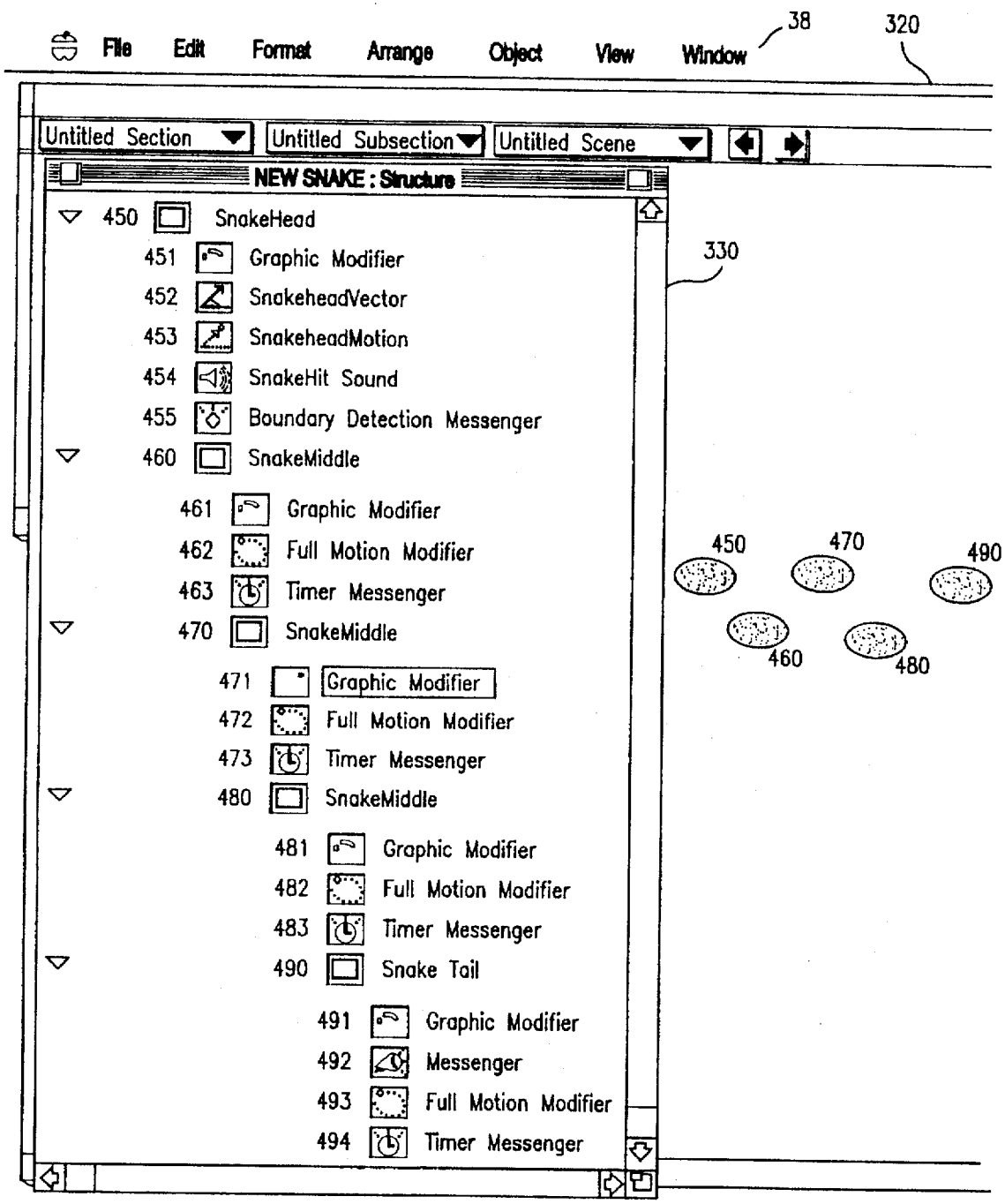

FIG. 32 is a screen display showing an implementation of a snake.

Figure 33:
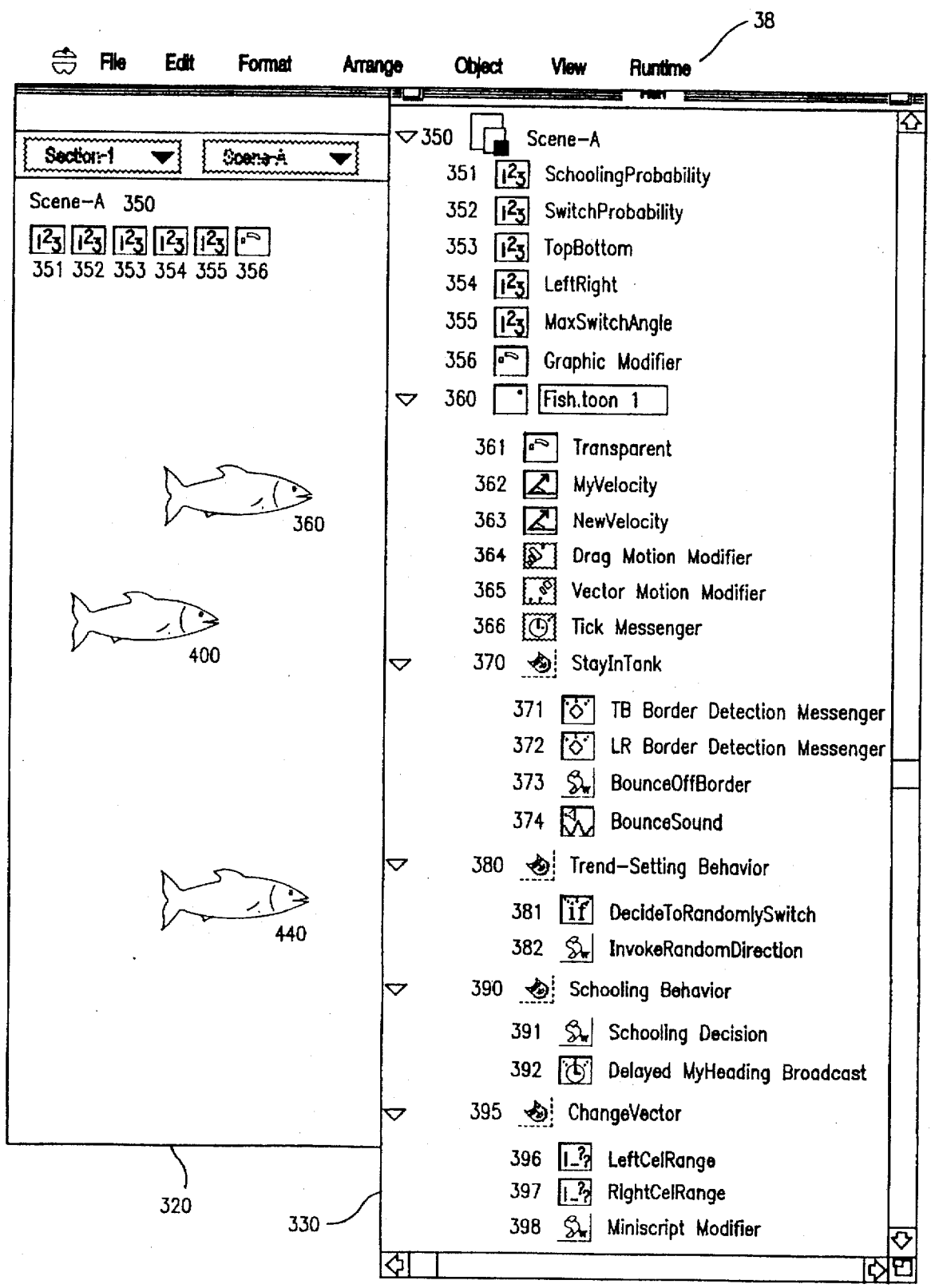

FIG. 33 is a screen display showing an implementation of a school of fish.

FIGS. 34(a)–(g) are screen displays of a selectively reusable windowing system.

FIGS. 35(a)–(g) are diagrams showing the implementation of the selectively reusable windowing system.

IV. DETAILED DESCRIPTION

A. External Architecture—"Author's-Eye View".

Before discussing the underlying implementation of the authoring system of the present invention, it is helpful to examine its external architecture—i.e., that portion of the system which is visible to the author.

It is through this external architecture that authors create end-user applications or "titles." As is explained in greater detail below, programmers can extend the functionality of this external architecture, seamlessly, via an interface to the "core" of the system. Moreover, the platform-independent nature of the system's implementation facilitates portability of the efforts of authors and programmers to a wide variety of computing platforms.

1. Objects: Elements and Modifiers.

In one embodiment of this invention, the author can create two basic types of objects: Elements and Modifiers. To use the metaphor of a stage play, the Elements comprise the play's structure (e.g., acts and scenes) and its actors, and the Modifiers comprise the stage directions, the motivations the director imbues in the actors to behave the way they do, and other modifications to the characteristics of the play's structure and its actors.

The system enables authors to create various types of Elements and to assign particular characteristics to each Element. These characteristics include properties (e.g., weight, color, etc.) that define what the Element is and capabilities (e.g., send messages, move along a path, etc.) that determine what the Element does.

Authors assign characteristics to an Element by incorporating Modifiers within that Element. As is illustrated below, the process of creating and configuring Elements and Modifiers is highly visual and intuitive, typically involving "dragging and dropping" icons representing Elements and Modifiers, selecting menu items and configuring dialog boxes. Little, if any, scripting or programming is required.

The system is, however, quite extensible via the "Component API," discussed in greater detail below. Programmers can use the Component API to create "Components" that become fully integrated Modifiers and "Services" (which "service" Modifiers but are not accessible directly to authors). Once created, Components are indistinguishable from the system's "built-in" Modifiers and Services.

In this embodiment, there are three general categories of Modifiers: (i) Variables that simply store data of various types; (ii) Capabilities that perform actions on behalf of the Element; and (iii) Behaviors that "contain" additional Behaviors and other Modifiers. In another embodiment, a hybrid Variable/Capability Modifier could both store data and perform actions.

An author can create two general categories of Elements: (i) Structural Elements (including Projects, Sections and Subsections, discussed in greater detail below) that serve only to "contain" other Elements and Modifiers; and (ii) Media Elements (including Scenes, discussed below) that not only can contain other Media Elements and Modifiers, but also can be "linked" to raw media, such as text, sounds, pictures, animations and movies.

There are three basic types of Media Elements that an author can create: (i) Graphic Elements (including still pictures, animations and videos), Text Elements and Sound Elements. An author can then link raw media of a particular format to the Element, causing that Element to attain certain inherent capabilities (e.g., to make a sound, display a picture, or play a movie).

By linking raw media of a particular format to a Graphic, Text or Sound Element, the author causes the system to "morph" the Element into a more specific type of Element (and among specific types) related to that format. For example, the author could create an "AIFF" sound, an "ASCII" sentence, a "PICT" picture, a "QuickTime" movie or an "mToon" (a built-in animation format). The morphing process is described in greater detail below with respect to the system's implementation.

Elements of a given type also have certain built-in properties known as Attributes. An Element's Attributes include properties applicable to the type of media to which the Element is linked (e.g., position, cel number, rate, etc.).

Thus, an Element's properties are defined by its Attributes and its author-created Variables. An Element's capabilities are determined by the type of media, if any, to which it is linked, and by its author-created Behaviors and Capabilities (i.e., its non-Variable Modifiers). Together, these properties and capabilities define an Element's individual characteristics—i.e., what the Element is and what the Element does.

In addition to creating Elements and assigning them individual characteristics, an author can specify the manner in which these Elements interact with one another, via an integrated object messaging mechanism. This messaging mechanism is accessible to authors via Modifiers, as is described in greater detail below.

2. Object Containers: Elements and Behaviors.

Unlike simple "leaf" objects, Elements and Behaviors are "object containers" that can comprise a hierarchy of objects. These object hierarchies provide "environments" (each enclosed by an object container) in which the system can isolate external dependencies. This isolation of an object container's external dependencies, referred to herein as "Hierarchical Encapsulation," results in a significant degree of reusability of the Elements and Behaviors created by an author.

As is illustrated below, authors can construct complex environments comprising a hierarchy of "Elements within Elements" interacting with one another. Within an Element, authors can create equally complex internal environments (together representing the Element's "personality") comprising a hierarchy of interrelated "Behaviors and other Modifiers within Behaviors."

Authors can selectively reuse these modular Element and Behavior object containers at virtually any level of complexity. Moreover, authors can "mix and match" Elements and Modifiers from differing environments at practically any level of the Structural and Behavioral Hierarchies. Furthermore, a team of authors can collaborate to create and test an entire application while individual authors refine their own modular, serf-contained environments.

For example, multiple authors might collaborate to build a complex model of a "car" Element that contains one "engine," four "wheel" and various other Elements, as well as a "driving" Behavior that contains "steering," "braking" and various other Behaviors. Individual authors each might create one or more of these self-contained Elements and Behaviors, and then collaborate with one another to test all or a portion of the "car" and refine the desired interaction among the various Elements and Behaviors.

Moreover, a subsequent author working on a different application could reuse the entire "car" Element or merely one or more of the Elements or Behaviors contained therein. For example, the author might apply the "braking" Behavior to a "horse" or "airplane" Element in another application.

To create complex objects, authors need not create abstract "classes" or object templates that serve to relate objects to one another with respect to their characteristics. Elements, Behaviors and other Modifiers created by the author are object instances. To permit Elements and Behaviors to "contain" other objects, the system links the Element and Behavior object instances to the other object instances contained within them (as is explained in greater detail below with respect to the system's implementation).

Thus, Elements and Behaviors are object containers—in this embodiment, object instances that can "contain" (i.e., be linked to) other object instances. To some extent, however, Elements do attain (at least temporarily) the characteristics they contain. Yet Elements merely provide an environmental frame of reference to their descendant Elements. Elements and Behaviors do not actually "inherit" the characteristics of the objects they contain.

Many embodiments of this "object container" relationship among objects are possible, including intersecting families of objects, multiple-parent relationships and various combinations of "one-to-many" and "many-to-many" child-parent relationships. In any event, by spawning object hierarchies, object containers provide the environments that facilitate their reusability via Hierarchical Encapsulation, discussed below.

Authors are thus free to create and work directly with objects that represent, at any level of complexity, the characters in their application and the individual characteristics "contained within" those characters, as well as the all-encompassing "environmental factors" that "contain" those characters and determine the nature of their interaction.

3. Object Hierarchies: Structural Hierarchy and Behavioral Hierarchy.

When an Element contains another object within it, the Element object is called a parent and the other object is called its child. If the child object in turn contains another object, the child object is considered the parent of the object it contains, and so on.

This chain of parents and children is called an Element or (Structural) Hierarchy. In one embodiment, each parent can have multiple children, but each child has exactly one parent. Elements above and below a particular Element in the Structural Hierarchy can be referred to, respectively, as ancestors and descendants of that Element. Children of the same parent are called siblings.

Just as an Element can contain other Elements in the Structural Hierarchy, each Element also contains its own Modifier or Behavioral Hierarchy of Behaviors and "leaf" Modifiers (i.e. the Element's personality). These Modifiers modify the characteristics of the Element (e.g., by storing data in the Element or performing actions on behalf of the Element), often in response to messages from other Modifiers inside the same or another Element.

In the context of the Structural Hierarchy, an Element can be viewed as an environmental "frame of reference" for its descendant Elements. It is within that Element's environment that its descendant Elements exhibit their personalities. The Structural Hierarchy determines the manner in which those descendant Elements interact with one another within that Element's environment.

Similarly, the Behavioral Hierarchy determines the manner of interaction among an Element's internal Behaviors. In the context of the Element's overall personality, a Behavior also can be viewed as an environmental "frame of reference" for its descendant Behaviors and other Modifiers.

Continuing our "car" example, the "car" Element provides the environment in which the "engine" Element functions. If the car moves, the engine will move with the car automatically (as it would in a real car). Yet, the engine Element need not have any internal "movement" Behavior. By acting as the local coordinate system for its child Elements, the car becomes the engine's environmental frame of reference. This particular manner of isolating positional dependencies of Elements within the Structural Hierarchy, referred to as Hierarchical Relative Positioning, is discussed in greater detail below.

Similarly, the "driving" Behavior provides the environment in which the "braking" Behavior functions. If the driver does not step on the brakes, the "braking" Behavior will not be invoked—i.e., it will not receive a "brake pedal depressed" message from its parent "driving" Behavior. By acting as the "gatekeeper" for messages intended for its child Behaviors, the parent "driving" Behavior becomes the "braking" Behavior's environmental frame of reference. This particular manner of isolating messaging dependencies of Elements and Behaviors (and other Modifiers) within the Structural and Behavioral Hierarchies, referred to as Hierarchical Message Broadcasting, is discussed in greater detail below.

Continuing the example, the "driving" Behavior must monitor the cat's speed for a variety of reasons, as must the driver of a real car (e.g., to know when to release the brake). The speed of the car could be stored in a "car speed" Variable inside the Element, but not necessarily inside the "driving" Behavior because other Behaviors (e.g., an "Air Bag" Behavior detecting massive deceleration) may need to access this Variable. By making its child Variables accessible to its descendants, the car becomes the frame of reference for the "driving" Behavior. This particular manner of isolating data dependencies of Elements and Behaviors (and other Modifiers) within the Structural and Behavioral Hierarchies, referred to as Hierarchical Variable Scoping, also is discussed in greater detail below.

a. Types of Elements in the Structural Hierarchy.

As noted above, there exist two basic categories of Elements in this embodiment—Structural Elements and Media Elements.

Authors can utilize Structural Elements to group the contents of a title into organized sections, like the chapters of a book or the acts in a play. In this embodiment, the purely Structural Elements comprise Projects, Sections and Subsections.

Media Elements (including the Modifiers contained within them) comprise the primary content of an author's application. They typically are the characters or actors within a "Scene" (a special Media Element the primary purpose of which is structural—to contain other Media Elements). Any Media Element can be used structurally, as containers for other Media Elements, to form a more complex Element. Media Elements as their name suggests, typically are linked to raw media, such as text, sounds, pictures, movies or animations, in order to communicate with the user of the title.

(1) Projects.

A Project is a Structural Element that contains the entire title. Its children are Sections, which are described below. A Project also can contain Modifiers (including Behaviors) that store data or perform actions on behalf of the entire Project. The score of a game, for example, could be stored in the Project so as to be available to all other Elements and Modifiers.

(2) Sections.

A Section is a Structural Element that can be used by the author to organize logical portions of his title. It is most analogous to an act in a play or a chapter in a book. For example, an author of a U.S. travel game might create a Section for all Elements and Modifiers relating specifically to the state of California. Sections are parents to Subsections, as described below. As with Projects, Sections also can contain Modifiers. A "time-in-state" Behavior might, for example, track the amount of time the user spent in a particular state.

(3) Subsections.

A Subsection is a Structural Element that can be used by the author to further organize logical portions of a Section. Continuing the above example, the author of the travel game might create a Subsection for all Elements and Modifiers relating specifically to the San Francisco Bay Area. Subsections are parents to Scenes, and also can contain Modifiers.

(4) Scenes.

A Scene is a special Media Element that not only further organizes logical portions of a Subsection, but also contains other (non-Scene) Media Elements and Modifiers. Much like the scenes in a play, the Scene Element contains those Media Elements and Modifiers the author deems necessary to impart to the user a portion of the interactive experience provided by the parent Subsection. Continuing our travel game example, one Scene might take place on the Pacific Coast, while another occurs further inland in the city of Palo Alto.

In one embodiment, there exists a special type of Scene Element known as a Shared Scene. A Shared Scene is used to organize Elements that will be visible across multiple Scenes, such as a background picture or an animated character that travels from Scene to Scene.

In a more refined embodiment, the author can share visible Elements across Subsections and Sections by having multiple Shared Scenes, or being able to select one or more Shared Scenes dynamically. In the latter case, rather than designating a Shared Scene statically at "authoring time," the author can, dynamically at "runtime," designate any Scene (or perhaps multiple Scenes) as a current Shared Scene.

(5) Media Elements.

Media Elements comprise the primary characters or actors in a Scene. They can contain other Elements (to form a more complex Element) and can be linked to raw media. A Media Element also can contain Modifiers, and thus Behaviors, which together constitute the Element's personality. As illustrated below, it is an Element's "dual hierarchy" that provides the environmental framework in which descendant Elements interact with one another and exhibit their own individual "personality."

b. Isolation of External Dependencies of Object Containers.

Figure 1:
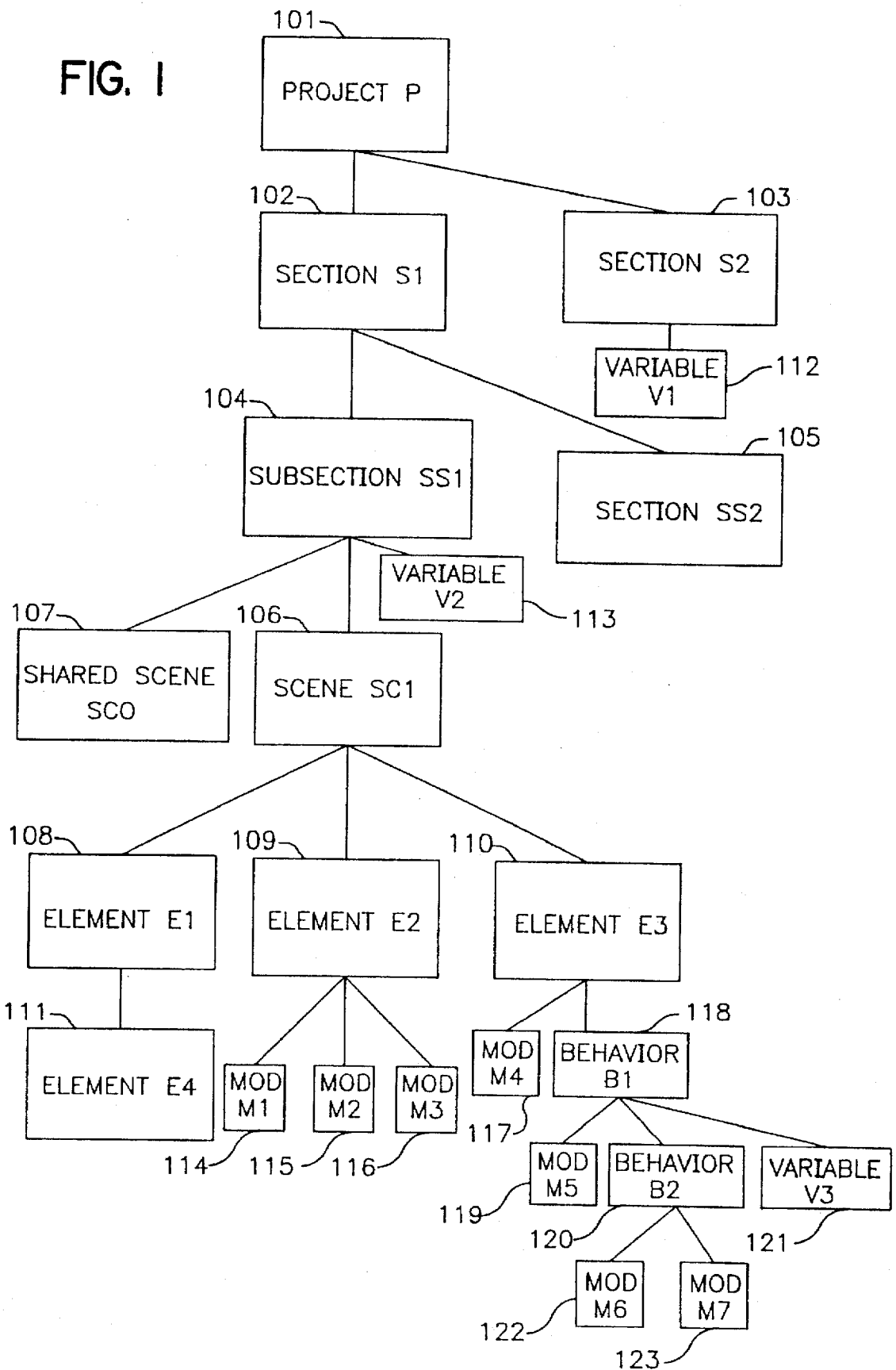
FIG. 1 is an illustration of the dual hierarchy (Structural and Behavioral) underlying the principles of the present invention.

Elements and Behaviors are object containers that spawn hierarchies of descendant objects. Consider the sample illustration of the Structural and Behavioral Hierarchies in FIG. 1. When Media Elements are created, they are positioned automatically below the Scene in the Project's Structural Hierarchy. Thus, Element E1 108 is a child of Scene Sc1 106 in Subsection SS1 104 in Section S1 102 in Project P 101. Element E4 111 is a child of Element E1 108.

By isolating the external dependencies of the environment created by an Element or Behavior object container, the system provides for a significant degree of selective reusability of that Element or Behavior (or any object contained therein) in other environments, as is further demonstrated below. It is this isolation of an object container's external dependencies that allows the Elements and Behaviors created by an author to become an "environmental frame of reference" for their descendant Elements, Behaviors and other Modifiers, as was demonstrated in the "car" example discussed above.

In one embodiment of this system, three mechanisms are employed to isolate external dependencies within object containers: (i) Hierarchical Message Broadcasting—messages that are received by an Element or Behavior typically are "broadcast" down the Structural and Behavioral Hierarchies to its descendant Elements and Modifiers (though this effect can be overridden); (ii) Hierarchical Variable Scoping—Variables are accessible to all descendant Elements and Modifiers of that Variable's parent Element or Behavior; and (iii) Hierarchical Relative Positioning—an Element's position in the Scene is determined relative to the position of (i.e., using the local coordinate system of) its parent Element, and therefore changes as the position of its parent Element changes.

(1) Hierarchical Message Broadcasting.

A message sent to an Element or Behavior typically will be broadcast down the Structural and Behavioral Hierarchies. Elements pass down messages to their children, be they Modifiers or other Elements. Behavior pass down messages to their child Modifiers. The precise manner in which the various types of messages propagate down the Structural and Behavioral Hierarchies is discussed in greater detail below with respect to object messaging generally.

Figure 4:
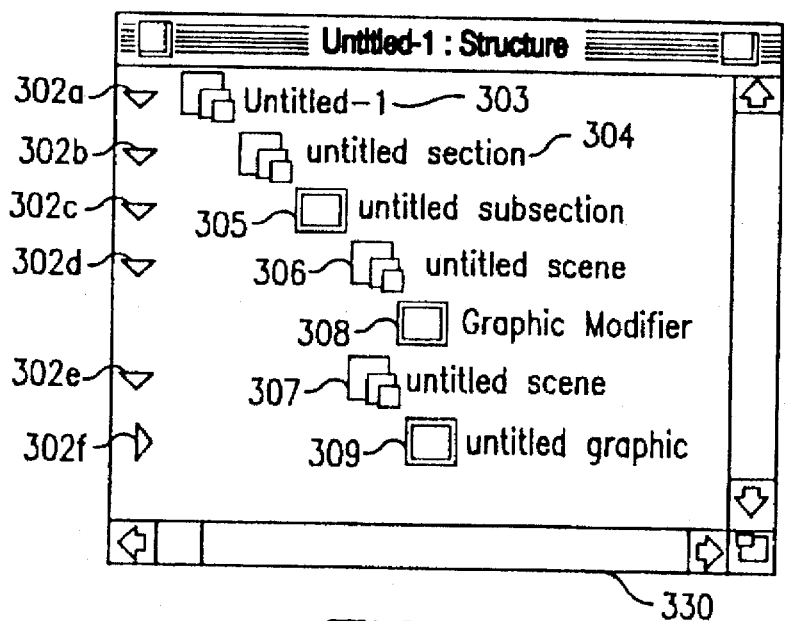
FIG. 4 is a screen display showing the structure view window of the graphical user interface under one embodiment of the invention.

In one embodiment, the order in which messages are broadcast among Elements, Behaviors and other Modifiers at any given level of the Structural and Behavioral Hierarchies is determined by the order in which those objects appear in the "structure view window" (see, e.g., structure view window 330 in FIG. 4). Initially, this is the order in which they are created. The author can modify this order simply by "dragging and dropping" or "cutting and pasting" the object's icon in the structure view window.

For example, referring again to FIG. 1, a message sent to Scene Sc1 106, under one embodiment, initially would be sent down to Element E1 108 (but not to any sibling Elements of Scene Sc1 106, such as Shared Scene Sc0 107). It would then be sent down to Element E4 111, and then to Element E2 109. From there it would be sent down to Modifiers M1 114, M2 115 and M3 116, and then to Element E3 110. It would then be sent down to Modifier M4 117, Behavior B1 118 and then down to Modifier M5 119. Finally, it would be sent to Behavior B2 120 and then down to Modifiers M6 122 and M7 123.

Note that, in this embodiment, Variables such as Variable V3 121 solely store data and thus do not respond to messages. Their data, however, can be read and written by other Modifiers, as for example, the Miniscript Modifier.

In this manner, a message sent to an Element or Behavior typically will be broadcast to all objects contained within that Element or Behavior. Upon receiving the message, those objects (Elements, Behaviors and other Modifiers) can then respond appropriately, performing whatever actions are specified by their current configuration.

By providing for the sending of messages to an Element or Behavior object container, and the broadcasting of those messages to the objects within that container, the system facilitates the isolation of messaging traffic to and from that container. In essence, the container becomes a higher-level abstract destination for messages intended not only for the container itself, but for "objects within the container."

Continuing the above example of the travel game, assume that Section S1 102 represents California, Section S2 103 represents Kansas and Subsection SS1 104 represents the San Francisco Bay Area. The author could create Behaviors to simulate the different weather patterns in these two states.

A "Midwest Weather" Behavior in Section S2 103 could simulate the weather in Kansas and periodically update a "temperature" Variable and send a "check temperature" message to that Section S2 103, which would be broadcast down the Structural and Behavioral Hierarchies to all Elements and Modifiers in each Scene in Kansas. This Behavior and the temperature Variable could both be contained at the Section S2 103 level of the Structural Hierarchy to simulate relatively constant weather throughout the state of Kansas.

Conversely, within California, Subsection SS1 104 (the San Francisco Bay Area) could contain two Scenes, one representing the Pacific Coast and the other representing Palo Alto. These Scenes could contain "Coast Weather" and "Inland Weather" Behaviors, respectively, each updating their own "temperature" Variable and sending a "check temperature" message to their respective Scenes. These separate Behaviors could simulate the differing weather patterns that occur even within a relatively small region of California.

"People" Elements in the various Scenes within the two states might be very complex, perhaps containing five or ten different Behaviors, including a Jogging, Swimming and a "Check Temperature" Behavior that check the temperature in response to a "check temperature" message. If the temperature deviates too far from the average temperature, the Check Temperature Behavior might send a "Very High Temperature" or "Very Low Temperature" message to its person Element, which will be broadcast down to the Swimming and Jogging Behaviors. The Swimming Behavior might be enabled by "Very High Temperatures" and disabled by "Very Low Temperature" and vice-versa for the Jogging Behavior.

By permitting the various "weather" Behaviors to broadcast their messages down the Structural and Behavioral Hierarchies (from the Section level in Kansas, and from the Scene level in California), the people Elements in either state will receive this message from their respective parent Scenes. The "weather" Behaviors need not target their message directly to a particular person Element, or even know which type of Element might respond to their "check temperature" message (e.g., person, animal, etc.).

The people Elements, therefore, could be moved from any Scene in Kansas to any other Scene in Kansas or California, and still respond appropriately to the temperature in that region. Even though the "check temperature" message is sent to a different environment or level of the Structural Hierarchy in Kansas (Section) than in California (Scene), it still reaches all relevant people Elements.

This degree of reusability of Elements and Behaviors is facilitated by the system's Hierarchical Message Broadcasting mechanism, which broadcasts messages sent to an object container to the objects it contains. This mechanism isolates the dependencies of a message at the abstract level of the environment represented by the object container to which that message is sent, as opposed to requiring the author to target the message directly to a particular "leaf" object.

As is discussed below, direct targeting of messages remains an option in this embodiment in the event that the author elects to forego a degree of reusability in favor of explicit target naming.

(2) Hierarchical Variable Scoping.

As demonstrated above, Elements and Behaviors are dependent upon messages to enable, disable and trigger certain actions, including those of their descendant Modifiers. Those Modifiers frequently are dependent upon Variables to perform actions on behalf of their parent Elements. Isolating Variable dependencies within Elements and Behaviors also facilitates reusability of those object containers.

The scope of Variables (data) accessible to a Modifier is another manifestation of that Modifier's environment. Variables are accessible to all descendant objects of that Variable's parent Element or Behavior. In other words, Variables are accessible within their parent's environment.

Hierarchical Variable Scoping serves to isolate an object container's dependencies on external Variables. By making Variables accessible to descendant objects of the Variable's parent, those descendant objects automatically "know about" those external Variables. A descendant Element or Behavior therefore becomes reusable in that the external Variables upon which it depends are isolated within ("known to") that Element or Behavior.

Returning to our travel game example, the "temperature" Variable in Kansas is accessible to the "Check Temperature" Behavior within any person Element of any Scene in Kansas. Because the "temperature" Variable is located at the Section S2 103 level, its descendant Elements include all Subsections therein, each Scene contained within those Subsections, each Element in each such Scene (including any people Elements), and finally the "Check Temperature" Behavior contained within such people Elements.

Moreover, if a person Element was moved from a Scene in Kansas to the Pacific Coast Scene in California, the "temperature" Variable in that Scene would be accessible, automatically, to that person Element and to its "Check Temperature" Behavior. This degree of reusability is a direct result of the Hierarchical Variable Scoping mechanism.

In the above example, this mechanism isolates "temperature" Variable dependencies at the Section level in Kansas and at the Scene level within the San Francisco Bay Area in California. As noted above, the Hierarchical Message Broadcasting mechanism also isolates messaging dependencies (in particular the "check temperature" message) at those same levels of the Structural Hierarchy. Thus, in this example, these two mechanisms together make object containers below that level (such as the person Element) reusable across Sections of a Project.

(3) Hierarchical Relative Positioning.

Another environmental dependency of object containers, in this case limited to Elements, is the position of an Element relative to that of its ancestors. Rather than require the author to model the common circumstance in which the movement of one Element must be relative to the movement of another Element, the system, by default, determines an Element's position in the Scene relative to the position of (i.e., using the local coordinate system of) its parent Element.

In another embodiment, this effect could be made optional. In any event, a child Element can, as part of its own personality, move on its own initiative. Its position nevertheless remains relative to its parent Element. It therefore also will continue to move as its parent Element moves.

Thus, a child Element moves (changes position) within the Scene as its parent Element moves. This effect filters down the Structural Hierarchy below the Scene level. A common use of Hierarchical Relative Positioning is to model Elements physically contained within or attached to other Elements (e.g., a toy in a box or the wings of a bird). It also can be used to model Elements that, for one reason or another, tend to follow other Elements (e.g., planets orbiting the sun, or packs of animals that tend to move together).

Hierarchical Relative Positioning also serves to isolate an Element's dependencies on its environment, in that an author need not model this "follow my parent" movement. Upon reusing or reattaching an Element to another parent Element, the system automatically recalculates that Element's position relative to its new parent Element.

c. Selective Reusability through Adoption and Transplantation.

The selective reusability of object containers discussed above frequently takes one of two forms. If Elements are to be reused, they often will be placed in a new environment—i.e., given a new parent Element in the Structural Hierarchy. This process is referred to as "Adoption." In other words, the child Element has been "adopted" by a new parent Element.

The underlying implementation of Adoption is discussed in greater detail below. From the author's perspective, Adoption is a simple process at authoring time. For example, referring to FIG. 2, the author can break its current link and create a new link with the link tool 365 on the tool palette 36 with another Element in the layout view window 320. Alternatively, the author can drag and drop the Element's icon to the icon representing its new parent Element in the Structure Window 33.

Authors also may desire to move a Behavior or other Modifier from within its parent Element or Behavior to another parent Element or Behavior. This process is referred to as "Transplantation." In other words, a Behavior or other Modifier, and its associated capabilities, are "transplanted" to a new Element or Behavior, which then acquires those capabilities. Transplantation also can be accomplished quite easily at authoring time, by dragging and dropping the icon representing the Behavior or Modifier from its old parent to its new parent, either in the Layout Window 320 or in the Structure Window 33.

Adoption and Transplantation are quite similar, both from the author's perspective and in view of the manner in which they are implemented, as is discussed in greater detail below. Both involve the transfer of an Element or Modifier to a new parent Element or Behavior. In other words, both involve the selective reusability of an Element or Modifier in new environments.

In a more refined embodiment, Adoption and/or Transplantation can be performed dynamically, at runtime. One author might, for example, desire to model certain gravitational forces that cause an Element "planet" orbiting another Element "star" to begin to orbit a new parent Element "rogue star" that passes nearby. Another author might desire to model a change in a person's behavior, in effect by transplanting a Behavior Modifier within the Element representing that person.

As is discussed in greater detail below with respect to the system's implementation, this process is quite similar whether performed at authoring time (referred to as "Edit Mode") or at runtime (referred to as "Runtime Mode"). Depending upon the nature of the Adoption or Transplantation the author desires (or perhaps desires to provide to the user), different functions can be accessed via the Component API.

Similarly, a programmer can, via the Component API, provide dynamic (runtime) instantiation of objects, such as Elements and Modifiers. This process, referred to as "Dynamic Creation," also is discussed below with respect to the system's implementation.

4. Object Authoring Interface.

Figure 6:
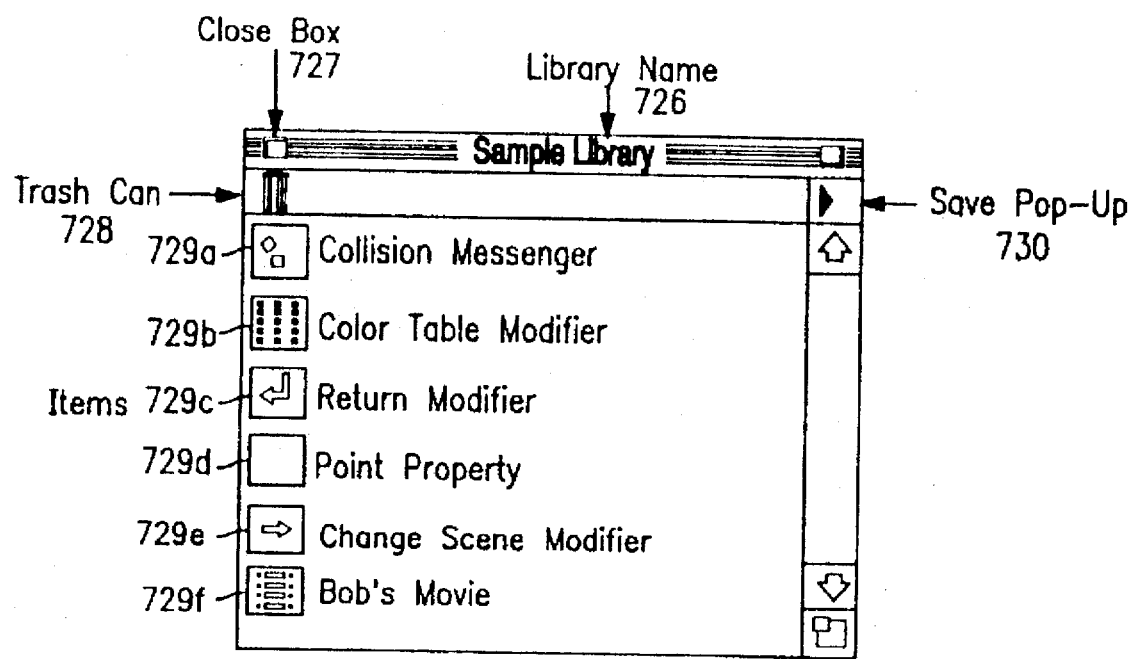
FIG. 6 is a screen display of showing a library window in the graphical user interface under one embodiment of the invention.
Figure 7:
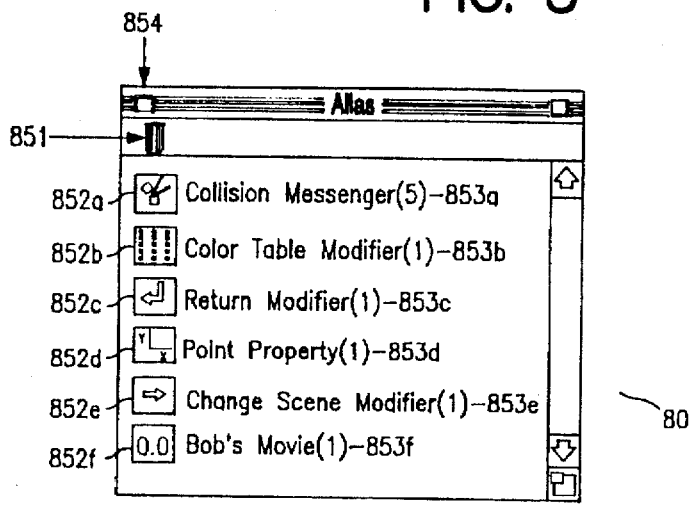
FIG. 7 is a screen display showing the alias palette of the graphical user interface under one embodiment of the invention.
Figure 8:
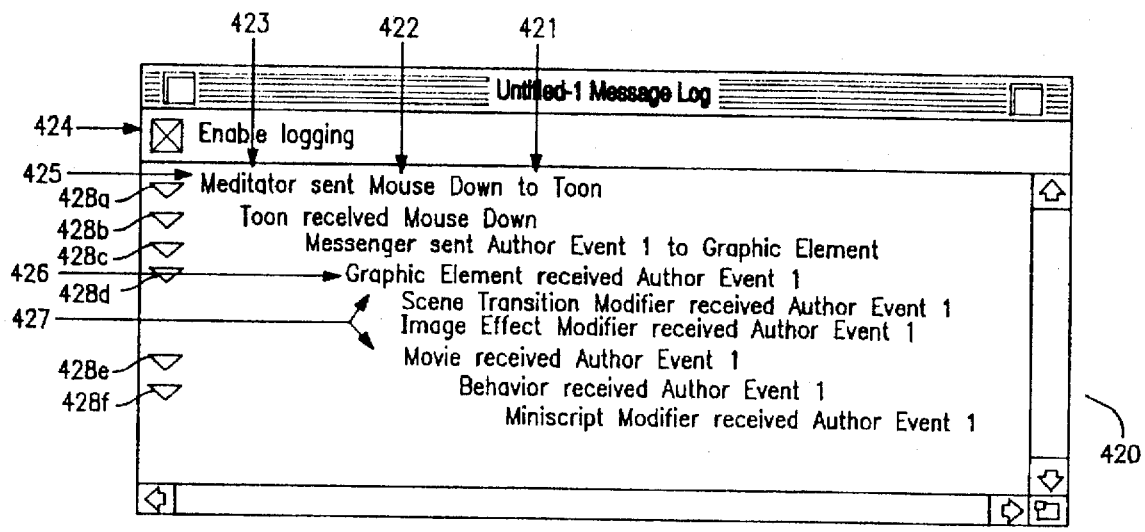
FIG. 8 is a screen display showing the messaging log window of the graphical user interface under one embodiment of the invention.

FIGS. 2–9 show some of the features of the object authoring interface. They include the layers view window 310 (FIG. 3), layout view window 320 (FIG. 2), structure view window 330 (FIG. 4), modifier palettes 35a and 35b (FIG. 9), tool palette 36 (FIG. 2), object information palette 37 (FIG. 2), menus 38 (FIG. 2), asset palette 70 (FIG. 5), alias palette 80 (FIG. 7), mToon editor windows 900, 910, 920 and 930 (FIG. 9), and messaging log window 420 (FIG. 8).

Figure 2:
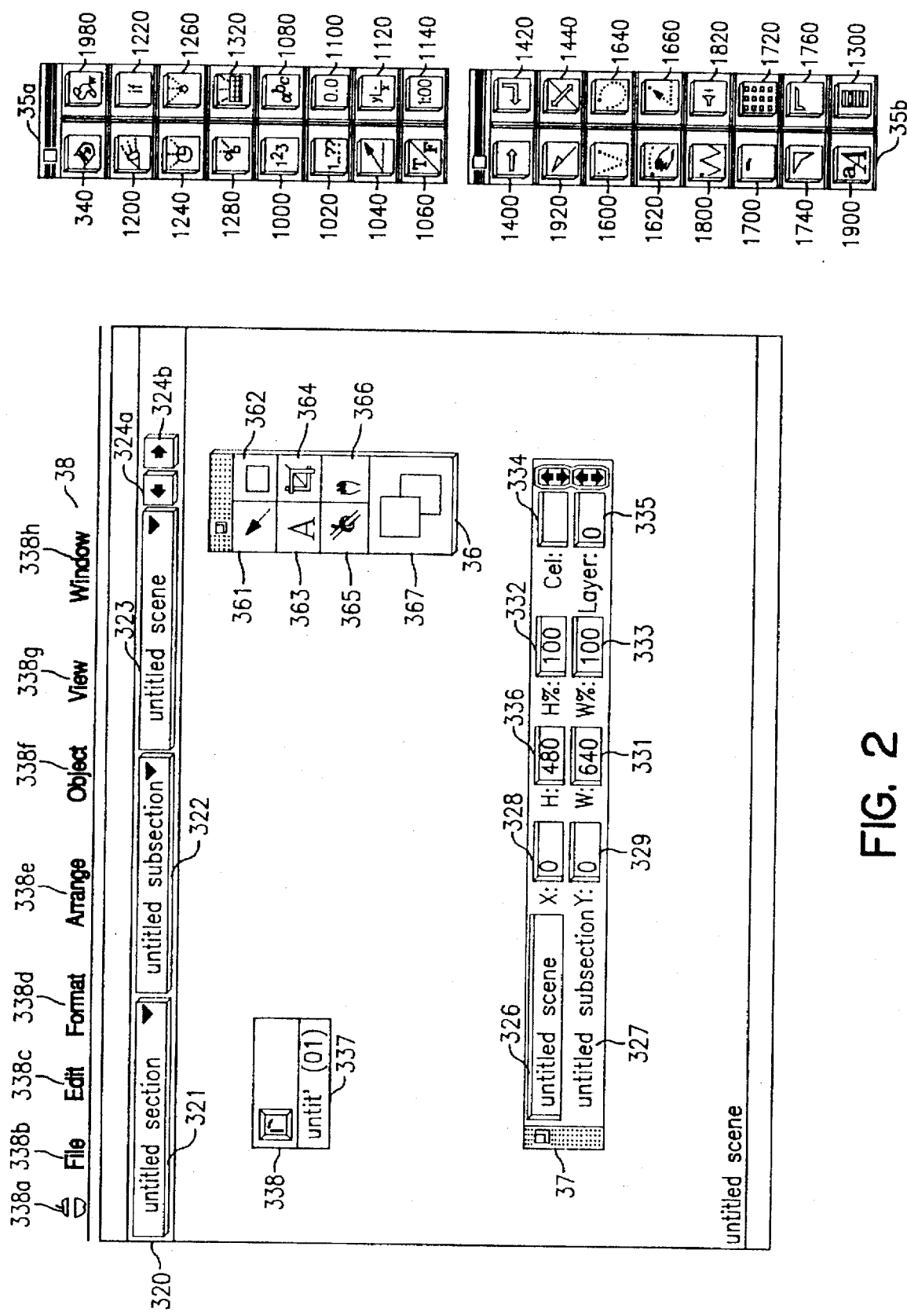
FIG. 2 is a screen display showing the layout view window, tool palette, object information palette and menus of the graphical user interface of the implementation of one embodiment of the present invention.

With reference to FIG. 2, the tool palette 36 is provided with a variety of functions, including: (i) a pointer 361 for selecting, clicking, dragging, scrolling, etc.; (ii) a graphic tool 362 for creating Graphic Elements; (iii) a text placeholder tool 363 for creating Text Elements; (iv) a cropping tool 364 to crop and link non-animated Graphic Elements; (v) a linking tool 365 for linking Elements into a parent/child relationship; (vi) a hand tool 366 to offset media within Elements, as well as (vii) a background/foreground color tool 367 for selecting the background and foreground colors of an Element.

The object information palette 37 displays an Element's position in x 328 and y 329 coordinates, size in x 336 and y 331 coordinates, scale in x 332 and y 333 coordinates, and other data related to a selected Element, such as the Element's name 326, the name of its parent 327, its layer order number 335 and, in the case of an mToon, its cel number 334. In the "Hierarchical Relative Positioning" embodiment discussed herein, the position of the Element is given relative to its parent.

The menus 38 allow access to all other functions not accessible otherwise from the present on-screen features. Menu 338a is the "Apple" menu under the Macintosh™ operating system with its well known features. The functions of the remaining menus are described below.

"File" menu 338b allows authors to create new Projects, libraries and mToons, to open existing Projects, to close windows, to save projects under the current or another name, to link Elements to media in a particular file or resources folder. Menu 338b further allows authors to break media links, to run a Project from either the start or from a given selection, to build a title from the current Project, or to quit the application.

"Edit" menu 338d allows authors to perform the usual undo, cut, copy, paste, clear, "select all" and duplicate functions, as well as create author messages and set application and Project preferences.

"Format" menu 338d allows authors to set font, font size, font style and text alignment characteristics for selected text.

"Arrange" menu 338e allows authors to align objects, to adjust their sizes, to move them completely forward or backward in the layer order, or incrementally so, as well as to adjust for any gaps in layer order created by such operations.

"Object" menu 338f allows authors to create new Sections, Subsections, Scenes, Graphic Elements, Sound Elements and Text Elements, to access the Element information dialog 950 (FIG. 10), to revert to the default size of an object, to lock an object's settings, to find items by name, as well as to make and break aliases.

"View" menu 338g allows authors to open the layout view window 320, the structure view window 330, the layer view window 310, the tool palette 36, the modifier palettes 35a and 35b, the alias palette 80, the asset palette 70, the object information palette 37 and the messaging log window 420. In addition, authors can use menu 338g to preview the effects of selecting different color tables, to show or hide Element frames, Modifier icons, object names, low resolution (draft) object images, the Shared Scene, as well as to synchronize all windows to reflect information for the same object.

"Window" menu 338h allows authors to access all currently open windows.

a. Layout View.

The layout view 32 is used to edit a Scene of a Project. Again with reference to FIG. 2, the basic operation of the layout view 32, through layout view window 320, is as follows. The layout view window 320 represents Projects at a Scene level, thus acting as a stage in which authors can arrange their Media Elements. To bring the appropriate Scene into the layout view window 320, pop-up menus 321, 322 and 323 are provided to navigate, respectively, among a Project's Sections, Subsections and Scenes. These pop-up menus 321, 322 and 323 also have "New Section", "New Subsection" and "New Scene" items, as an alternative to using Object menu 338f to create such Structural Elements. Back arrow 324a and forward arrow 324b are an alternate means of accessing the previous and next Scenes within the current Subsection. Forward arrow 324b is dimmed to indicate that the current Scene is the last Scene in the current Subsection. Shown within the content region of layout view window 320 is a Graphic Element 337 containing Graphic Modifier 338.

b. Layers View.

Figure 3:
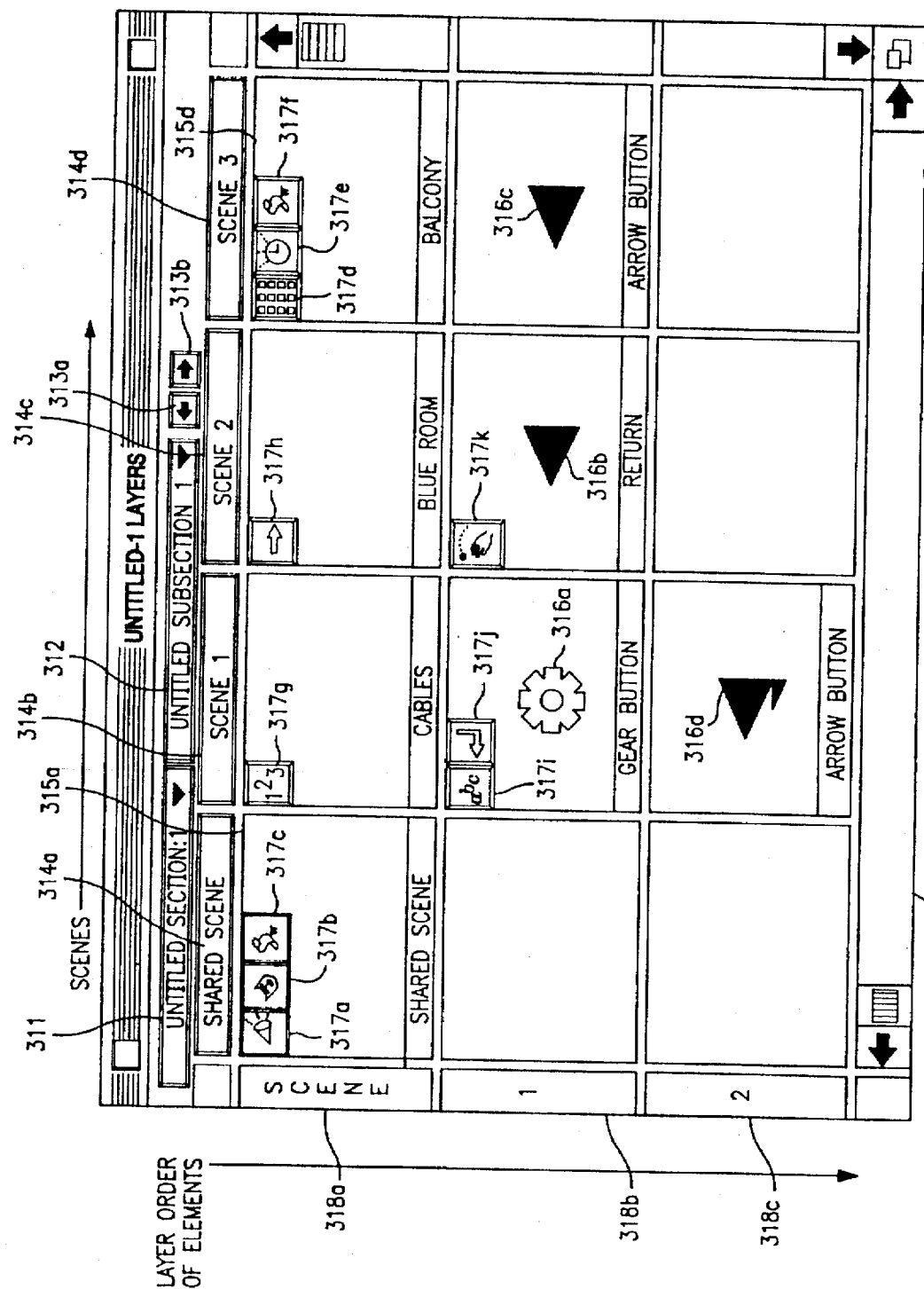
FIG. 3 is screen display showing the layers view window of the graphical user interface under one embodiment of the invention.

The layers view 31 is used to edit Projects a Section at a time through the layers view window 310. With reference to FIG. 3, the basic operation of the layers view window 310 is now described. The layers view window 310 presents a matrix of Media Elements, arranged by Scene order on the horizontal axis and layer order on the vertical. Layer order is the order in which Elements are drawn on the screen, meaning that a Scene is layer order 0, and all the Scene's contained Elements progress in increments of 1 therefrom. Layer order is particularly useful to create the illusion that the two dimensional (X,Y) screen has a depth (Z) dimension, an effect referred to as "2.5D." The layer order can easily be changed by dragging and dropping an Element over another Element, although this may also be accomplished through menus 38. Either way, the user performs such operations as bring to front (make layer order the highest), send to back (make layer order 1), bring forward (exchange layer order with next highest) or bring backward (exchange layer order with next lowest). Scenes are assigned layer order 0, which cannot be changed by the author, and are thus always in the background.

The layers view window 310 contains pop-up menus 311 and 312 that navigate among a Project's Section and Subsections, respectively, in a manner similar to the pop-up menus 321 and 322 of the layout view window 320. Furthermore, back and forward arrows 313a and 313b act to select Subsections much as arrows 324a and 324b navigate through Scenes in the layout view window 320.

Thus, in this example, one can see columns arranged horizontally for Shared Scene 314a, Scene 1 314b, Scene 2 314c and Scene 3 314d. Vertically, one can see rows for layer order 0 (Scene) 318a, layer order 1 318b and layer order 2 318c. Along row 318a, one can see the background pictures for the respective Scenes 315a, 315b, 315c and 315d, as well as four non-Scene Media Elements (Element 316a and 316d under Scene 1 315b, Element 316b under Scene 2 315c, and Element 316c under Scene 3 315d). Modifiers are also shown within Elements (with Modifiers 317a, 317b and 317c in Shared Scene 314a, Modifiers 317d, 317e and 317f in Scene 3 315d, Modifier 317g in Scene 1 315b, Modifier 317h in Scene 2 315c, Modifiers 317i and 317j in Element 316a, and Modifier 317k in Element 316c).

Elements and Modifiers can be dragged and dropped within layers view window 310. In particular, an Element's layer order can be modified easily by dragging and dropping it onto an Element in another layer, causing all Elements to be "pushed up" one layer higher.

c. Structure View.

The structure view 33 allows authors to move Elements and Modifiers throughout the Structural and Behavioral Hierarchies—i.e., across Projects, Subsections and Scenes, as well as within Elements and Behaviors. Structure view 33 generates and controls the operation of structure view window 330, shown in FIG. 4. The Structural Hierarchy is plainly evident in that Project "Untitled-1" 303 is at the top, with Section "untitled section" 304 immediately below and indented with respect to the Project 303 icon, Subsection "untitled subsection" 305 immediately below and indented with respect to the section 304 icon, Scene "untitled Scene" 306 immediately below and indented with respect to the Subsection 305 icon. In this instance the Scene 306 icon represents a Shared Scene, to which a Graphic Modifier 308 is attached. The Subsection 305 has another child Scene 307, being the actual first Scene, which is represented as equally indented as its sibling Scene 306. Under this Scene 307 is Media Element 300. Knobs 302a, 302b, 302c, 302d, 302e and 302f are used to reveal or conceal the objects beneath Elements 303, 304, 305, 306, 307 and 309, respectively, in the Structural Hierarchy. This is particularly useful for an author who wishes to concentrate on only part of the Project at a given time.

Changing the hierarchical relationship through the structure view window 330 is particularly simple. Elements may be dragged up and down and dropped into the Structural Hierarchy at will, subject to a few limitations. For example, a Media Element cannot be dropped directly into a Project, Section or Subsection. Similarly, Scenes cannot be dropped into to a Section or Project. In addition, only Modifiers can be dropped into Behaviors.

d. Asset Palette.

Figure 5:
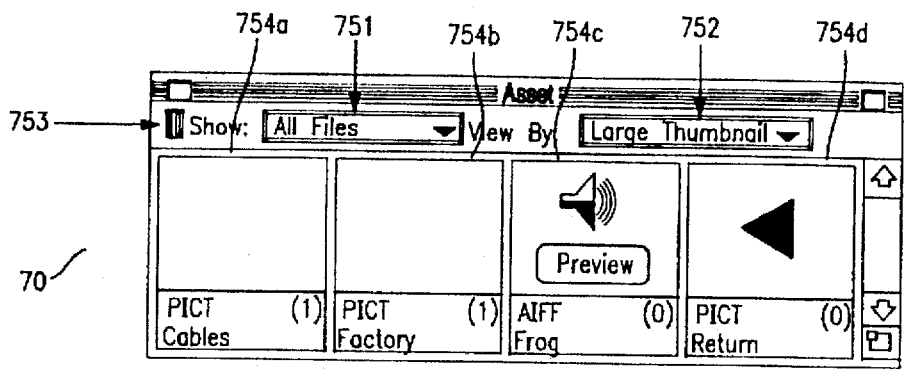
FIG. 5 is a screen display showing the asset palette of the graphical user interface under one embodiment of the invention.

The Asset Manager 7, operating through the Asset Palette 70, illustrated in FIG. 5, is a visual database of the media that have been linked to a Project. This palette makes linking, storing, and copying Graphic and Sound Elements easy and convenient. Each item can then be dragged and dropped onto Scenes from this central location. Each time a new asset is added to the Project, it gets added to the Asset Manager 7, which adds it to the Asset Palette 70 in a manner that is transparent to the author.

Once an asset is in the Asset Palette 70, it can be used by multiple objects in the Project. For example, a single animation file can be linked simultaneously to multiple Elements. Each Element can use this animation without regard to the other Elements. Each entry in the Asset Palette 70 includes an associated count of the number of objects which use that asset. When an asset is no longer in use (i.e. its count becomes zero), it still remains in the Asset Palette 70.

Each time the author performs a link to media, an asset appears in the Asset Palette 70. "Show" pop-up menu 751 displays media files by selected types (e.g., all types, all graphics types, PICTs, mToons, sounds, QuickTime™ movies, or color tables). "View" pop-up menu 752 displays assets either as icons or as small or large thumbnails. Trash can icon 753 allows authors to remove assets from the palette by dragging them to the trash can. There are multiple assets 754a, 754b, 754c, 754d shown here. For example, asset 754c is a sound, represented by a sound icon and having a preview button to allow the author to hear the sound.

e. Library.

Libraries offer a convenient place to store Elements and Modifiers for use across Projects. Authors can create multiple libraries, and can have more than one open at once. Authors can move Elements and Modifiers freely between any Project and any library. Any object, from a simple Modifier to an entire Scene, Subsection, Section, or Project (at any stage of development) can be dragged between libraries and Projects.

With reference to FIG. 6, the operation of a view 520 of one of the libraries 52 is shown. It includes the library's name 726, a close box 727, a trash can icon 728 which allows authors to remove items from the library by dragging them to the trash can, a "save" pop-up menu which allows authors to save the library to disk, and, as shown here, multiple objects 729a, 729b, 729c, 729d, 729e and 729f in the library.

f. Alias Palette.

An alias is a programming tool that enables authors to maintain identical settings across multiple Modifiers. When a Modifier is "aliased" initially, a master copy is placed in the Alias Palette 80. Authors can create additional aliases that refer to that master copy merely by duplicating any aliased Modifier. The advantage of using aliases lies in the fact that they are globally updatable. Changing the settings of one "instance" of an alias alters the settings of its master copy in the Alias Palette 80 and automatically updates the settings of each of the other instances of that alias throughout the Project.

Variables are good candidates for aliasing. For example, a game score can be stored and aliased. This Variable can then be strategically placed in Elements far apart in the Structural Hierarchy. Messengers and Miniscript Modifiers in these Elements can access and update their "local copy" of this Variable, which in turn will access the master copy, thereby ensuring synchronization across all "local copies" of this Variable. In this manner, various Elements, regardless of their location in the Structural Hierarchy, will have access to the updated score as the value of this Variable changes during the game. Breaking an alias causes the formerly aliased Modifier to become an independent Modifier, no longer updated when its former aliases are modified.

With reference to FIG. 7, Alias Palette 80, controlled by Alias Manager 8, includes a close box 854, a trash can icon 851 which allows authors to remove aliases from the palette by dragging them to the trash can, and, as shown here, multiple aliases 852a, 852b, 852c, 852d, 852e and 852f, with respective user counts 853a, 853b, 853c, 853d, 853e and 853f. The user count reveals the number of instances of such alias within the current Project. Thus, if a new alias is created, a new entry in the Alias Palette 80 is added. If a modifier is de-aliased or deleted, the corresponding user count on the Alias Palette 80 is decremented.

g. Messaging Log.

Messaging Log 42 allows authors to "debug" their Projects by maintaining for authors a log of particular messages sent to selected objects during Runtime execution. It displays these messages in messaging log window 420, as illustrated in FIG. 8.

The "Enable Logging" checkbox 424 displays the path of messages that have been passed to selected objects during a Runtime execution, such objects having been selected by the author through the structure view window 330. First, one sees a message 425 sent, specifying the sender 423, the message type 422 and the recipient 421. What follows is the chain of messages that arise from message 425. For example, message 426 caused, in particular, a chain to occur with received messages 427. Turn knobs 428a, 428b, 428c, 428d, 428e and 428f allow the corresponding message lines to be revealed or hidden, thereby allowing the author to concentrate on the area of interest. More refined embodiments could easily include other standard debugging features, such as breakpoints, stepped execution and examination of selected data, as are well known in the art.

h. mToon Editor.

An mToon is a continuous series of images compiled by the system into a single file. Any animation files created in a 3D program, or in a 2D animation program which has been saved as or converted to PICT or PICS files, can be imported to the mToon Editor 53 and processed as an mToon. mToons are cel-based and very flexible. In addition to being able to specify the playback rate and duration of an mToon, a selected cel or range of cels in the mToon can be specified for playback. These ranges can be dynamically set during Runtime, opening new creative possibilities to the multimedia author.

For example, the sitting, walking, and running motions of a rabbit can be compiled into a single mToon linked to an Element. During Runtime, Messengers or the Miniscript Modifier can be used to specify which cels of the animation to play back according to predefined conditions. Thus, mToons abstract physical action with frame-by-frame control.

The system maintains a link to the actual picture images that make up the individual frames of the mToon. Thus, if any of these images is updated, as verified by the system through the modification date, the system asks the user whether the mToon should be recreated with the new images. This "hot link" feature is ideal when additions or adjustments are made frequently to individual frames.

Authors can import single or multiple PICS or PICT files into the mToon Editor, and then edit, compress and save them as an mToon. Authors also can open and edit existing mToons in this window. Moreover, authors can define ranges of cels within each animation and name them as a subset of the mToon. In the current embodiment, these cel ranges are a sequential range of integers; however, there is nothing to preclude cel ranges from being completely discontiguous and in any order. Once defined, authors can access these ranges by name via Messengers or Miniscript Modifiers during Runtime.

Figure 9A:
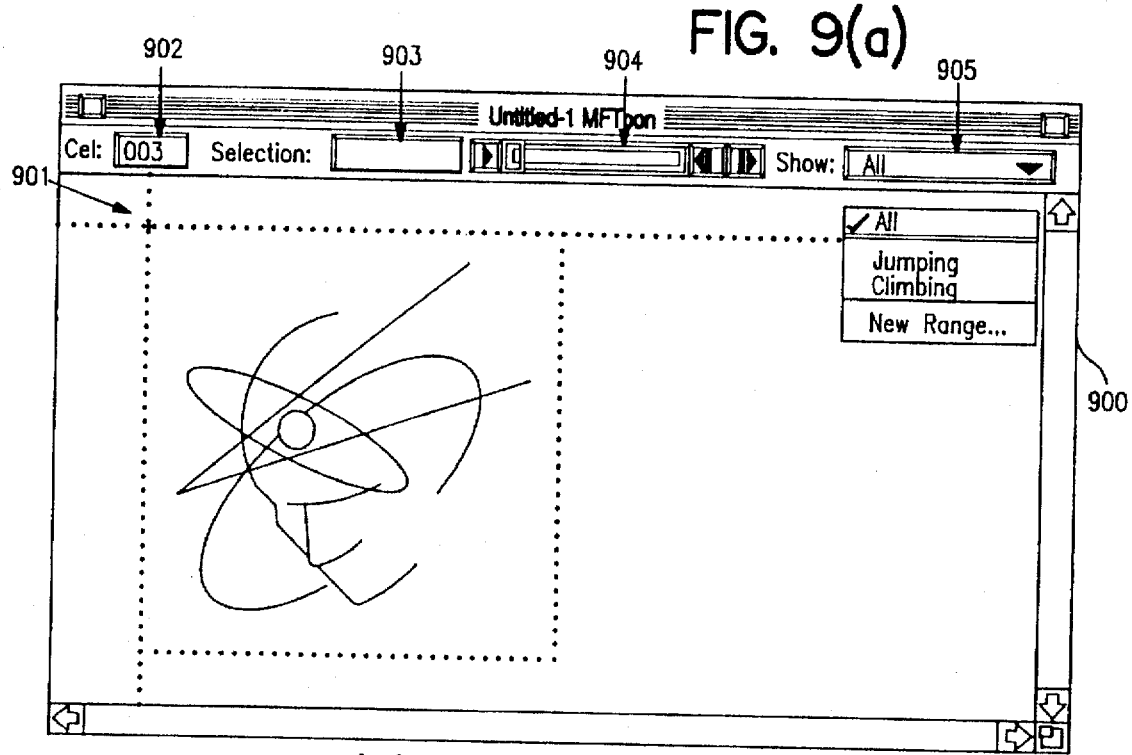

With reference to FIGS. 9(a)–(d), the operation of mToon editor 53 is shown. In FIG. 9(a), mToon editor window 900 is shown, having a registration point 901 which establishes the upper left corner of an inserted animation cel, a cel number field 902 which shows the number of the current cel, and a selection field 903 which displays the range of cels selected for editing. It has an mToon controller 904, which is used to preview the animation (which may assist the author in selecting a range of cels for editing), and has step buttons to step forward or backwards through the animation, cel by cel. Finally "show" pop-up menu 905 allows the author to select a specific range of cels, referenced by name to be played.

Figure 9B:
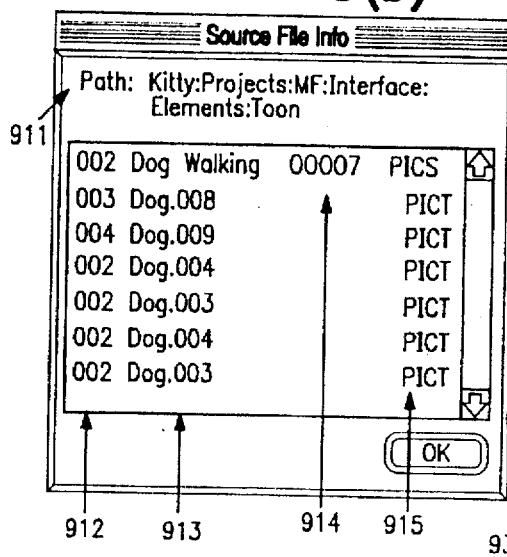

In FIG. 9(b), the mToon source file information dialog 910 is shown. Thus, the file path 911 is displayed, along with the cel numbers 912, the original file names for the cel contents 913, the index number 914, if any, when the cel is a PICS file, and the file format 915 (e.g. PICT, PICS).

Figure 9C:
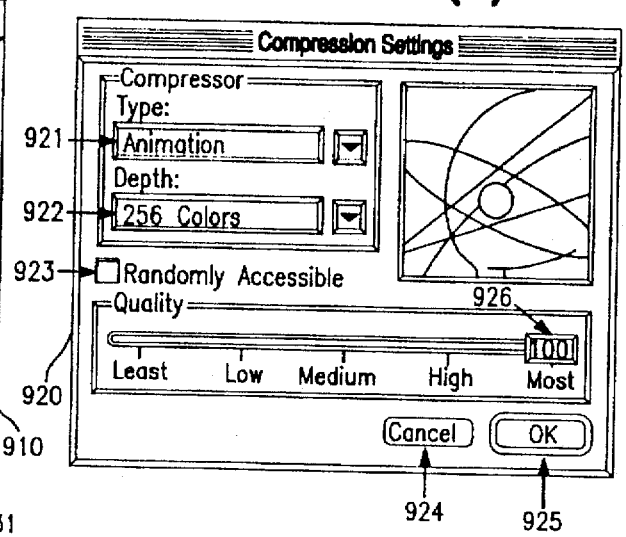

In FIG. 9(c), the compression settings dialog 920 is shown. The compression type pop-up menu 921 specifies the compression method to be used (e.g., none, Animation, Cinepak, Graphics, Photo-JPEG, or Video). The color depth pop-up menu 922 sets the number of colors used by an mToon, which defaults to 256. A "random access" checkbox 923 provides authors with random access to individual cels despite compression. This is necessary for an mToon to be played backwards or forwards, cel by cel, or at a constant speed. The compression quality slider 926 controls the quality of the chosen compression method, with lower quality imparting artifacts into the mToon.

Figure 9D:
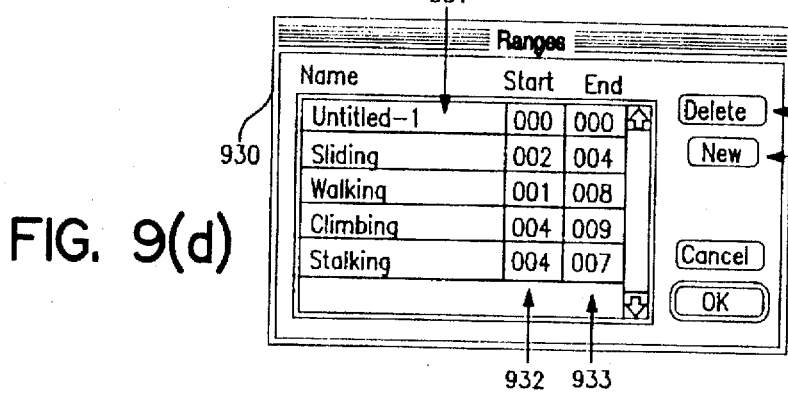

In FIG. 9(d), the ranges dialog 930 is shown. It permits the naming of sequences of cels, so that they may be accessed by name, as for example, by the Miniscript Modifier. The name field 931 shows the name assigned to the range; the start field 932 shows the cel number at the start of the range; the end field 933 shows the end; the delete button 934 allows a selected (highlighted) range to be deleted; and the "new" button allows a new range to be created.

i. Modifier Palettes.

With further reference to FIG. 2, modifier palettes 35a and 35b are shown. As discussed below, the system's extensible architecture enables programmers to create and insert additional Modifiers into the system, possibly necessitating additional modifier palettes. Each entry in a modifier palette allows an instance of a Modifier to be created and incorporated within (i.e., linked to the instance of a particular Element (Element, Scene, etc.) through a simple click, drag and drop procedure.

Modifier palettes 35a and 35b include (as discussed in greater detail below) icons for the behavior 340, the miniscript Modifier 1980, the MESSENGERS [(basic) 1200, if messenger 1220, timer 1240, border detection 1260, collision 1280, hypertext 1300 (at bottom right) and keyboard 1320]; the VARIABLES [integer 1000, integer range 1020, vector 1040, boolean 1060, string 1080, floating point 1100, point 1120 and time 1140]; the SCENE MODIFIERS [change Scene 1400, return 1420 and Scene transition 1440]; the MOTION MODIFIERS [simple 1600, drag 1620, path 1640 and vector 1660]; the VISUAL MODIFIERS [graphic 1700, color table 1720, gradient 1740 and image effect 1760]; the SOUND MODIFIERS [sound effect 1800 and audio fade 1820]; the style modifier 1900, and the cursor modifier 1920. The classification Modifier 1940 (FIG. 22) and set value Modifier 1960 (FIG. 23) are not shown.

j. Drag and Drop.

As will be discussed below, files containing code for Components (Modifiers and Services) may be added freely to the system by dragging and dropping them inside a special resource folder just as easily as instantiated Modifiers are dragged and dropped into Projects. As discussed herein, Elements and Modifiers may be freely dragged from window to window within a Project, or into libraries or other Projects.

5. Object Messaging.

The object messaging mechanism is integrated into the system so as to be accessible to authors via the configuration of Modifiers. Authors can use this mechanism to specify the manner in which their Elements and Modifiers will communicate with one another.

As is discussed in greater detail in the next section, authors can configure their Modifiers in Edit Mode to perform actions in response to messages received during Runtime Mode. These messages are created and sent either by the system itself or by a special type of Modifier known as a "Messenger" (i.e., any Modifier capable of sending a message).

Figure 13A:
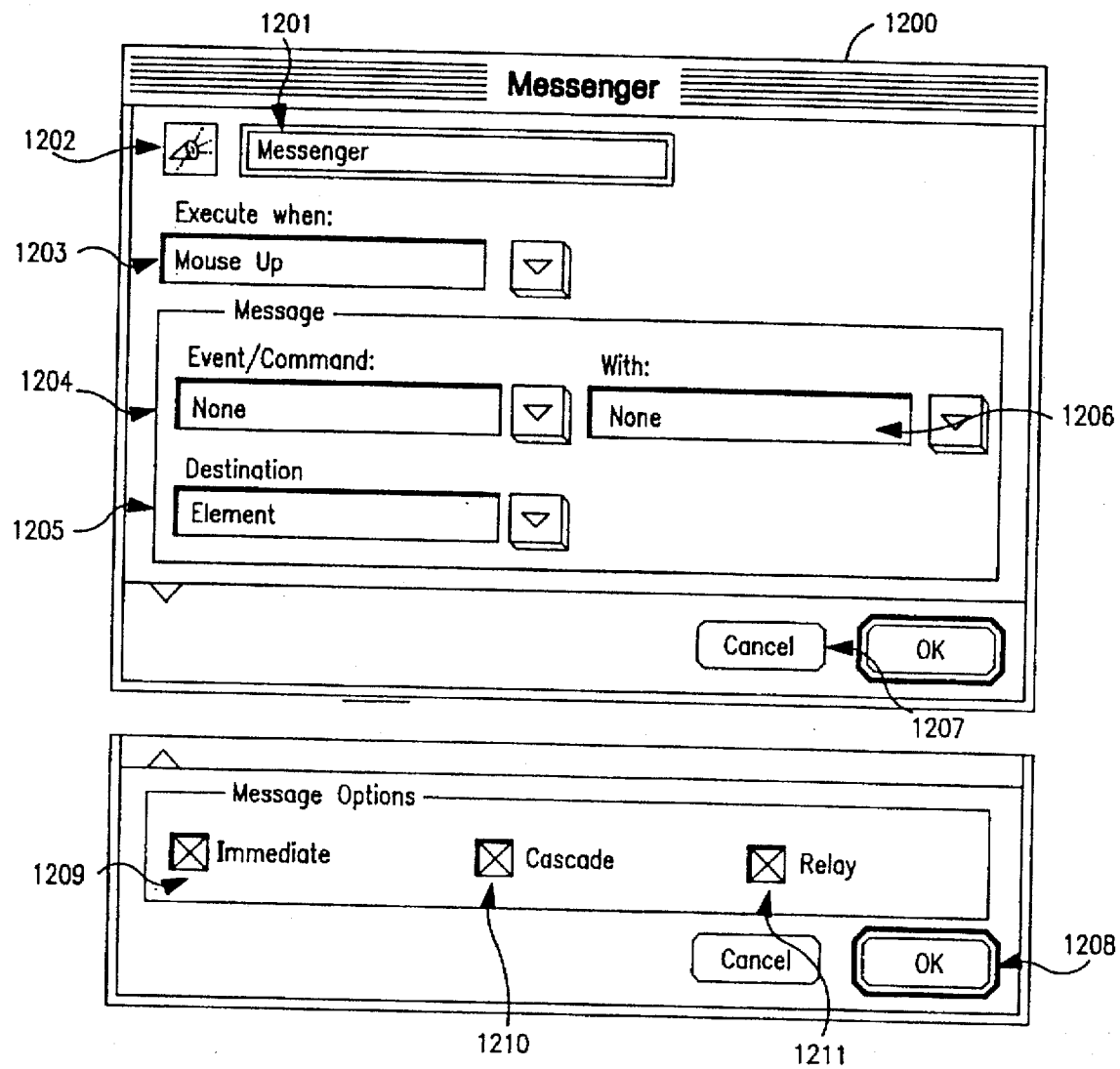

For example, during Edit Mode, an author could configure the simple Messenger Modifier 1200 depicted in FIG. 13(a) to respond to a "Mouse Up" message 1203. This message typically would be sent by the system during Runtime Mode when the user clicks on the Element containing this Messenger Modifier 1200. By configuring pop-up menu 1204 with a "Hide" message (a type of message known as a "Command," discussed below), the author will cause Messenger Modifier 1200 to respond to the "Mouse Up" message during Runtime Mode by sending the "Hide" Command to the Element, which in turn will cause the Element to hide itself from view. Thus, when the user clicks on the Element during Runtime Mode, it will disappear.

a. Categories of Messages.

In one embodiment, there are three general categories of messages from which authors can select to configure their Modifiers: (i) "Author Messages; (ii) "Environment Messages;" and (iii) "Commands."

Authors can configure their non-Variable Modifiers to respond to these messages by performing a particular action. Some Modifiers respond by triggering a single performance of an action (e.g., send a message), whereas others respond by enabling or disabling a continuous action (e.g., start or stop motion). Numerous other variations are possible when creating a Modifier via the Component API, as discussed in greater detail below with respect to the system's implementation.

(1) Author Messages.

Author Messages are messages created by an author and sent from a Messenger for the purpose of enabling, disabling or triggering other Modifiers. Authors can provide mnemonic names describing the purpose of a message, which typically is to notify other Modifiers that a particular "event" has occurred or that a particular "action" is desired.

It should be noted that reusability is enhanced to the extent the author specifies general "events," as opposed to desired "actions," as this makes fewer assumptions regarding the destination Modifier. For example, a message indicating that a "collision" occurred is more likely to be reusable than one requesting the destination Modifier to "beep." Some authors, however, may prefer more specific message names and be willing to sacrifice some degree of reusability.

As discussed below, Author Messages are (by default) "broadcast" from their specified destination down the Structural and Behavioral Hierarchies. This Hierarchical Message Broadcasting mechanism, as noted above, significantly enhances the reusability of Elements and Behaviors. This mechanism is discussed in greater detail below.

Authors can create and name Author Messages either from a special Messenger pop-up menu (described below) or from a dialog box generated by a menu item selected in Edit Mode. In either event, authors can provide mnemonic names describing the purpose of a message.

In addition to using the dialog box to create and name Author Messages, authors also can use this dialog box to create and name message "groups" and rearrange their Author Messages among these groups. By organizing Author Messages in this manner, authors can select an Author Message from an organized hierarchical list integrated into the Messenger pop-up menu. As a result, authors can limit their view to the particular Author Messages within any one group, thereby simplifying the authoring process. Other embodiments include multiple levels of "sub-groups" and "one-to-many" and "many-to-many" relationships between Author Messages and groups/sub-groups.

(2) Environment Messages.

Environment Messages are messages created and sent by the system to reflect changes in the state of the runtime environment, whether due to user events (e.g., depressing the mouse or a key on the keyboard), application events (e.g., a Scene change) or other internal state changes detected by the system (e.g., the "enabling" by the system of an object container). Upon detecting such an "environment event," the system sends an Environment Message to the appropriate Element in the Structural Hierarchy (e.g., "Mouse Up" to the Element clicked on by the user, or "Project Started" to the Project upon activation of the Project during Runtime Mode).

That message is then broadcast in a limited fashion solely to the Behaviors and other Modifiers within that destination Element. In other words, the message does not "cascade" to any child Elements contained within that destination Element, as described in greater detail below. Thus, such messages are broadcast down the Element's Behavioral Hierarchy, but not its Structural Hierarchy.

Authors also can configure a Messenger to send Environment Messages to any destination, even though the actual environment event represented by the Environment Message never occurred. In other words, the system provides authors with a mechanism to "fake" or simulate the occurrence of environment events.

For example, a "button" Element might contain a Modifier that emits a "click" sound when pressed (i.e., when the user releases the mouse button on that Element and the system sends a "Mouse Up" Environment Message to that Element). The author might want to simulate a user's mouse click in another situation (e.g., in an animated help screen showing the user how to activate that Element). By configuring a Messenger to send a "Mouse Up" Environment Message to the "button" Element at the desired time, the author can simulate that environment event and cause the "button" Element to respond exactly as it would had the user released the mouse button on that Element.

By default, Environment Messages sent by Messengers are (unlike those sent by the system) broadcast down the Structural as well as Behavioral Hierarchies. Thus, they are sent to all Elements and Modifiers, if any, contained within a destination Element or Behavior.

As will be discussed in greater detail below with respect to the system's implementation, many aspects of the Runtime environment are available during Edit Mode. In this regard, the system sends certain Environment Messages (not "visible" to authors) during Edit Mode to enable authors to see the effects of particular actions, such as setting the color and other graphic properties of an Element, without having to run their title.

(3) Commands.

A Command is a special type of message that automatically invokes one of an Element's inherent capabilities. If an Element does not have that particular capability, or is not an appropriate state to respond, the Command is ignored.

Unlike a Modifier that can be configured to respond only to particular Author or Environment messages, Elements cannot be configured to elect whether to respond to a Command. They respond automatically upon receiving a Command.

For example, a QuickTime™ movie Element inherently is capable of playing the QuickTime movie to which it is linked. Upon receiving a "Play" Command, the Element starts playing the movie. If, however, an author sends a "Play" Command to a Text Element, the Command is ignored because Text Elements do not know how to "play" media. Similarly, a QuickTime™ movie Element that already is in its "play" state (discussed below) will ignore a "Play" Command.

Commands are sent only by authors (via a Messenger pop-up menu, described below), and affect only Elements (i.e., they are ignored if sent to Modifiers). Unlike Author and Environment Messages, Commands are never broadcast. Once the destination Element responds to the Command, the Command is "deactivated" and is not passed down the Structural or Behavioral Hierarchies.

However, certain Commands cause Elements to change "state," which in turn causes the system to generate and broadcast a related Environment Message. For example, at any given time, an animation or movie Element may be in a particular state, such as "play," "stop," or "pause." A "Play" Command from a Messenger might cause an Element to transition from a "stop" or "pause" state to a "play" state. If so, the system detects this state transition and sends a "Played" Environment Message to the Element. That Environment Message sent by the system is broadcast down only the Behavioral Hierarchy, to all Behaviors and other Modifiers contained within the Element.

In this embodiment, the author cannot "fake" Environment Messages that are generated in response to an Element's state transition. Yet, given that the author configured a Messenger to send the Command that caused the system to generate this Environment Message, the "event" (i.e., the Element's execution of the Command) actually occurred, and therefore need not be "faked."

This state transition mechanism is described in greater detail below with respect to the system's implementation.

b. Parts of a Message.

As noted above, messages are sent only by the system and by Messenger Modifiers. From the author's perspective, they are sent by "name" and can be received by any Modifier configured to respond to that name.

When configuring a Messenger to send a message, the author also specifies a destination for the message and (optionally) some data to be sent along with the message. In addition, the author can alter a message's path after reaching its targeted destination (e.g., by restricting the broadcasting of an Author Message to the initial destination Element and its Modifiers).

These various parts of a message are described below in the context of the Messenger pop-up menus that are available to all Messengers. The data structures and other implementation details regarding these parts of a message are described in greater detail below with respect to the system's implementation.

(1) Message Name.

All non-Variable Modifiers typically are enabled, disabled, and/or triggered in response to a message. They therefore typically include one or more "Message" pop-up menus from which the author can select the name of the particular Author or Environment Message to which that Modifier will respond. Message pop-up menus do not include Commands because, as noted above, only Elements respond to Commands.

As is discussed in greater detail below, certain Modifiers contain multiple Message pop-up menus (e.g., one to enable an action and another to disable that action, or one to apply a particular effect and another to remove that effect). The programmer that creates the Modifier has, via the Component API, a wide range of "inherited" functionality from which to choose (including as many instantiations of Message pop-up menus as is desired).

When configuring a Messenger Modifier to send a message, however, the author typically will select that message from a "Message/Command" pop-up menu, which is similar to the Message pop-up menu, but also includes Commands (for sending to an Element). Typically, Messengers contain only one Message/Command pop-up menu for sending a single message. If multiple messages must be sent, the author simply can create a second Messenger that responds to the same message. In another embodiment, however, a programmer could create a Modifier capable of sending multiple messages using the Component API discussed below.

The Message and Message/Command pop-up menus are quite similar in nature, and therefore are discussed together with reference to Table I. From either menu, the author can select "None" (not shown) to indicate that no message is selected (to be sent or to invoke the Modifier). In addition, the author can create or select an Author Message from a hierarchical "Author Messages" menu item (also not shown) that lists all Author Messages used anywhere in the Project (organized by groups, as noted above). The system maintains this list of Author Messages and makes it available to Modifiers dynamically so that their Message and Message/Command pop-up menus automatically contain all Author Messages.

The remaining choices include Environment Messages (from either menu) and Commands (from the Message/Command pop-up menu only). As noted above, many Commands will cause an Element to change state, resulting in the generation of an Environment Message being broadcast throughout the Element. The Message pop-up menu therefore includes these Environment Messages in place of the corresponding Commands present in the Message/Command pop-up menu. Commands are italicized on the Message/Command pop-up menu for easy identification by the author.

For efficiency, the Environment Messages and Commands on both menus are illustrated together in Table I. The "Type" and "Message/Command" columns represent the two-level hierarchical nature of these menus. Commands are italicized in this table, as in the actual menus. Whenever the two menus differ, both the Environment Message (from the Message pop-up menu) and the corresponding Command (from the Message/Command pop-up menu) are shown with a "slash" between them. When the Message pop-up menu has no Environment Message corresponding to the Command on the Message/Command pop-up menu, the italicized Command is "greyed out" on the Message pop-up menu (not shown in this table) to indicate that it cannot be selected by the author.

TABLE I

ENVIRONMENT MESSAGES AND COMMANDS

| Type | Message/Command | Description |
|---|---|---|
| Mouse | Mouse Down | Environment Message sent in |
|  | Mouse Up | response to a user's mouse actions. |
|  | Mouse Up Inside |  |
|  | Mouse Up Outside |  |
|  | Mouse Over |  |
|  | Mouse Outside |  |
|  | Mouse Tracking |  |
|  | Tracked Mouse Outside |  |
|  | Tracked Mouse Back Inside |  |
| Element | Shown/Show | Environment Message/Command |
|  | Hidden/Hide | used to indicate that an Element has been (or "command" an Element to be) concealed or revealed |
|  | Selected/Select | Environment Message/Command |
|  | Deselected/Deselect | used to indicate that an Element's |
|  | Toggle Select | "selected" state has been (or "command" an Element's "selected" state to be) set or reset. Also Command to "toggle" that state |
|  | Edit Element | Command to Text Element to toggle |

TABLE I-continued

ENVIRONMENT MESSAGES AND COMMANDS

| Type | Message/Command | Description |
|---|---|---|
| | Edit Done<br>Update Calculated Fields | whether user allowed to enter or edit its text, and related Environment Message to indicate that user's text editing is complete. Also Command to update calculation of value of Variables inside text fields |
| | Scroll Up<br>Scroll Down<br>Scroll Left<br>Scroll Right | Command to move content of Element within its frame in a particular direction. An Integer Variable determines how far to move Element content (in pixels) |
| | Preload Element | Used to preload media file into RAM for optimal playback (only for PICTs, mToons and AIFF sounds) |
| Play Control | Played/Play<br>Stopped/Stop | Environment Message/Command used to indicate that a movie, animation or Sound Element has been (or "command" such an Element to be) played once, leaving last cel on screen (expept Sound), or stopped |
| | Play-Shown/Play-Show<br>Stop-Hidden/Stop-Hide | Environment Message/Command used to indicate that a hidden animation or still graphic has been (or "command" such an Element to be) played once/shown, leaving last cel on screen (except Sound), or stopped/hidden |
| | Paused/Pause<br>Unpaused/Unpause<br>Toggle Pause | Environment Message/Command used to indicate that a movie, animation or Sound Element has been (or "command" such an Element to be) paused or unpaused. Also Command to toggle the "paused" state of such an Element. |
| | At First Cel/<br>At First Cel<br>At Last Cel/<br>At Last Cel | Environment Message/Command used to indicate that an mToon animation Element has reached (or "command" such an Element to reach) its first or last cel |
| | Play Forward<br>Play Backward | Command used to cause movie or animation Elements to play forwards or backwards |
| Motion | Motion Started<br>Motion Ended | Environment Message to indicate that an Element's motion has started or ended |
| Transition | Transition Started<br>Transition Ended | Environment Message to indicate that an Element's transition has started or ended |
| Parent | Parent Enabled<br>Parent Disabled | Environment Message to indicate that the Modifier's parent object container has been enabled or disabled |
| Scene | Scene Started<br>Scene Ended<br>Scene Deactivated<br>Scene Reactivated | Environment Message to indicate that a Scene has been started, ended, deactivated or reactivated |
| Shared Scene | Returned to Scene<br>Scene Changed<br>Scene Time Expired<br>No Next Scene<br>No Previous Scene | Environment Message to indicate to a Shared Scene that control has returned to or changed from a Scene, or that time has expired within a Scene, or that, with respect to the current Scene, there is no previous or next Scene |
| Project | Close Title<br>Project Started<br>User Timeout | Command to close a Project or standalone "title" (i.e., quit Runtime Mode) and Environment Message to indicate that a Project has started or that the specified user timeout period has expired without the expected action by the user |
| Get/Set Attribute | Get/Set Height<br>Get/Set Position<br>Get/Set Width | Command to read or write PICT Attributes |
| | Get/Set Layer<br>Get/Set Text<br>Get/Set Layer | Command to read or write Text Element Attributes |
| | Get/Set Height<br>Get/Set Position<br>Get/Set Width<br>Get/Set Layer<br>Get/Set Cel<br>Get/Set Range<br>Get/Set Rate<br>Get/Set Paused | Command to read or write mToon animation Element Attributes |
| | Get/Set Height<br>Get/Set Position<br>Get/Set Width<br>Get/Set Layer<br>Get/Set Cel<br>Get/Set Range<br>Get/Set Rate<br>Get/Set Paused<br>Get/Set keyFrame<br>Get/Set Volume<br>Get/Set timeValue | Command to read or write QuickTime ™ movie Element Attributes |
| | Get/Set Rate<br>Get/Set Volume | Command to read or write Sound Element Attributes |
| | Get/Set masterVolume<br>Get/Set User Timeout | Command to read or write Project Element Attributes |
| Marks | Execute Marks<br>Begin Marks<br>End Marks | Command to execute a particular "mark" chosen by the author, or begin or end execution of all "marks" within an AIFF-formatted soundtrack linked to a Sound Element |

As is illustrated in Table I above, authors can configure their Modifiers to send or be invoked by a wide variety of Environment Messages and Commands (as well as create their own Author Messages).

For example, in this embodiment, authors can select Environment Messages representing: (i) the state of users' mouse movements (e.g., "Mouse Up," "Mouse Down," "Mouse Tracking," etc.); (ii) the state of a Media Element's "playing" of media (e.g., "Shown," "Hidden," "Paused," "Stopped," etc.) or its motion in the Scene (e.g., "Motion Started" or "Motion Ended"); (iii) the state of Structural Elements such as a Scene (e.g., "Scene Changed") or the entire Project (e.g., "Project Started"); and even (iv) the state of an Modifier's Parent object container (e.g., "Parent Enabled" or "Parent Disabled").

A wide variety of Commands also is made available to enable authors to access the inherent Attributes and capabilities of their Elements, including: (i) causing a Media Element to change its state of "playing" its media (e.g., "Show," "Hide," "Pause," "Stop," etc.); (ii) causing a Text Element to toggle its "editable" state (e.g., "Edit Element") or update calculations on Variables contained in its text field (e.g., "Update Calculated Fields"); (iii) causing a Sound Element to sync to "marked" locations within its linked soundtrack (e.g., "Execute Marks"); (iv) causing an Element to preload its linked sound or animation for optimal playback (e.g., "Preload Element"); and (v) causing an Element to read or write its various Attributes (e.g., "Get Cel" of an animation or movie, "Set Position" of any Graphic Element, "Get Master Volume" of the Project, etc.).

As is apparent from the above discussion, another embodiment of this system could make virtually any internal state transition or event known to the system available to authors as an Environment Message, as well as any additional Commands to which Elements are capable of responding.

(2) Message Destination.

When configuring a Messenger to send a message, authors must specify a "destination" Element or Modifier to which that message will be sent initially. As noted above (and discussed in greater detail below with respect to the message path), the message may propagate further and be "broadcast" down the Structural and/or Behavioral Hierarchies.

In any event, authors specify their desired message destination by configuring their Messenger's Destination" pop-up menu, illustrated below in Table II. Using a mechanism referred to as "Relative Targeting," an author can specify a "relative" destination in the Structural and Behavioral Hierarchies—e.g., any object container containing that Messenger, including "Project," "Section," "Subsection," "Scene," "Element's Parent" and "Messenger's Parent." This mechanism provides the author with a significant degree of reusability of that Messenger.

For example, by specifying "Parent" as the destination for a message sent by a Messenger, the author can use that Messenger inside a different object container (i.e., another Element or Behavior) without modification. It will always send that message to its "Parent" object container.

Authors also can specify the "Next Element" and "Previous Element," which are siblings of the Element containing the Messenger. This too is a form of Relative Targeting, in that the destination Element is not determined precisely at authoring time. Instead, it is determined at Runtime relative to the Messenger's position in the Structural and Behavioral Hierarchies.

Authors also can specify certain destinations known to the system during Runtime Mode, such as the "Active Scene," the "Shared Scene," and the "Sender's Parent." These too are a form of Relative Targeting, in that these destinations are determined based upon the state of the runtime environment.

An author also may employ "Direct Targeting" to select, as a message destination, particular Elements or Modifiers made available to the author based upon the system's knowledge of the Structural and Behavioral Hierarchies (e.g., "Messenger's Siblings" or "Element's Siblings"). In this case, however, the author selects the actual name of a particular Element or Modifier, and thus targets that Element or Modifier directly. During Runtime Mode, the message will be sent to that particular Element or Modifier (provided that the system can still locate that Element or Modifier).

Both the Direct Targeting mechanism (in which the system resolves the destination name into an "ID" during Edit Mode) and the Relative Targeting mechanism (in which the system resolves the destination "name" dynamically at Runtime) are described in greater detail below with respect to the system's implementation.

TABLE II

| MESSAGE DESTINATIONS | |
|---|---|
| Destination | Comments |
| Project | Message sent initially to Project Element containing Messenger |
| Section | Message sent initially to Section Element containing Messenger |
| Subsection | Message sent initially to Subsection Element containing Messenger |

TABLE II-continued

| MESSAGE DESTINATIONS | |
|---|---|
| Destination | Comments |
| Scene | Message sent initially to Scene Element containing Messenger |
| Element's Parent | Message sent initially to Parent of Messenger's "Parent Element" |
| Messenger's Parent | Message sent initially to Messenger's Parent object container (Element or Behavior) |
| Next Element | Message sent initially to Element "next in line" (in the Structural Hierarchy) after Messenger's "Parent Element" |
| Previous Element | Message sent initially to Element "previously in line" (in the Structural Hierarchy) before Messenger's "Parent Element" |
| Active Scene | Message sent initially to Active Scene (visible to user at time message is sent) |
| Shared Scene | Message sent initially to Shared Scene (visible to user at time message is sent) |
| Source's Parent | Message sent initially to Parent object container of the "source" Messenger (i.e., the Messenger that sent the message which invoked the Messenger sending this message) |
| Messenger's Siblings (DIRECT TARGETING) | Message sent initially to actual Modifier selected by name from submenu (containing Messenger's siblings) |
| Element's Siblings (DIRECT TARGETING) | Message sent initially to actual Element selected by name from submenu (containing siblings of Messenger's "Parent Element") |
| Parents (DIRECT TARGETING) | Message sent initially to Element or Behavior selected by name from submenu (containing Messenger's ancestors) |

(3) Message Data.

In addition to specifying the message name and destination in the Messenger's dialog box, authors also can configure Messengers to include certain data with their message. Authors specify such data using the "With" pop-up menu, discussed below.

Authors can avoid this option entirely by selecting "None" from the With pop-up menu. Authors also can select "Enter Value" which generates a dialog box containing a field into which authors can enter any desired value. By selecting "Incoming Value," this Messenger will "pass on" to the destination the data received with the message that invoked this Messenger. The system determines the value of such data dynamically during Runtime Mode.

Finally, authors can select any Variable shown on the With pop-up menu. All Variables within the Messenger's "scope" are included. As discussed above with respect to Hierarchical Variable Scoping, a Variable is accessible to all descendants of its parent object container. Thus, the Messenger can access any Variable whose parent object container also contains that Messenger.

(4) Message Path.

As noted above, Author Messages and Environment Messages sent by Messengers will, by default, be "broadcast" to all objects, if any, contained within that destination Element or Modifier (i.e., they will propagate from the destination down both the Structural and Behavioral Hierarchies). The only exception is a "switchable" Behavior which, when switched off, prevents further broadcasting of a message to its child objects. As a general rule, Environment Messages sent by the system will be broadcast solely to Behaviors and other Modifiers within the destination Element. Certain Environment Messages, however (e.g., "Scene Started" and "Parent Enabled") are of sufficient interest to most Elements to merit being broadcast down from the Scene. Commands, on the other hand, are sent initially to an Element (or else ignored) and will propagate no further. Authors can modify the default message path of the messages they send via Messengers, as discussed below.

(a) Broadcasting of Messages.

Hierarchical Message Broadcasting, as discussed above, involves the traversal of the Structural and Behavioral Hierarchies in an order determined by the order of the objects as represented in the Structure View Window (see, e.g., Structure View Window 330 in FIG. 2), initially determined by the order in which such objects were created. Authors can modify this order by "dragging and dropping" icons within the Structure View Window 330.

For example, the message is broadcast first down the Behavioral Hierarchy of the Element or Behavior object container—i.e., to all child Behaviors and other Modifiers of that Element or Behavior. By default, it is sent from Modifier to Modifier within the Behavioral Hierarchy. At any given level, the order is determined, as noted above, by the order in the Structure Window. Upon reaching a Behavior, it is sent down to the child Behaviors and other Modifiers contained within that Behavior. Upon reaching a non-Behavior Modifier, it is sent to a sibling Behavior or other Modifier (if any), and so on. Even if a particular Modifier responds to the message, the message is "relayed" to the next Modifier in the Behavioral Hierarchy until all Modifiers within the original Element or Behavior object container have received the message.

Of course, if the original destination was a non-Behavior Modifier, no further propagation of the message would occur. Yet, if the original destination was an Element, the message would, by default, "cascade" down the Structural Hierarchy to the child Elements contained within that Element. The message would be sent down the Behavioral Hierarchy of each such child Element as discussed above, and then propagate to the next child Element until all Elements (and objects contained within them) within the original Element object container have received the message.

Thus, as noted above, Author and Environment Messages sent by Messengers are, by default, broadcast down both the Structural and Behavioral Hierarchies. Authors may, however, configure a Messenger to limit or optimize this default path to avoid unnecessary (and perhaps undesired) message traffic or otherwise minimize potential performance bottlenecks.

(b) Immediate.

As is discussed in greater detail below with respect to the system's implementation, messages are delivered to Elements and Modifiers in "threads" of execution during Runtime Mode. Despite the message dispatching efficiencies that result from routing messages along the Structural and Behavioral Hierarchies, an author can impact system performance in certain situations, for example, by broadcasting a message to a large number of Elements and Modifiers.

In this regard, authors are provided with an option to configure a Messenger to postpone the default "immediate" processing of the message sent by that Messenger until after the current "chain of activities" has concluded. In other words, rather than process this message "immediately" as it is encountered, the system can complete its more time-critical tasks and wait until an "idle" cycle to process this message.

(c) Cascade.

Another mechanism provided to the author to optimize performance is the option to configure a Messenger to limit the default broadcasting of a message sent to an Element object container to the Behavioral Hierarchy within that destination Element. In other words, the message will not "cascade" to child Elements within the destination Element. It will be processed in a manner similar to that of Environment Messages sent by the system. This feature will be illustrated in the snake example discussed below.

(d) Relay.

A final mechanism provided to the author to optimize performance is the option to configure a Messenger to limit the default broadcasting of a message to the first Modifier that is configured to respond to that message. In other words, once a Modifier responds to the message, the message will not be "relayed" to another Modifier and will not "cascade" to another Element. It will just stop.

6. Object Configuration.

a. Elements.

Each Element is a state machine, and in the current embodiment, has six states: (i) initial (construction); (ii) begin play; (iii) play; (iv) end play; (v) duration (what to do after play); and (vi) last (destruction). Not all these states have any particular meaning when connected with various media. For example, for a PICT, there really only is the play state. End play might signify releasing a cached bitmap.

The author configures a Media Element through the Element configuration dialog 950 as shown in FIG. 10. Dialog 950 includes the Element title 951 and Element type icon 952 (showing that the Element is either an unlinked Graphic Element or linked to a PICT, mToon, QuickTime™ movie, Text Element, or Sound Element in AIFF or snd format), and source file path 953. There are a variety of check boxes to configure the initial state. Thus, "Hidden" checkbox 954 determines whether the Element is initially hidden at Runtime, "Paused" checkbox 955 determines whether movies, mToons and sounds are initially paused. "Loop" checkbox 959 determines whether an mToon will continue replaying. "Back and Forth" checkbox 960 determines whether the mToon is played backwards after being played forwards (before possibly repeating itself in accordance with "Loop" checkbox 959). "Mute" checkbox 964 determines whether a sound is initially muted. Also data entry area 963 allows one to override a sound file's original volume.

Other options are configured through the "Play Every Frame" checkbox 956 (which overrides QuickTime's feature of dropping frames to ensure sound synchronization), the "Cache Bitmap" checkbox 957 (which converts the Element's screen display format to a bitmap, obviating the need to perform the complex instructions which created such display) and the "Direct to Screen" checkbox 958 which overrides layer order and draws the Element on top of at/others. Finally, the data entry area 962 allows the mToon rate to be adjusted and the data entry area 961 allows the layer order number to be adjusted.

b. Modifiers.

The primary means for "modifying" an Element's inherent characteristics is provided by Modifier configuration dialogs. As was discussed above, little or no scripting or programming is required; rather, it is a visually-driven authoring environment.

Each of the Modifiers has its own configuration dialog. The types of data present in such dialogs reflect the information required to properly configure the modifier. Thus, it is useful to understand how to "program" the Modifiers—Behaviors, Variables and Capabilities.

(1) Behavior.

The Behavior, by containing additional Behaviors and other Modifiers, acts as the structural backbone of the Behavioral Hierarchy. As such, the Behavior view 34 produces, with reference to FIG. 11, a dialog box 340 to configure and display various data items thereof. The Behavior dialog box 340 includes a name field 343, a modifier icon 344, an "enable when" pop-up menu 345 for specifying an enabling message, and a "disable when" pop-up menu 346 for specifying a disabling message. Also included are a "clean up" button 341, a switch check box 342, a set of message lines 347a, 347b, 347c, 347d, as well as a set of contained Modifiers 348a, 348b, 348c, 348d, 348e. The switch check box 342 is used to allow an author to enable and disable the Behavior via the enable and disable pop-up menus 345 and 346.

The enabling and disabling messages thus specify an operational "window" for the Behavior. The name field 343 can represent, as a mnemonic aid, the Behavior's conceptual function (e.g., "steering" Behavior). The Modifier icon 344 represents the Modifier type (in this case, Behavior). Each of the contained Modifiers 348a, 348b, 348c, 348d, 348e are represented by their name, icon and ordinal number (the number in parentheses), which is the order in which each of the Modifiers is executed within the Behavior. By default, these ordinal numbers are the creation order of the contained Modifier, but can be overridden by a special pop-up menu (not shown). These Modifiers may be rearranged around the dialog box 340 by clicking and dragging. The "clean up" button 341 serves to automatically rearrange the contained Modifiers according to their messaging order. The message lines 347a, 347b, 347c and 347d represent the messages to and from the contained Modifiers 348a, 348b, 348c, 348d, 348e.

Thus, for example, Modifier 348d is enabled by the mouse tracking message 347a, represented by the vertical arrow pointing to the Modifier, and sends an update Element message 347d, represented by the vertical arrow pointing to the message line. In the embodiment discussed here, a purple arrow is used to represent a message emanating from a contained Modifier, a green arrow is used to represent a message received by a contained Modifier that executes, applies or enables that Modifier, and a red arrow is used to represent a message received by a contained Modifier that terminates, removes or disables that Modifier. Thus, in this example, one can see that messenger modifiers 348c and 348d are each responsible for creating the "Update Element" message 347d, which serves to enable Miniscript Modifier "Calculate Element Specs" 348e.

(2) Variables.

Variable Modifiers store values, such as numbers and strings. These values can be configured to act as variables (changeable values) or constants (non-changeable values). These values may be referenced by Messengers and sent with messages. In addition, authors can write scripts using the Miniscript Modifier to reference and modify these values as well as include them with messages.

The location of a Variable within the Structural and Behavioral Hierarchies determines its scope; that is the group of objects which can access that Variable. Put simply, a Variable is accessible to all descendants of its parent. For example, a Variable placed on a Section is available to any Modifier on the Section, and all other descendants of that Section.

A Variable whose parent is the Project is called a global. Global Variables can be accessed by any appropriate Modifier in the entire Project. A "special-purpose" scope may be created through aliasing, as was discussed above.

Variables are either simple or compound. Simple Variables store a single value, whereas compound Variables store at least two values. For example, an integer Variable stores a single integer, so it is a simple Variable. On the other hand, a point Variable scores two values (the x and y coordinates), so it is a compound Variable.

With reference to FIGS. 12(a)–(h), the dialog boxes for the various Variable Modifiers (integer 1000, integer range 1020, vector 1040, boolean 1060, string 1080, floating point 1100, point 1120 and time 1140) each respectively includes a title 1001, 1021, 1041, 1061, 1081, 1101, 1121, 1141; icon 1002, 1022, 1042, 1062, 1082, 1102, 1122, 1142; "Cancel" button 1004, 1024, 1044, 1064, 1084, 1104, 1124, 1144; and "OK" button 1005, 1025, 1045, 1065, 1085, 1105, 1125, 1145. The "Cancel" button is used to discard any editing changes, while the "OK" button commits such changes to memory.

(a) Integer.

Figure 12A:
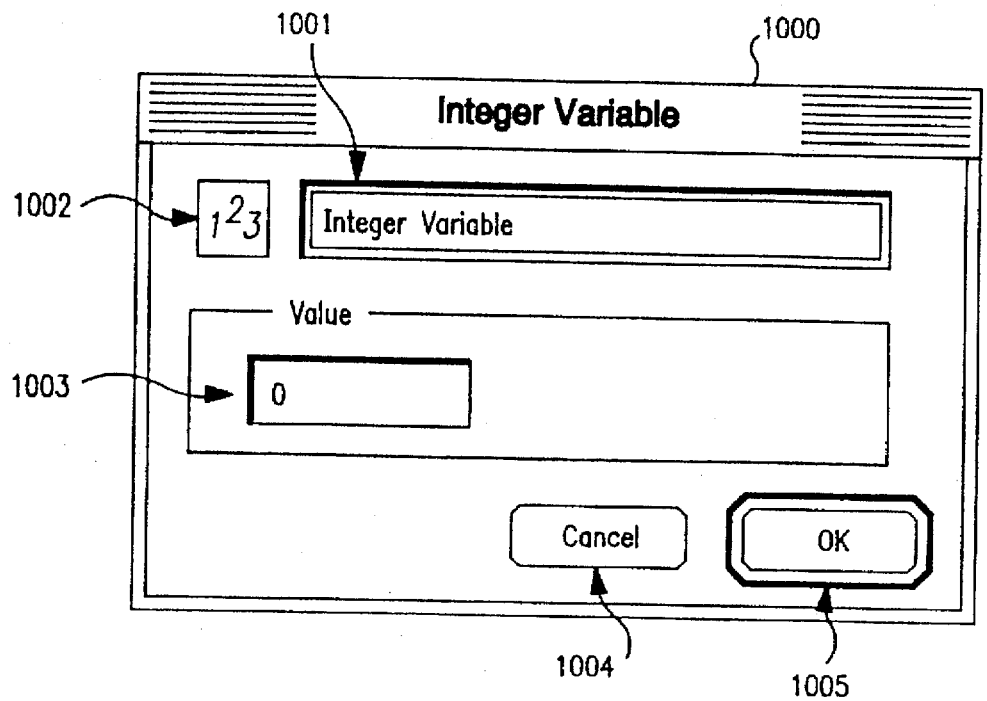

An Integer Variable is used to store an integer value (e.g., 7). Integer Variables range in value from −32767 to 32767. In FIG. 12(a), one can see a data entry area 1003 comprising an entry position for an integer.

(b) Integer Range.

Figure 12B:
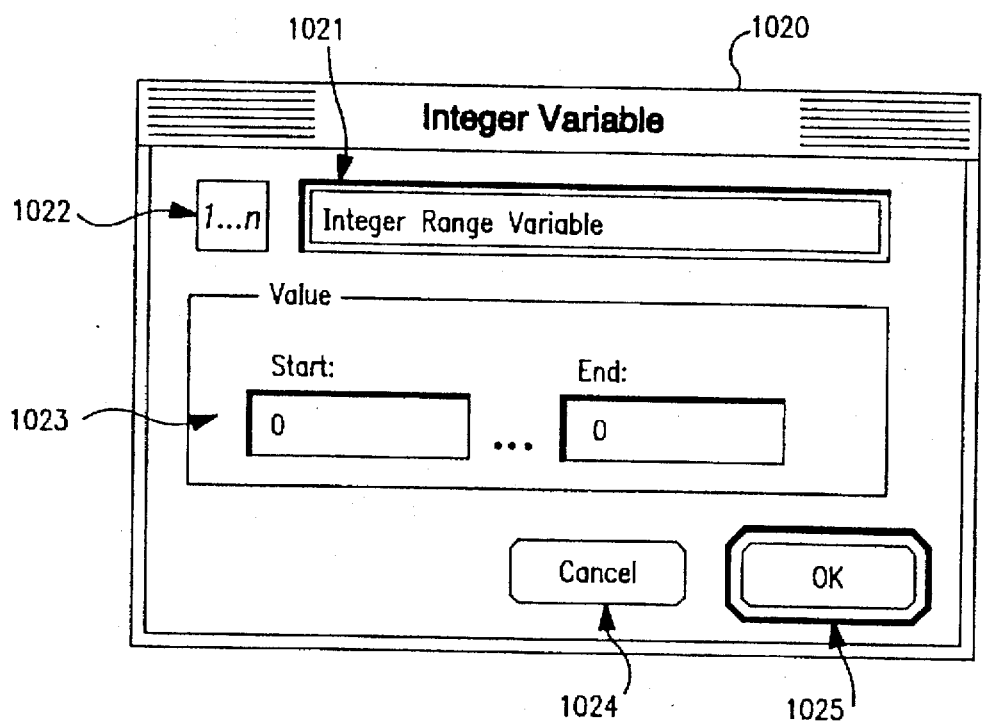

An Integer Range Variable is used to store an integer range value (e.g., 4 . . . 8). In FIG. 12(b), one can see a data entry area 1023 comprising an entry position for two integers, the starting integer of the range and the ending integer of the range.

(c) Vector.

Figure 12C:
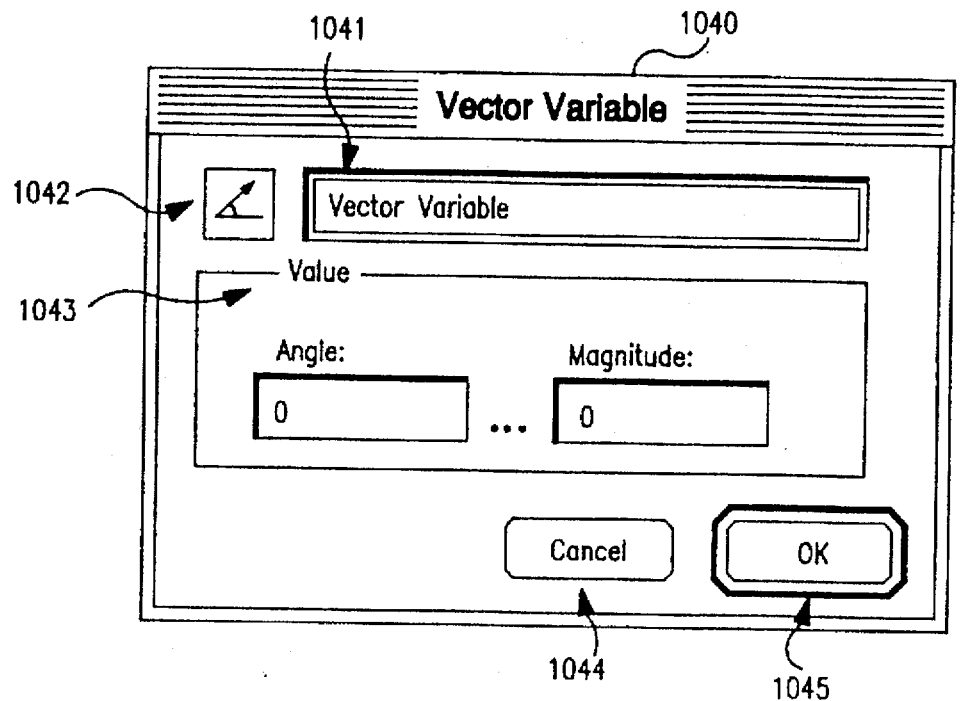

A Vector Variable is used to store vector values in degrees (angle) and inches per second (magnitude). In FIG. 12(c), one can see a data entry area 1043 comprising an entry position for an angle, and one for a magnitude.

(d) Boolean.

Figure 12D:
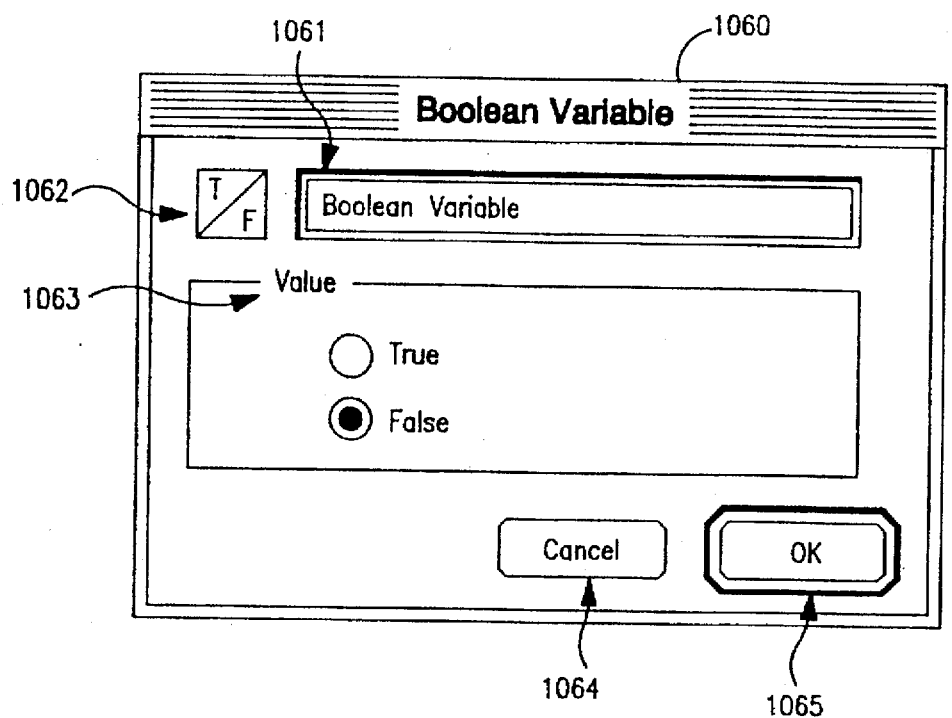

A Boolean Variable stores a true/false value. In FIG. 12(d), one can see a data entry area 1063 comprising two radio buttons, one for true and one for false.

(e) String.

Figure 12G:
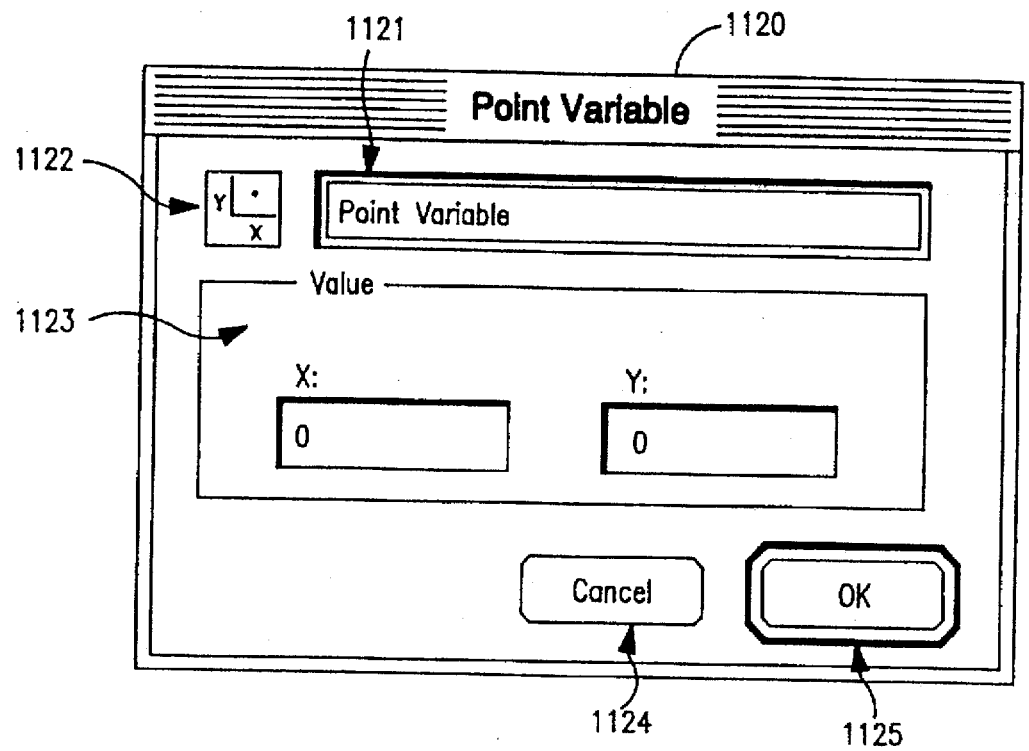
Figure 12H:
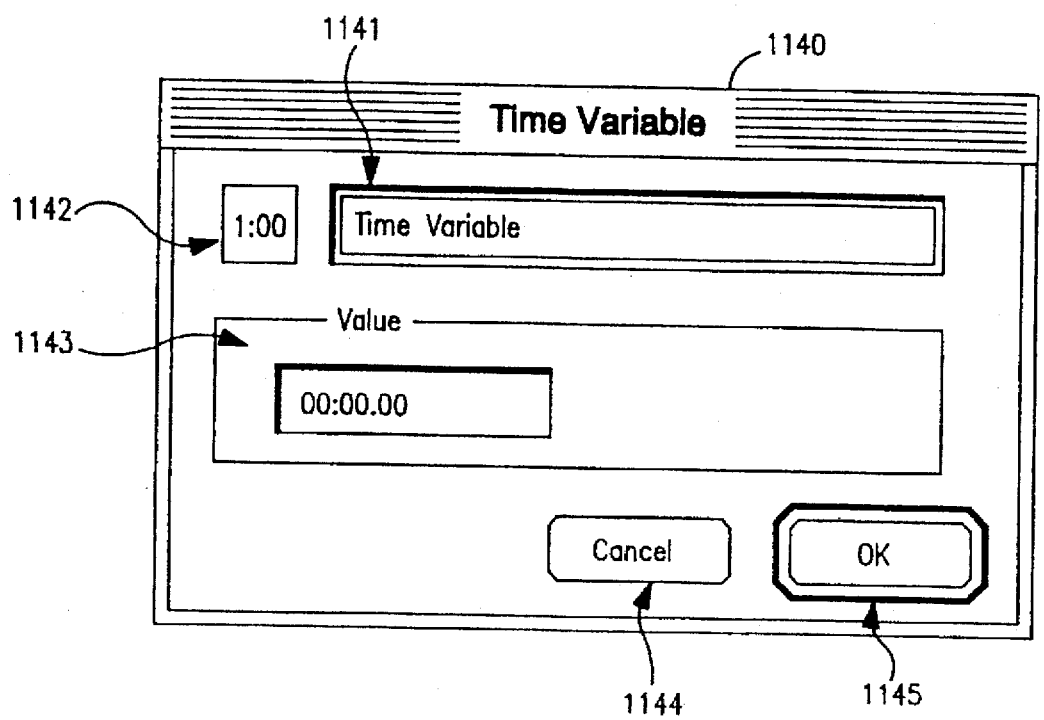
Figure 12E:
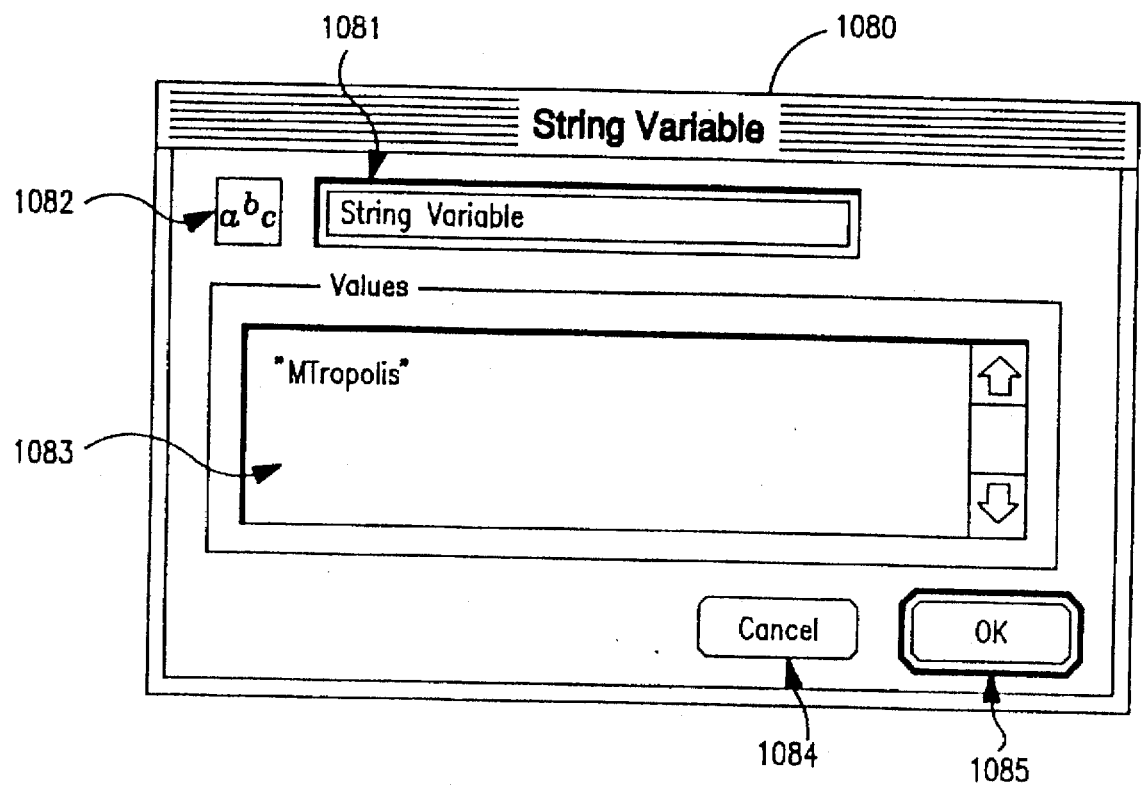

A String Variable stores a string (e.g., "Bob Brown"). In FIG. 12(e), one can see a data entry area 1083 comprising an entry position for a string of up to 255 characters.

(f) Floating Point.

Figure 12F:
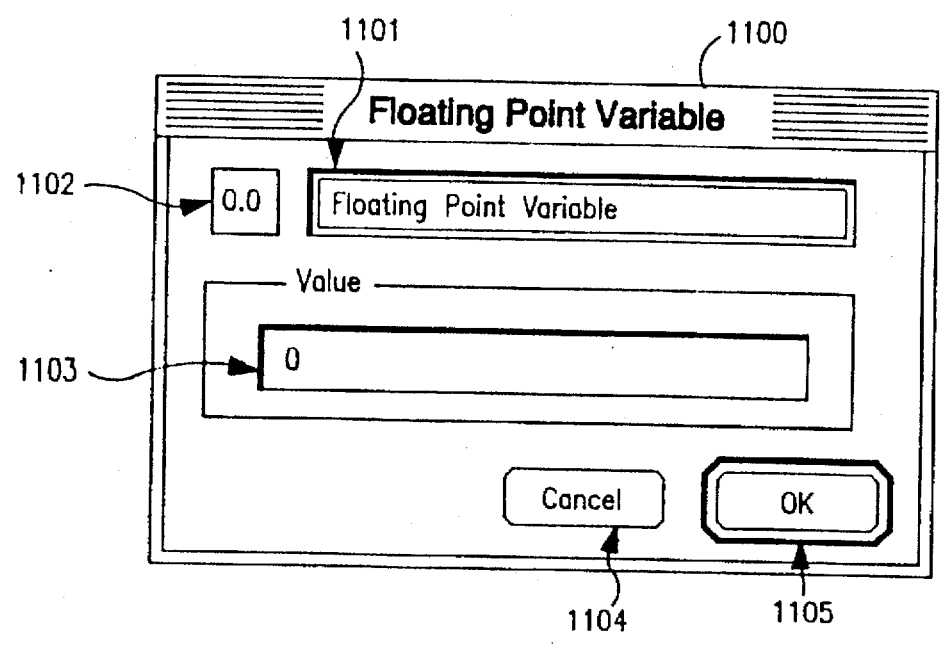

A Floating Point Variable stores a floating point value (e.g., 3.14159). In FIG. 12(f), one can see a data entry area 1103 comprising an entry position for a floating point number.

(g) Point.

A Point Variable stores point values (e.g., (25,45)). In FIG. 12(g), one can see a data entry area 1123 comprising an entry position for two integers, the x-coordinate of the point and the y-coordinate of the point.

(h) Time.

A Time Variable stores time in the format: "minutes:seconds.milliseconds." In FIG. 12(h) one can see a data entry area 1083 comprising an entry position for the time in such format.

(3) Capabilities.

As noted above, Capabilities are modifiers that perform actions on behalf of the Element. In the current embodiment, that would include Messengers and Effects, as well as three singletons: the Miniscript Modifier, the Classification Modifier and the Set Value Modifier.

(a) Messengers.

Messengers are used to send messages and (optionally) accompanying data to Elements and Modifiers. They can be enabled, disabled and triggered upon receipt of messages as can all other non-Variable Modifiers. Although each has unique functionality, there are some similarities among them worth noting.

With reference to FIGS. 13(a)–(g), one notes that the dialog boxes for the various Messengers [(basic) 1200, if messenger 1220, timer 1240, border detection 1260, collision 1280, hypertext 1300 and keyboard 1320] each respectively has a title 1201, 1221, 1241, 1261, 1281, 1301 and 1321, an icon 1202, 1222, 1242, 1262, 1282, 1302 and 1322, a "Cancel" button 1207, 1228, 1250, 1273, 1296, 1312 and 1331, and an "OK" button 1208, 1229, 1251, 1274, 1297, 1313 and 1332.

As Messengers, each respectively has a messaging block comprising (i) a Message/Command pop-up menu 1204, 1225, 1247, 1268, 1288, 1306 and 1325, (ii) a With pop-up menu 1206, 1226, 1249, 1275, 1289, 1307 and 1327, and (iii) a Destination pop-up menu 1205, 1227, 1248, 1269, 1292, 1308 and 1326. Furthermore, each has messaging checkboxes for (i) immediate messages 1209, 1230, 1252, 1270, 1298, 1309 and 1328, (ii) cascaded messages 1210, 1231, 1253, 1271, 1299, 1310 and 1330, and (iii) relayed messages 1211, 1232, 1254, 1272, 1279, 1311 and 1331.

It is critical that a Messenger specify the type and destination for its message. Thus, the Destination pop-up menu permits the author to designate targets in accordance with the range of Elements specified in Table I above. The Message/Command pop-up menu allows the user to specify the type of message to be transmitted. The With pop-up menu permits various types of data to be attached to the message. The messaging option check boxes allow the message to be configured, respectively, for immediate transmission, cascading or relaying, as discussed above.

Most Messengers have an "enable when" pop-up menu and a "disable when" pop-up menu, which together specify a window of events in between which the Messenger is active (and conditionally sends messages). Other Messengers have an "execute when" pop-up menu which is configured to "fire and forget," i.e., conditionally send the message once upon receiving the triggering event.

i) Basic Messenger.

The Basic Messenger 1200, illustrated in FIG. 13(a), simply sends a message with optional author-supplied data when a particular message is detected.

ii) If Messenger.

Figure 13B:
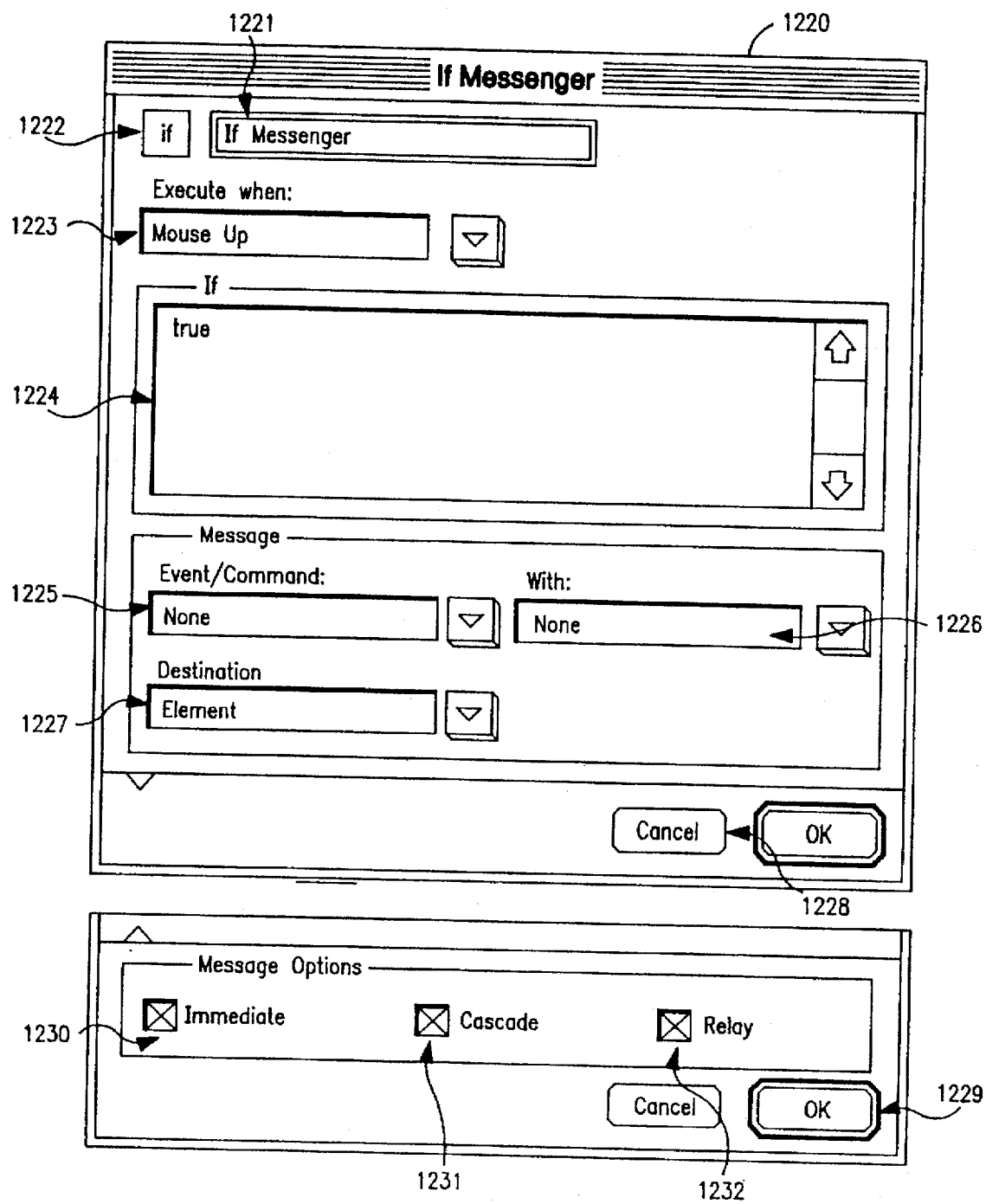

If Messenger 1220, illustrated in FIG. 13(b), allows conditional sending of messages using Boolean logic. In addition to the "execute when" pop-up menu 1223, a data entry area 1224 allows the author to impose a condition which must be met for the message to be sent (using the same syntax as is used by the Miniscript Modifier discussed below).

iii) Timer Messenger.

Figure 13C:
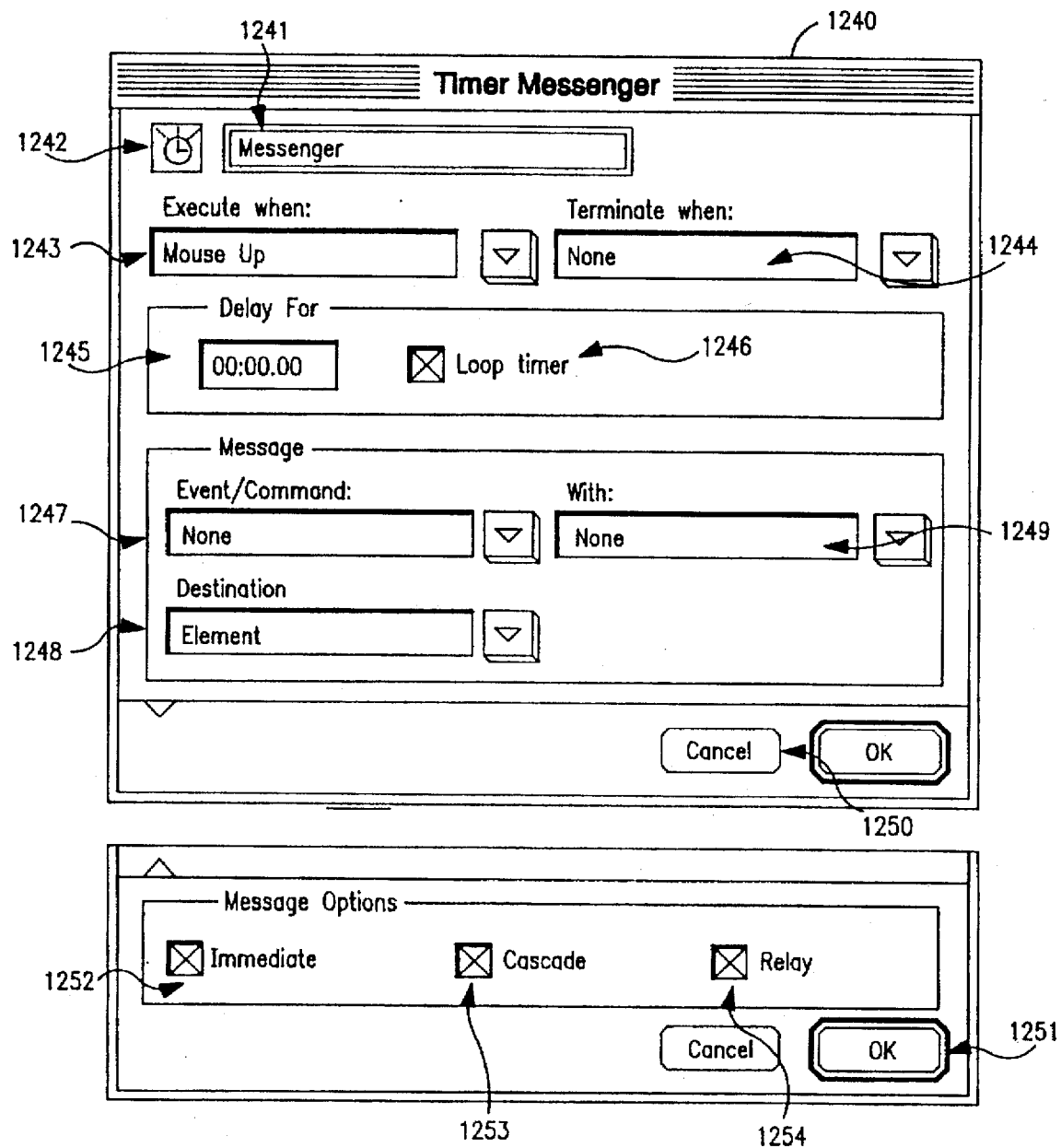

The Timer Messenger 1240, illustrated in FIG. 13(c), waits an author-specified period of time before sending a message. One can see "execute when" 1243 and "terminate when" 1244 pop-up menus, a data entry area 1245 for expressing a countdown time in the format of "minutes:seconds.milliseconds," with a loop timer checkbox 1246 to send the timed message repeatedly.

iv) Boundary Detection Messenger.

Figure 13D:
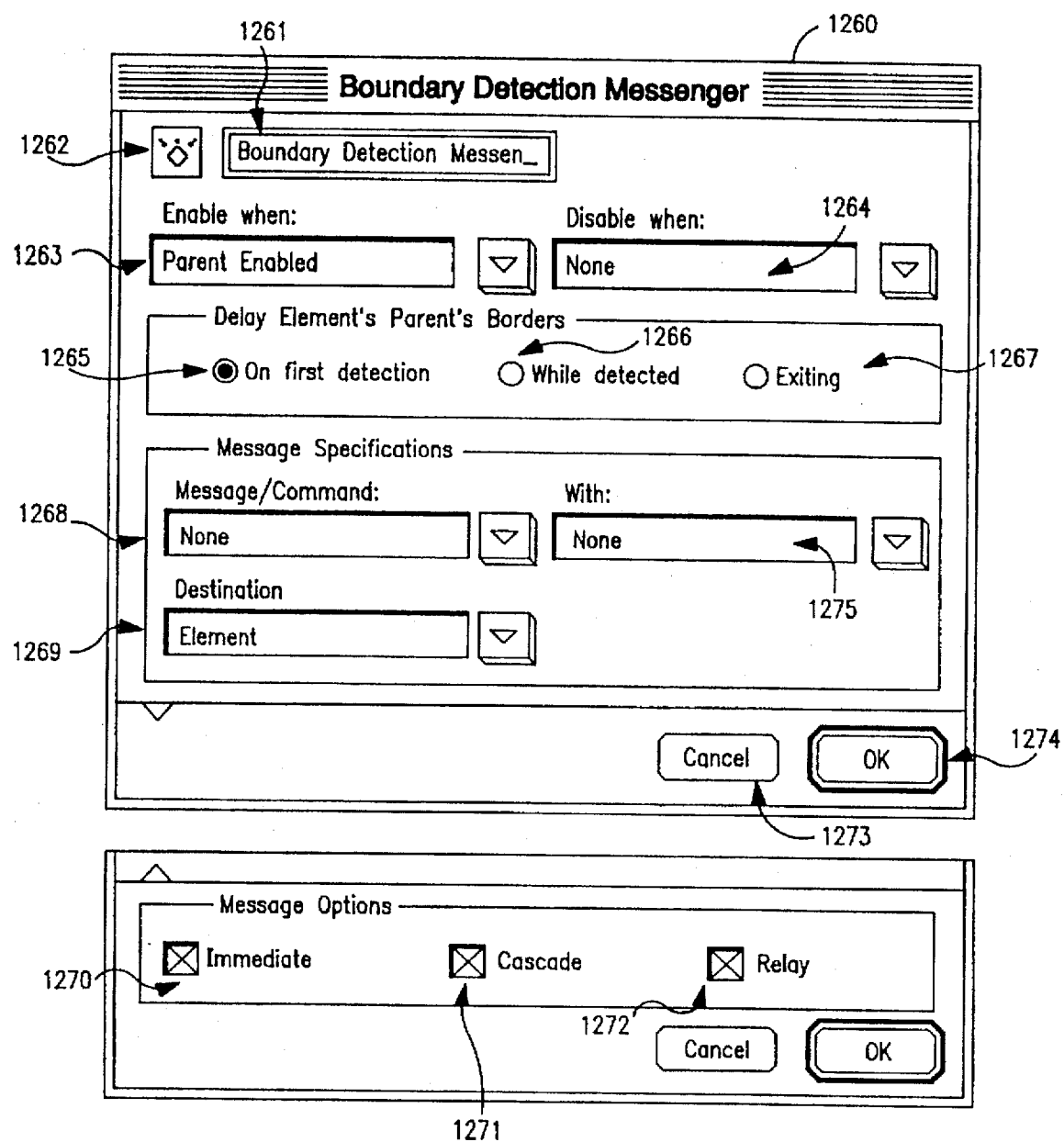

The Boundary Detection Messenger 1260, illustrated in FIG. 13(d), detects collisions with enclosures. One can see "enable when" 1263 and "disable when" 1264 pop-up menus, and three radio buttons to specify the detection conditions for collisions with the Element's parent's borders: (i) on first detection only 1265, (ii) while continually detected 1266, and (iii) while exiting enclosure only 1267.

v) Collision Messenger.

Figure 13E:
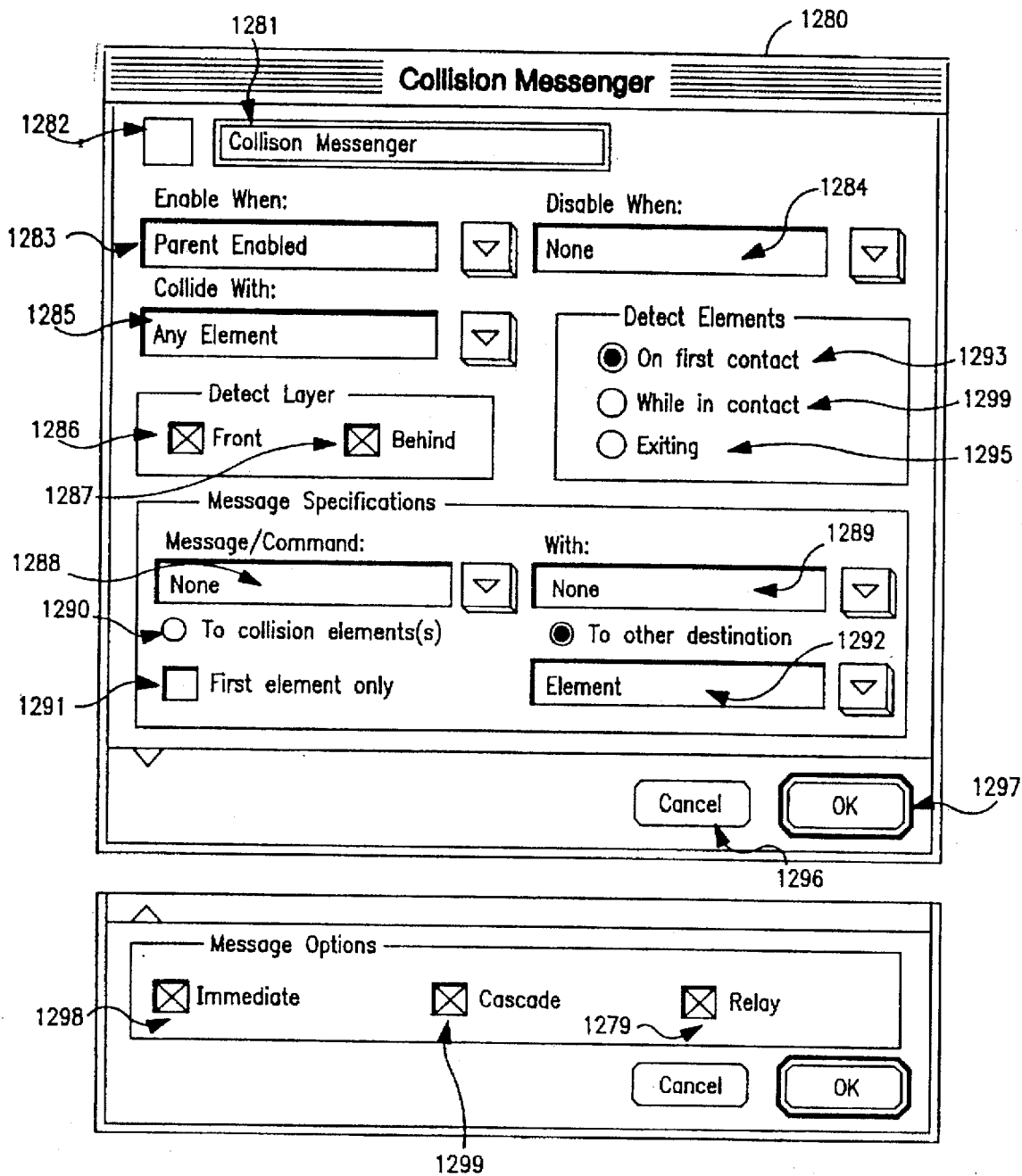

The Collision Messenger 1280, illustrated in FIG. 13(e), detects collisions with Elements. One can see "enable when" 1283 and "disable when" 1284 pop-up menus. The "collide with" pop-up menu 1285 can be used to designate Elements that can be collided with, e.g., Elements which are "solid." This can be specified using the Classification Modifier, described below. The detect "in front" and "behind" check boxes 1286 and 1287 can be used to filter out Elements from different layers. The detect buttons 1293, 1294, and 1295 can be used, respectively, to configure messaging only upon first contact of the Elements; continually while two Elements are in contact; or when the two Elements cease being in contact with each other. Collisions suggest a special target for a message, apart from the normal range of targets provided through destination pop-up menu 1292 discussed above, namely the actual Elements collided with. This is made available through the "Collision Elements" destination button 1290, which allows the author to toggle between the normal mode of messaging to a specified destination, and this special mode of targeting only collided Elements. The first Element collided with may be specified exclusively through the use of the "First Element Only" checkbox 1291.

vi) Hypertext Messenger.

Figure 13F:
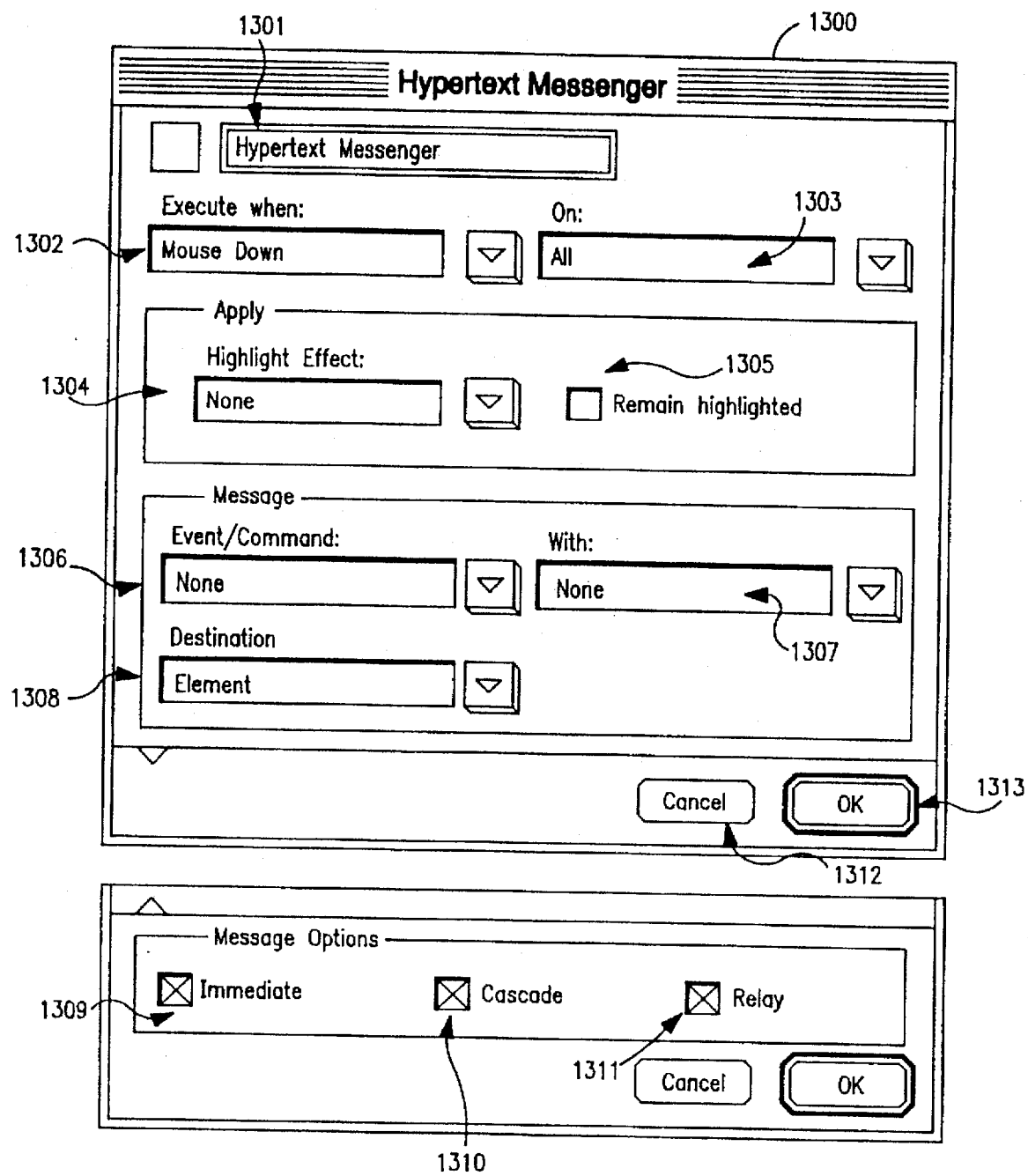
Figure 13G:
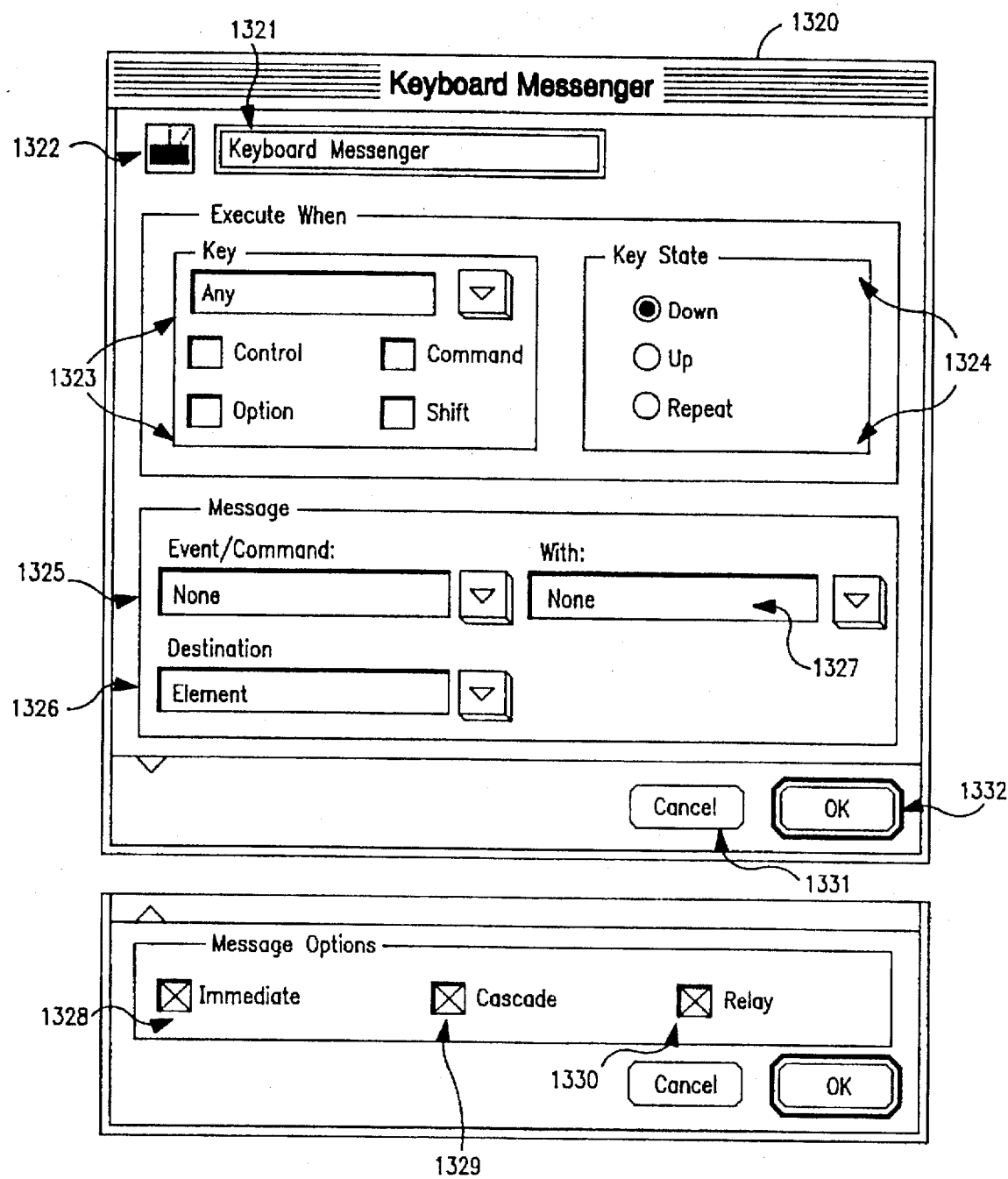

Hypertext Messenger 1300, illustrated in FIG. 13(f), links the sending of a message with a user's mouse actions. When a Hypertext Messenger is dropped into a Text Element, any hypertext libel that has been assigned to text within the Element appears on the "On" pop-up menu 1303. The Messenger will thus trigger upon receipt of the specified message, indicating a user's mouse action on such "hot" text. Furthermore, through the highlight effect pop-up menu 1304, the following effects to the "hot" text may be applied: none, underline, invert, highlight, tone up, tone down or squiggly underline. This effect may be sustained through application of the "Remain highlighted" checkbox 1305.

vii) Keyboard Messenger.

Keyboard Messenger 1320 detects and responds to keyboard events. Instead of being triggered upon receipt of a message (as are most non-Variable Modifiers), it is triggered by author-specified (via controls 1323) user key or key combinations, including the control, command, option and shift keys. The key state of the trigger may be specified through radio buttons 1324 as down, up or repeating.

b) Effects.

In general, Modifiers grouped under the category of Effects modify the visible characteristics of their parent Elements.

With reference to FIGS. 14(a)–(c), 16(a)–(d), 17(a)–(d), 18(a)–(b), 19 and 20, the categories of effects include: the Scene Modifiers (change Scene 1400, return 1420 and Scene transition 1440); the Motion Modifiers (simple 1600, drag 1620, path 1640 and vector 1660); the Visual Modifiers (graphic 1700, color table 1720, gradient 1740 and image effect 1760); the Sound Modifiers (sound effect 1800 and audio fade 1820); the style Modifier 1900, and the cursor modifier 1920. These Modifiers respectively have a title 1401, 1421, 1441, 1601, 1621, 1641, 1661, 1701, 1721, 1741, 1761, 1801, 1821, 1901 and 1921 and an icon 1402, 1422, 1442, 1602, 1622, 1642, 1662, 1702, 1722, 1742, 1762, 1802, 1822, 1902 and 1922. All but the path Modifier 1640 and Graphic Modifier 1700 have, respectively, a "Cancel" button 1409, 1424, 1449, 1609, 1628, 1666, 1726, 1747, 1769, 1807, 1827, 1911 and 1926 and an "OK" button 1410, 1425, 1450, 1610, 1629, 1667, 1727, 1748, 1770, 1808, 1828, 1912 and 1927.

i) Scene.

With reference to FIG. 14(a), the Change Scene Modifier 1400 is used to change the currently visible Scene during Runtime (the "Active Scene") from one Scene to another. It is executed when the message specified in pop-up menu 1403 is received. Radio buttons 1404 designate that the Active Scene should be switched to: (i) the next Scene in the Subsection, (ii) the previous Scene in the Subsection, or (iii) a particular Scene. When the last radio button of 1404 has been selected, pop-up menus 1405 allow the particular Section, Subsection and Scene to be specified. Checkbox 1406 allows the Active Scene to be mixed in with the destination Scene, through pop-up menus 1405. Checkbox 1407 adds this Scene to the "return list" of a future Scene with a return Modifier, as discussed below. Checkbox 1408 designates that switching to a previous or next Scene will wrap around, if necessary, through the Scenes of the Subsection.

With reference to FIG. 14(b), the Return Modifier 1420 works in association with a Change Scene Modifier with its "add to return list" option selected. The Return Modifier returns to the Scene which has been added to the return list when the message specified in pop-up menu 1423 is received.

The operation of the "Return list" using Scene change and return Modifiers is illustrated in FIG. 15. Therein, Scene A 1500, Scene B 1510, Scene C 1520, Scene D 1530 and Scene E 1540 each includes, respectively, Scene Change Modifiers 1505, 1515, 1525, 1535 and Return Modifier 1545. Scene Change Modifier 1515 on Scene B 1510 has its "Add to return list" checkbox 1407 set. Thus, when Return Modifier 1545 is executed, the Active Scene changes from Scene E 1540 to Scene B 1510, skipping intermediate Scene D 1530 and Scene C 1520.

With reference to FIG. 14(c), Scene Transition Modifier 1440 creates one of a variety of transitions for a change of Scene. Upon receiving the messages set through pop-up menus 1443 and 1444, respectively, the Modifier in essence, registers (and revokes registration of) the selected transition with the system (to take effect upon an actual change of Scene). The type of transition is specified through pop-up menu 1445, and includes pattern dissolve, random dissolve, fade, push, slide, wipe or zoom. The number of steps required to accomplish this transition is specified through data entry area 1447. Certain transition effects specified through pop-up menu 1445 require further specification of a direction, which is accomplished through pop-up menu 1446. The rate at which the transition takes place, in steps per second, is entered through data entry area 1448.

ii) Motion.

Figure 16B:
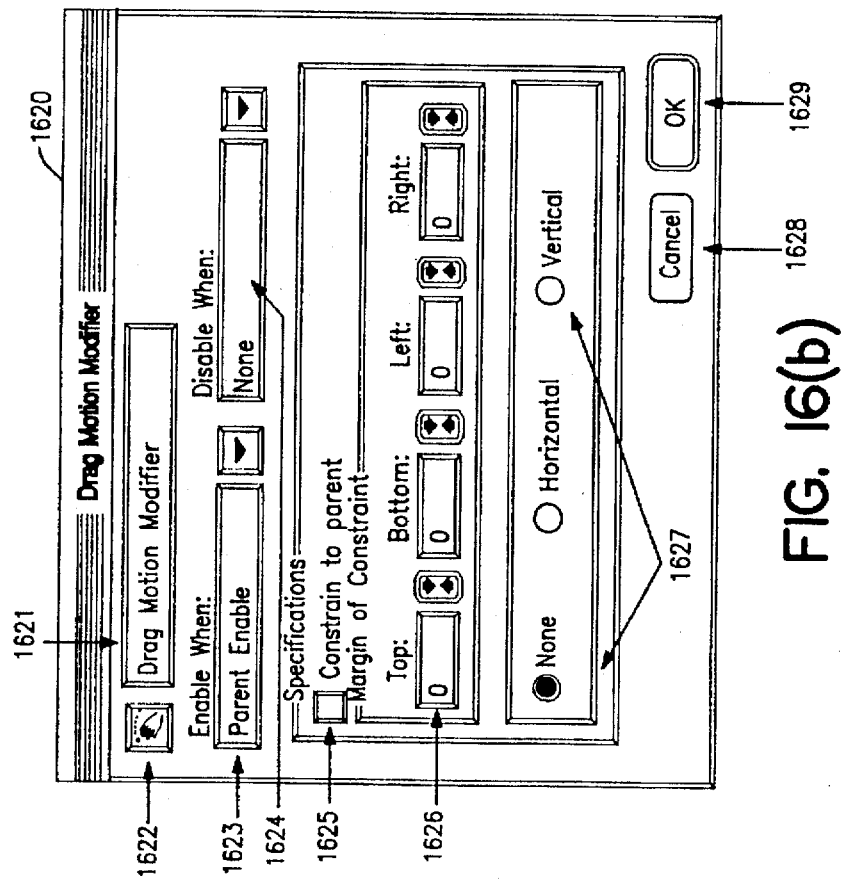
Figure 16A:
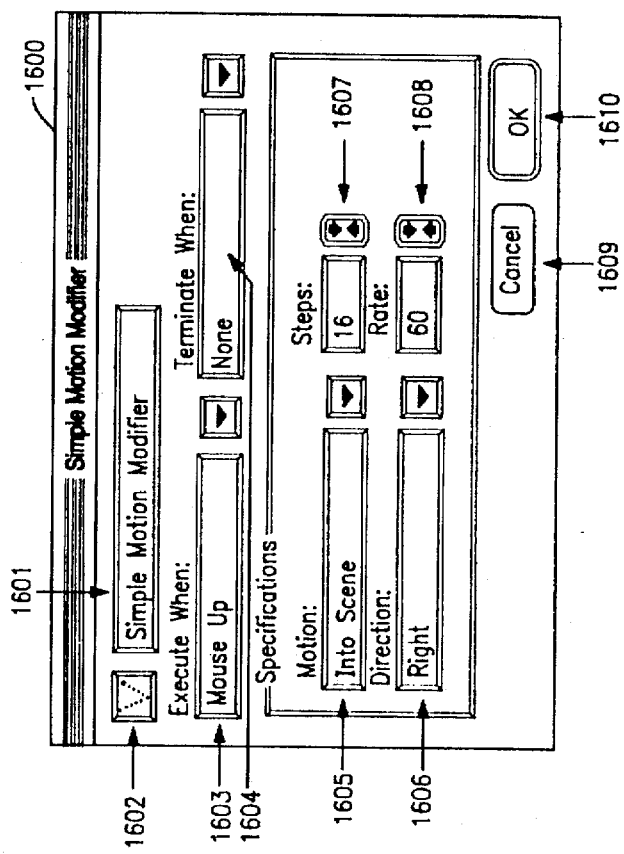

With reference to FIG. 16(a), the Simple Motion Modifier 1600 initiates a simple motion path. It commences and terminates execution of such motion when the messages set through pop-up menus 1603 and 1604, respectively, are received. The types of motion available are set through pop-up menu 1605 and include: (i) "Into Scene" which moves the Element into the Scene from its current position; (ii) "Out of Scene" which moves the Element off the Scene from its current position; and (iii) "Random Bounce" which bounces the object at random angles within the boundary of its parent Element. Direction in the first two instances of motion is specified through pop-up menu 1606. The number of steps and rate to accomplish this motion path are specified through pop-up menus 1607 and 1608, respectively.

With reference to FIG. 16(b), the Drag Motion Modifier 1620 allows the user to drag the Element at Runtime. [All Media Elements have this capability during Edit Mode in the layout view window 320.] This feature is respectively enabled and disabled when the messages set through pop-up menus 1623 and 1624, respectively, are received. A checkbox 1625 controls whether the Element will be constrained to remain within the boundaries of its parent. A set of data entry areas 1626 designate the top, bottom, left and right constraints. A set of radio buttons 1627 designate whether dragging is unconstrained, or constrained to the horizontal or vertical directions.

Figure 16C:
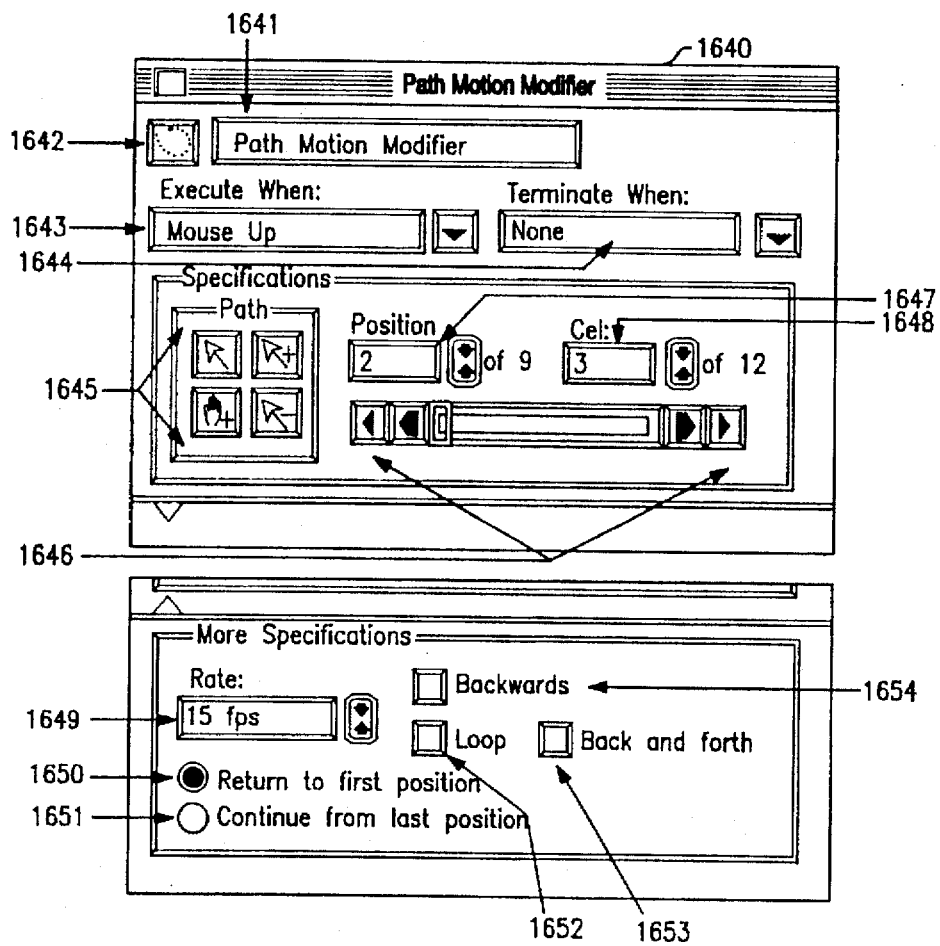

With reference to FIG. 16(c), the Path Motion Modifier 1640 controls the motion paths of Elements, and in particular animations. It commences and terminates execution of such motion when the messages set through pop-up menus 1643 and 1644, respectively, are received. The editing buttons 1645 allow the author to set down a polygonal path for the Element to follow, the path being followed by the upper left hand corner of the Element's enclosure. Data entry area 1647 allows the position in the path to be specified, with data entry area 1648 indicating the corresponding mToon cel which should be played at that position. Slider control 1646 allows an author to step or play through the positions, forward or backwards, thus providing a previewing capability while the dialog box 1640 is open. The rate at which the animation is played over the path is configured through data entry 1649. The author also can specify whether the animation will always begin at the first position set (through radio button 1650) or whether it will continue from its then-current Runtime position (through radio button 1651). Checkboxes 1652, 1653 and 1654 respectively control whether the animation is to be looped indefinitely, repeated forwards and then backwards, or just played backwards.

Figure 16D:
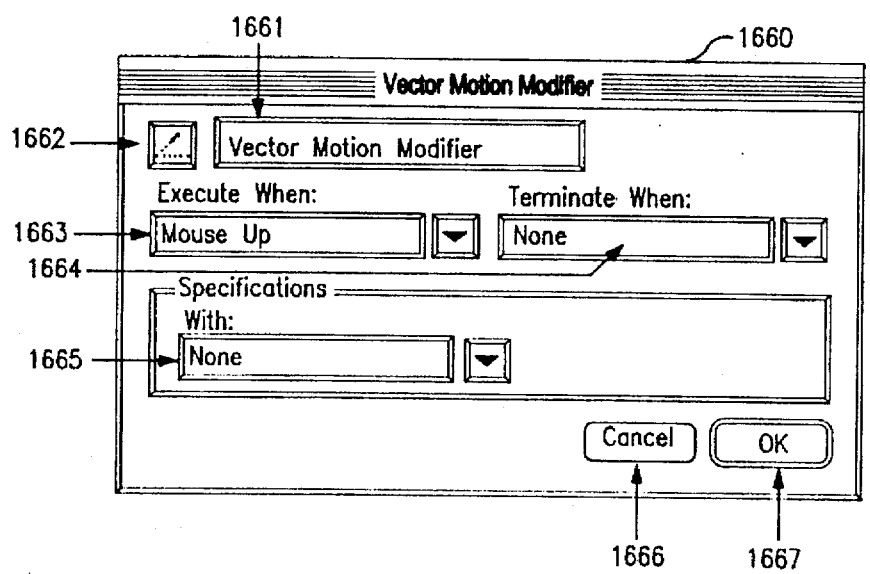

With reference to FIG. 16(d), the Vector Motion Modifier 1660 initiates vector motion in degrees and inches per second. It commences and terminates execution of such motion when the messages set through pop-up menus 1663 and 1664, respectively, are received. The actual vector for the motion is specified through pop-up menu 1665.

iii) Visual.

Figure 17A:
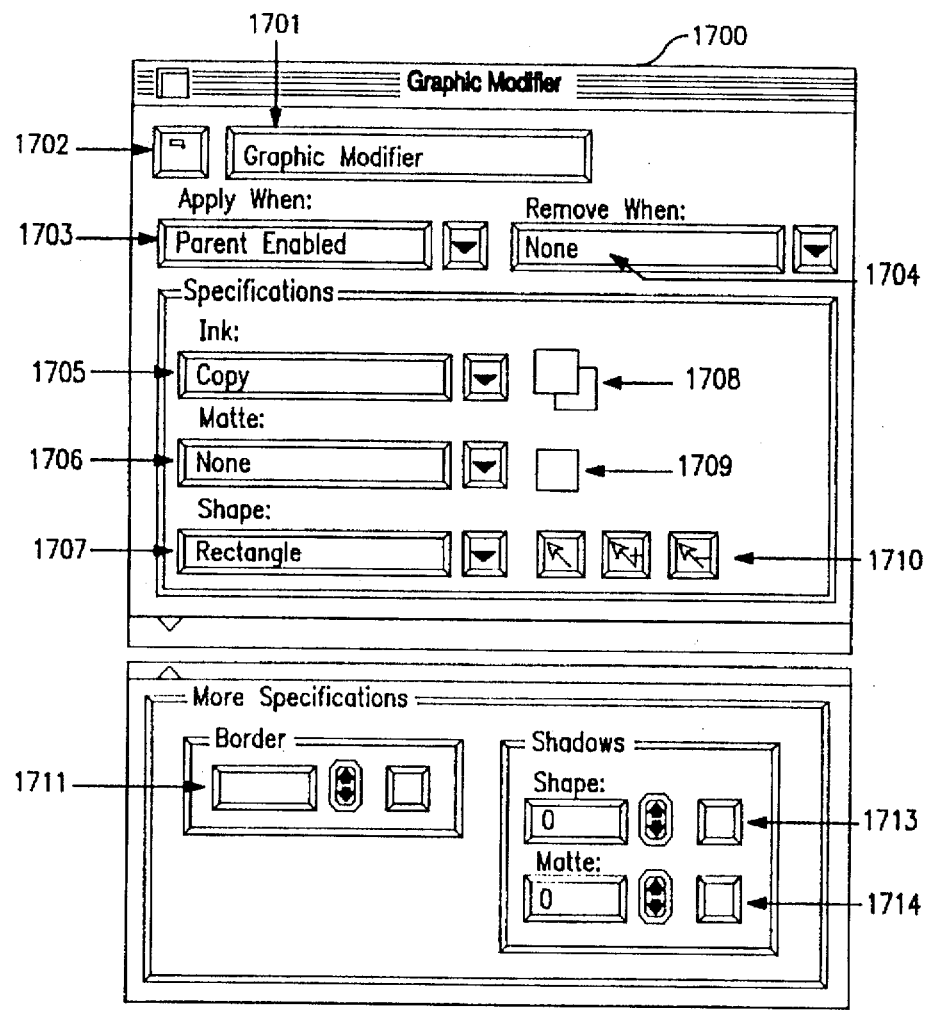

With reference to FIG. 17(a), the Graphic Modifier 1700 modifies graphic attributes of Elements. It is applied and removed when the messages set through pop-up menus 1703 and 1704, respectively, are received. The type of ink effect (copy, background transparent, invisible, blend, transparent, ghost, reverse copy, reverse transparent, reverse ghost, chameleon dark, chameleon light) is specified through pop-up menu 1705. A matte may be applied through pop-up menu 1706 with Graphic Elements having a solid background color, such matte function making the specified color transparent. This matting color is specified through matte color box 1709, which brings up a color palette. The "hot" region shape of an Element, i.e., that portion of an Element that will respond to mouse messages, is configured through pop-up menu 1707, and includes rectangle, round rectangle, oval, star and polygon. A polygon requires use of tools 1710 to create and edit the end points thereof. The background and foreground colors of the Element can be selected through boxes 1708, which bring up color palettes. The border size of a defined Element shape, the shadow and shadow of the matte can be adjusted through data entry areas 1711, 1713 and 1714, respectively.

Figure 17B:
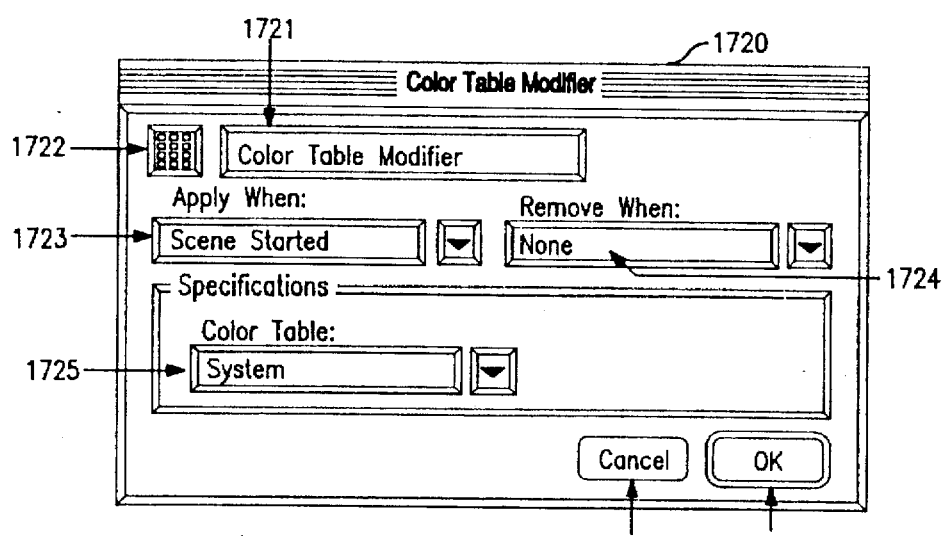

With reference to FIG. 17(b), the Color Table Modifier 1720 manages color tables. It is applied and removed when the messages set through pop-up menus 1723 and 1724, respectively, are received. The color table is specified through pop-up menu 1725.

Figure 17C:
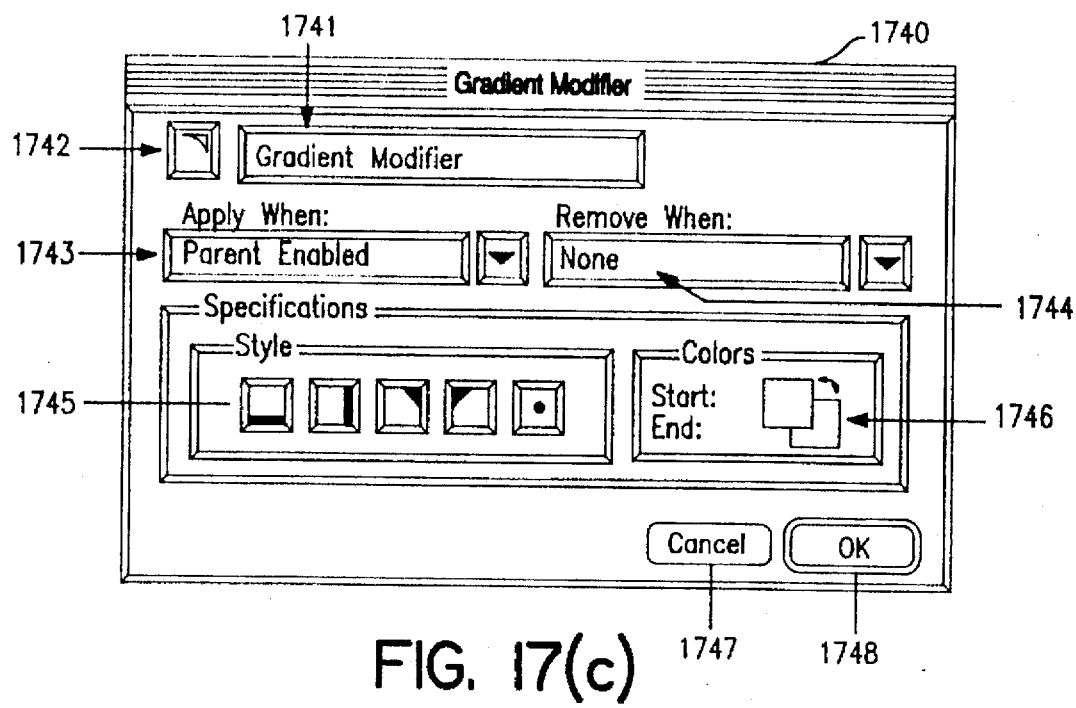

With reference to FIG. 17(c), the Gradient Modifier 1740 creates color gradients in Elements that have not been linked to an external media file. It is applied and removed when the messages set through pop-up menus 1743 and 1744, respectively, are received. The gradient style buttons 1745 specify the direction or type of gradient (e.g. vertical, horizontal, diagonal, central). The Start and End color boxes 1746 specify the colors which comprise the beginning and end of the color gradient, accessible through pop-up color palettes.

Figure 17D:
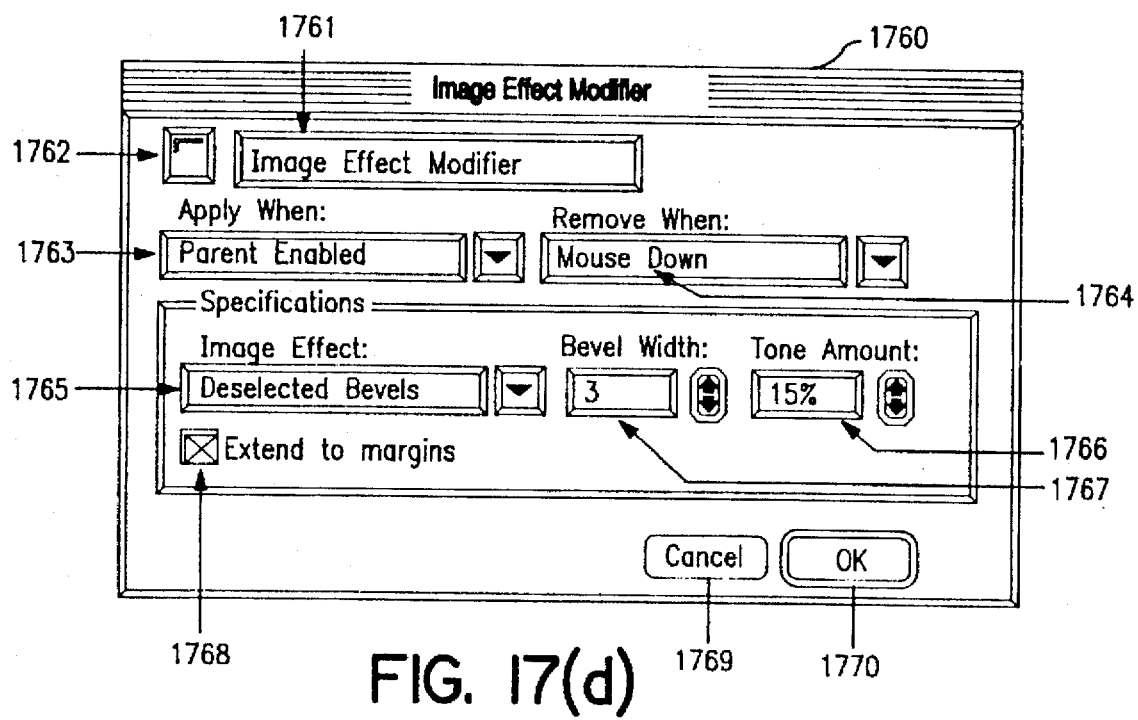

With reference to FIG. 17(d), the Image Effect Modifier 1760 creates image effects, particularly useful for implementing buttons within a project. It is applied and removed when the messages set through pop-up menus 1763 and 1764, respectively, are received. The image effect is designated through pop-up menu 1765 (e.g. invert, select bevel, unselect bevel, tone up, tone down). The width of bevel effects is specified through data entry area 1766. Tone amount is specified through data entry area 1767. The checkbox 1768 controls whether image effects operate outside any margins set by a graphic modifier, as discussed above.

iv) Sound.

With reference to FIG. 18(a), the Sound Modifier 1800 plays sound effects. It commences and terminates execution of such sound effect when the messages set through pop-up menus 1803 and 1804, respectively, are received. The actual sound is specified through pop-up menu 1805, with a preview capability provided through button 1806.

With reference to FIG. 18(b), Sound Fade Modifier 1820 decreases or increases the default volume level of a sound. It commences and terminates execution of such sound effect when the messages set through pop-up menus 1823 and 1824, respectively, are received. The percentage of the sound fading is specified through data entry area 1825, while the duration of the fade is specified through data entry area 1826.

v) Text.

With reference to FIG. 19, the Style Modifier 1900 is used to modify text styles. It is applied and removed when the messages set through pop-up menus 1903 and 1904, respectively, are received. The font type, alignment and size are specified through pop-up menus 1905, 1906 and 1907, respectively. The font style (e.g., bold, italics, underline, outline, shadow, condensed and extended) is specified through checkboxes 1910.

vi) Cursor.

With reference to FIG. 20, the Cursor Modifier 1920 is used to change the mouse cursor icon. It is applied and removed when the messages set through pop-up menus 1923 and 1924, respectively, are received. The type of cursor is specified through pop-up menu 1925.

(c) Miniscript.

The Miniscript Modifier bears special mention. Although the current embodiment emphasizes a visually-driven authoring environment, there are times when authoring a short script is more convenient than programming a special-purpose modifier. At some point, however, frequently used constructs suggest the creation of a separate modifier. The "If" Messenger is a good example. It is used to trigger a message on a simple boolean expression handled much like the Miniscript Modifier, but with the special messaging mechanisms presented like any other Messenger. In the current embodiment, the Miniscript Modifier allows access to internal Attributes of Elements (e.g. position) not otherwise accessible directly by authors.

With reference to FIG. 21, the Miniscript Modifier 1980 has a title 1981 and an icon 1982. It is executed upon receipt of a message as configured via pop-up menu 1983. The data entry area 1984 permits the author to enter the script using the Miniscript scripting language. The compile button 1982 compiles any changes made in the data entry area 1984.

The syntax of the Miniscript Modifier is based on the following keywords: (i) "set", "of" and "to" (used to set Variables); (ii) "if", "then", "else" and "end if" (to form conditional structures); and (iii) "send" and "with" (for message dispatching). The Miniscript Modifier also can access and manipulate the inherent Attributes of Elements, e.g., for an mToon, its height, position, width, cel, range, rate and paused fields. It permits Relative Targeting of messages through tag names, such as Project, Section, Scene, Element, Element's Parent, activeScene, sharedScene and parent. The Miniscript language also has access to various mathematical functions, such as absolute value (abs), arctangent (atn), random (rnd), and so on.

The Miniscript Modifier in the current embodiment is not implemented as a p-code (interpreted pseudocode) system; rather, it is a compiled, atom-based execution system. Thus, the miniscript is broken down into atoms, allowing the arguments for each to be loaded and executed by calling the appropriate function, which in most cases is the method of another Modifier. Implementations of scripting languages are well known in the art. Moreover, additional scripting functionality could be added to the system via the Component API, discussed below with respect to the system's implementation.

(d) Classification.

With reference to FIG. 22, the Classification Modifier 1940 establishes a classification scheme which allows authors to create and name classes and group any objects into one or more of these classes. In one sense, the Classification Modifier 1940 implements a set-based, rather than a family-based hierarchy. In other words, one can target sets of Elements, rather than families. However, as can be readily understood, the current embodiment is optimized to service a family hierarchy.

The Classification Modifier 1940 has a title 1941 and an icon 1942. It is applied and removed when the messages set through pop-up menus 1943 and 1945, respectively, are received. The classification is specified through pop-up menu 1944.

An example application of the Classification Modifier 1940 is in conjunction with the Collision Messenger 1280 (see FIG. 13(e)). The Collision Messenger's "Collide With" pop-up menu 1285 can be configured to "Parent's Class," meaning that its parent Element will detect collisions only with other Elements in the same class. Thus, authors could configure bouncing ball Elements that would only bounce off one another.

(e) Set Value Modifier.

With reference to FIG. 23, the Set Value Modifier 1960 is used to reset the value of a Variable Modifier. It has a title 1961 and an icon 1962. It is executed upon receipt of the message specified via pop-up menu 1963. The author can select the source of the data to be written via pop-up menu 1965, and the target Variable or incoming data to be changed via pop-up menu 1964.

B. Core System Architecture.

The overall architecture of a system 100 embodying the principles of the invention is presented in FIG. 24. The major modules of system 100 are separated into those governing the actual title content, Runtime functionality, and Edit Mode functionality. This system 100 interacts through hardware peripherals, such as a display 3, speakers 4, keyboard 5, and mouse 6 or other joystick-like apparatus. As shown by the stretched rectangles, there are modules which straddle the Runtime/Edit Mode boundary, and are thus present in both.

Under the classification of "title content" are those modules that are specific to a particular title. They include the logic 1, which is the storage for the project itself, including all Elements and Modifiers, and the media 2, which is the storage for all media linked into the project.

There is certain functionality available to the author only in Edit Mode, such as access to windows, dialogs, etc. However, there is very little difference between Edit Mode and Runtime Mode in the current embodiment. In both modes, certain background Environment Messages (not visible to the author) are issued by system 100, which trigger Modifiers to perform certain functions, such as updating Element positions on-screen. Certain functionality accessible to authors through Modifiers also is realized during Edit Mode. For example, the system updates an Element's graphic attributes in accordance with the author's configuration of the Graphic Modifier, and steps through an author-specified path, configured via the Path Motion Modifier. Most Runtime functionality, however (such as the sending of messages throughout the Structural and Behavioral Hierarchies to trigger Modifiers), is suppressed during Runtime Mode.

In an alternative embodiment, rather than suppressing most Runtime functionality during the Edit Mode, such Runtime functionality could proceed at a significantly slower rate. This would give the author the impression of how the Project would proceed at normal speed, while allowing the author sufficient time to reconfigure Elements and Modifiers without interrupting the flow.

1. Edit Mode Functionality.

The modules comprising the Edit Mode functionality in this embodiment include the title builder 51, the libraries 52, the mToon editor 53, the views manager 30 and the authoring GUI support 40, as well as the asset manager 7, the alias manager 8, the hypertext support 9 and the cross-platform architecture 50 that are shared with the Runtime functionality.

The title builder 51 is the module which transforms a project into a standalone title, severing the Edit Mode functionality. In view of the cross-platform architecture 50 discussed below, this task can be accomplished for various target platforms with minimal difficulty.

The libraries 52 provide centralized storage for Elements and Modifiers, in contrast to external media resources controlled by the asset manager 7. As discussed below with reference to FIG. 6, the libraries module 52 generates and controls the library windows 520.

The mToon editor 53 allows manipulation of the proprietary "mToon" animation format, as well as the conversion of other formats, such as QuickTime™, into the mToon format. As discussed above with reference to FIGS. 9(a)–(d), this module controls the mToon editor window 900, the source file dialog 910, the compression settings dialog 920 and the mToon ranges dialog 930.

The views manager 30 controls and presents to the author various views of the Project, which include a layers view 31, a layout view 32, a structure view 33 and a behavior view 34. The layers view 31 is used to edit projects a Subsection at a time, with the various Scenes projected along one axis, and the Elements with their layer order on the other. It controls, with reference to FIG. 3, the layers view window 310.

The layout view 32 is used to edit a Scene and is the view closest in representation to the actual running of the Project. It controls, with reference to FIG. 2, the layout view window 320.

The structure view 33 shows and allows the manipulation of the Structural Hierarchy of Project, Section, Subsection, Scenes and Media Elements, as well as the Behavioral Hierarchy of Behaviors and other Modifiers. It controls, with reference to FIG. 4, the structure view window 330. It should be noted that Modifiers may be edited in all three views (layers view 31, layout view 32 and structure view 33), as discussed below. The Behavior view 34 shows (via Behavior Window 390 shown in FIG. 11) and allows the author to control the messaging connections among a Behavior's child Modifiers.

The asset manager 7 is a database system that provides centralized access to all external resources (such as pictures, animations, text and fonts) stored externally in the media 1 (e.g. on hard disk). The asset manager 7 is implemented as a flat-file database, having a search engine for files. The asset manager 7 has the ability to follow assets as they may be moved around a file system. If the asset manager 7 does not find an asset in the prescribed directory, it will first determine if other assets that used to be in the same directory as the asset in question have been moved to another directory. If so, the asset manager 7 will ask the author whether to pursue that other directory for such asset. Otherwise, it will continue to seek other "candidate" directories among the moved assets. If the asset manager 7 then fails in this process, the author will be prompted either to relink the media at its new location or to link to other media, or simply ignore this lack of media linkage. In the latter case, the Element in question simply will not "play" any media.

The alias manager 8 handles the aliasing of Modifiers. For Variables, such as integers, this link of data is maintained at Runtime. Thus, changes to one instance of the aliased Variable are reflected in all other such instances during Runtime Mode. In one embodiment, aliasing affects other non-Variable Modifiers only during Edit Mode. Invocation of one instance of an aliased Modifier (e.g., in response to a message) does not result in the invocation of other such instances. However, nothing in the embodiment discussed here precludes implementing aliasing such that all Modifiers are linked dynamically, and thus are invoked simultaneously during the Runtime Mode.

The hypertext support 9 implements hypertext capability, whereby any part of a Text Element's text may be transformed into a "label." Hypertext labels are tags that can be applied to the entire text or to blocks of text within Text Elements.

The authoring GUI support 40 controls various aspects of the graphical user interface, including the features of media linking 41, messaging log 42, drag and drop 43 and morphing 44.

The media linking module 41 controls mapping of external media 2 resources to Elements within a Project. It also permits "thumbnails", which are draft mode, low resolution representations of such media that are substituted for the actual media. This saves space and thus makes Projects more transportable, a useful feature during title development. Moreover, a title could even be executed over a network (e.g., the Interact) with significant savings in bandwidth due to the replacement of large media files.

The messaging log 42 provides debugging information in the form of messages sent and received by various Elements of the Project. The messaging log 42 traps all message traffic during Runtime and presents the author with the desired filtered view thereof through the messaging log window 420 (see FIG. 8).

The drag and drop module 43 provide the visual paradigm for transferring, e.g., Elements and Modifiers from one part of a Project to another, or even to other Projects, by pressing the mouse 6 button down on the object and dragging it to its desired destination. The implementation of drag and drop behavior is well-known in the art. The consequences of particular drag and drop actions, such as Adoption, Transplantation and hierarchical object linking, are handled by particular core modules, as discussed below. The drag and drop module 43 will indicate a disallowed action by moving an outline of the object's icon back to its original position.

The morphing module 44 controls the type of link to external media, thus allowing an mToon Graphic Element to be transformed into a PICT Graphic Element, for example. It does so by creating an instantiation of the new Media Element, copying over the structure pointers, ID numbers, etc. (as explained below), and setting up the appropriate icon for the new media. It does not, however, destroy the original Element until the author performs another operation, after which "undo" capability is lost.

a. Connecting Objects.

As discussed in greater detail below, Elements, Modifiers, "Players" and "Assets" are implemented as classes of objects. When the author creates an Element or Modifier, or links an Element to external media, the system 100 instantiates objects from these classes. The author may then configure and connect these objects to form the working Project.

(1) Element To Element Connection.

The connection of objects underlying this authoring process is illustrated in FIG. 25. It must be stressed that the particular connections shown are for purposes of demonstration by example, and the principles underlying the present invention are not limited to the actual connections shown. One sees a portion of the Structural Hierarchy represented by Scene Element 151 pointing to its first child Element 152, which points to and is in turn pointed back to by its sibling Element 153. Both Elements 152 and 153 point back to their parent Scene Element 151. The Scene Element 151 is pointed to and points back to its parent Subsection Element 150. The Structural Hierarchy continues, though not shown, through the Section level up to the Project level.

Had the author decided to make Element 153 a child of Element 152 instead of a sibling, the next sibling and previous sibling pointers of Element 152 and Element 153 would have been respectively voided, the first child pointer of Element 152 would be set to point to Element 153 and the parent pointer of Element 153 reset to point to Element 152. Adding new Elements would proceed in an analogous fashion.

Thus, an Element has (i.e., in its instance data structure) pointers to: (i) its parent Element; (ii) its first child Element; (iii) its previous sibling Element; (iv) its next sibling Element; and (v) its first child Modifier.

(2) Modifier Connections.

The Modifier objects shown in FIG. 25, namely 161, 162 and 163 (and Services 168, 169 and 170 in FIG. 26) are not implemented as conventional C++ classes, as is the rest of the core 99 (and thus are represented specially as double rectangles). These Components (Modifier and Services) are special classes of objects designed to extend the functionality of the external architecture discussed above. They will be discussed in more detail below in connection with the Component API. To bridge the core 99 architecture with the Component API, a "wrapper" class interfaces with each Component class. There are thus wrappers for Modifiers and wrappers for Services (discussed in greater detail below with respect to the Component API). The Modifier wrappers thus have pointers to: (i) the Modifier; (ii) its parent Element; (iii) its parent Behavior, if any; (iv) its first child Modifier, if any; and (v) its next sibling Modifier.

When an author drags and drops a Modifier into an Element, a Modifier object is created. In other words, a Modifier wrapper object is instantiated from a Modifier wrapper class (as is a corresponding special Modifier object, such as Modifiers 161, 162 and 163, discussed in greater detail below with respect to the Component API). These Modifier wrapper objects are instantiated from a general wrapper class, except for Behavior Modifiers, whose wrapper objects are instantiated from a Behavior wrapper class. These wrapper classes provide for the Modifiers a backbone of methods to read and write data, to obtain and draw the Modifier's icon, to open and close the dialog editor, to copy data, and to send messages throughout the Structural and Behavioral Hierarchies.

Focusing now downwards from Element 153, one can see that it points to its first child Modifier 161 through Modifier wrapper 158, which in turn points to the second child Modifier 162 through wrapper 159, which in turn points to the third child Modifier 163 through wrapper 160. Element 153 is itself pointed to by the Modifier wrappers 158, 159 and 160. Thus, the Element 153 knows of its first child Modifier 161, and all three sibling Modifiers 161, 162 and 163 know of their parent, Element 153.

With the sibling pointers going in only one direction (right), one can see that the Modifier wrappers 158, 159 and 160 form a singly-linked list. This is distinguished from the sibling Elements 152 and 153 which form a doubly-linked list. This slight difference in the implementation of the Structural and Behavioral Hierarchies is due to a subjective judgment that, in practice, it is more often necessary to know one's previous sibling Element than one's previous sibling Modifier.

As will be discussed below, messages are passed among Modifiers from "left" to "right," i.e., along the sibling chain. If need be, one can always record the pointer to the present Modifier, proceed up through the parent and then cycle forward from the first sibling, recording each pointer in turn until the present Modifier is encountered again. Allowing authors to move Modifiers within the Behavioral Hierarchy requires analogous updating of pointers as described above with respect to Structural Hierarchy changes.

(3) Player and Asset Connections.

When an author creates a new Element (e.g., a Graphic Element), an Element object is instantiated from a general Graphic Element class. In addition, corresponding "player" and "asset" objects are instantiated from their core classes. From Element 153, one can also see attached a player 154 and asset 155. The player 154 knows how to "play" media of a particular type, e.g. a PICT, a sound, or a QuickTime™ movie. The asset 155 is a pointer to the actual media, which is represented as stored on disk 157. Of course, the operating system 156 provides the necessary interface between the asset 155 and media 157. In the embodiment discussed here, player 154 performs the bulk of the interaction with Element 153, while asset 155 only exchanges ID reference numbers with the Element 153.

The process by which an Element is linked to a player is as follows. When the media file 157 is selected by the author through a standard file dialog box, the asset manager 7 is asked whether it knows about that particular asset. If so, that asset 155 is used and connected as shown. Otherwise, a database entry is created in asset manager 7, the asset 155 is established and the file description is passed on to player 154. if the author decides to switch the type of media entirely, a new player object would be instantiated, with all the pointer information carried over from player 154. This morphing process is controlled by the morphing 44 module. Similar to the process of originally creating an asset, a new asset would replace asset 155, while asset 155 would remain as an entry in the asset manager 7. The asset manager 7 would simply decrement the user count in its Asset Palette 70 display, even if that meant that the user count was now zero.

(4) Touch-Up Process.

When an author initiates Adoptions or Transplantations, the system 100 attaches and detaches Elements or Modifiers, as the case may be, as discussed above. In order to complete either process, and enable the Element or Modifier to operate in its new environment, a few additional measures are required.

When an author moves an Element or Modifier from one environment to another, the system 100 broadcasts an Environment Message from the Project level. As will be understood more fully below, Messaging Management 13 dispatches messages along the Structural and Behavioral Hierarchies not only to Elements and Modifiers, but also to all views, palettes, and certain other "system objects," in order that they also may respond appropriately. The message specifies the relevant object and type of change. This change can be as subtle as requesting a view window to highlight an icon selected by the author.

When an object is moved to a new environment, a "touch up" process takes place. This process applies not only to Elements and Modifiers, and each of the objects they contain, but also to assets, symbol IDs, mToon ranges, sound ranges, etc. The system 100, through the Symbol Manager 19, asks each entity to identify by name its "external dependencies" from its previous environment, e.g., Author Messages, Variables, aliases, mToon symbols and sound symbols.

If the name is present in the new environment, and the ID number supplied by the Symbol Manager 19 differs, the system replaces the entity's old ID number with the ID number from the new environment. If the name is not present, yet the ID number conflicts with an existing ID number, the entity is assigned a new, non-conflicting ID number.

The implementation of Hierarchical Element Positioning (i.e. that a child Element moves with its parent Element), necessitates its own type of "touch up" process. In the current embodiment, position (an Attribute) only applies to Graphic and Text Elements (although one could envisage and readily implement "stereo" sound Elements, where the Element's position would reflect the relative amplitude between the left and right speakers).

In any event, when a parent Element moves, the position of each of its child Elements (and their child Elements, and so forth) must be modified. The coordinates of the child Element are readjusted in a straightforward manner by the system, which subtracts the old parent's coordinates (saved when detached) from the Element's coordinates and adds the new parent's coordinates to the Element's coordinates. FIG. 25 illustrates how to access a parent's data structures, and thus in particular, its position Attribute.

b. Aliasing.

The alias manager 8 works with all Modifiers and operates by maintaining a list of all aliases, along with the users of such aliases. In the current embodiment, all manifestations of an alias are separate instantiations of a Modifier which are kept in sync with each other. Thus, the relationship of an aliased Modifier to the objects it connects with (pointers to Elements, parent Behaviors, sibling and child Modifiers, etc.) is kept intact.

Each instantiated Modifier has an alias ID code which is set to zero if not an alias, and will share the same non-zero alias ID code when aliased together with others. Thus, if one of the Modifiers under an alias is changed, the Modifier state data is written out and the alias manager 8 transmits the data to the other Modifiers under the alias. For Variables, this can and does occur in Runtime Mode. For all other Modifiers, this occurs only in Edit Mode. This accounts for the ability of aliased Variables to circumvent their normal scope. Of course, it should be noted that this is an implementational decision only, and anyone of ordinary skill in the art would realize that non-Variable Modifiers could easily be synchronized at Runtime as well.

2. Saving Projects and Titles.

As was discussed above, the Project's Elements and Modifiers are stored in Logic 1, while the various files may be dispersed in whatever fashion in the storage for media 2 (e.g., directories for files stored on magnetic media, CD-ROM, etc.). It is worth noting how the title builder 51 actually allocates storage (on a medium such as CD-ROM) for a standalone title, rather than a Project under development, such that the object loader 16 can efficiently load objects into memory. With the slow seek and read access time of CD-ROM, it is important to advantageously arrange data thereupon so as to minimize the amount of read-head thrashing.

In one embodiment, the logic 1 and various media 2 files are all placed in one file container, which is a contiguous arrangement of all the files, and which only has to be opened by the operating system once, always a costly operation in terms of time. Each asset will be written to disk in its rawest form, as nothing but the application itself will need to access the asset. Thus, a picture will be a compressed bitmap, rather than a PICT. It is thus imperative that the computer running the title be able to know where everything is within this file container, as it cannot resort to the operating system file utilities.

Thus, with reference to FIG. 27, one can see a cross-section of the available tracks on the CD-ROM 175 (neglecting the track curvature here for clarity). The actual application code 176 precedes all other data and is loaded into memory first. The Runtime engine embodied in the application code 176 would include all used players, Modifiers, Services, etc. Thereafter, the Structural Elements 177 (i.e. Project, Sections, Subsections), as well as Scenes, are stored and are all loaded in memory for the entirety of the title operation. The actual act of loading instantiates each of the objects in this embodiment.

The assets of individual Scenes are stored, each in turn, with the table of assets for the given Scene as a "hidden" asset. These tables of assets written to disk by the title builder 51 would be stripped of everything unnecessary for the title. Thus, unused assets as well as the user count are discarded. The asset manager 7, in conjunction with the title builder 51, also would have scanned the Scenes and correlated the order in the asset manager 7 database with layer order number for each of the Elements in the Scene before writing these assets and the tables of assets to disk.

In this example, there are three Scenes (Scene 1, Scene 2 and Scene 3), each with a table of assets 178, 181 and 183, respectively, which provides indices to all the assets within the given Scene. These are loaded, respectively, immediately preceding the beginning of the playing of their corresponding Scene. A flag in the table of assets determines whether an asset should be preloaded, meaning that the asset will be loaded immediately after the asset table is loaded and inspected, and memory allocated to the asset locked down. Following each of those tables are all of the objects (Elements and Modifiers) 179, 182 and 184, respectively, associated with each Scene. Thereafter would be stored individual media, as for example shown here for Scene 1, a background picture 180.

Typically, to save space, assets are stored in only one place on the CD-ROM 175. However, in order to minimize the read-head movement, and thus enhance Runtime performance, the asset manager 7 may be configured, during the authoring process, to store assets used more than once in multiple separate places. The order in which the media are presented in the asset manager 7 is the order in which the title builder 51 writes out the title for CD-ROM. It is thus also advantageous if the assets which are to be preloaded be up at the front of the asset manager 7, for the reasons discussed above.

3. Runtime Functionality.

Under the classification of Runtime functionality with reference to FIG. 24, one finds a world manager 10, a component manager 20, and the cross-platform architecture 50. The world manager 10 and component manager 20 can be referred to collectively as the core 99 (see FIG. 29).

The world manager 10 controls the overall processing of the Runtime functions and includes an asset manager 7, an alias manager 8, hypertext support 9, asset classes 11, media player classes 12, messaging management 13, a rendering manager 14, a sound manager 15, an object loader 16, memory manager 17, thread manager 18 and symbol manager 19, some already discussed above.

The asset classes 11 are the basic classes which describe the external resources, as for example fonts, pictures, movies, sounds, etc.

The media player classes 12 govern the low-level Runtime operation of a Project or title. They include picture players, movie players, sound players, etc.

The messaging management 13, discussed in more detail below, is the subsystem which controls the dispatch and targeting of messages among objects. Rather than operating on a method-to-method call basis, which often is unwieldy and slow, messages are dispatched through a communication network, relying heavily on the Structural and Behavioral Hierarchies, with these destinations resolved and optimized at Runtime.

The rendering manager 14 renders bitmaps to the display 3. The rendering manager 14 may also maintain alternate off-screen buffers, or "GWorlds." All draw commands are accumulated for optimal concurrent drawing operation during idle processor cycles, as discussed below.

The sound manager 15 controls the audio signal that is transmitted through the speaker 4.

The object loader 16 reads in definitions of the various objects (e.g. the instantiated Elements and Modifiers) for the particular title/Project from the logic 1 storage.

The memory manager 17 performs the low-level allocation of memory for the system.

The thread manager 18, as discussed more fully below, controls the multitasking threads of system 100, whether posted by the system 100 itself, by the Modifiers 22, or by the user interacting through the keyboard 5 or mouse 6 or other peripheral. In one embodiment, for the Apple Macintosh™ operating system, all threads are cooperative or real-time, cooperative meaning all other operations are suspended until a thread declares itself done, and real time meaning that they operate at a fixed time by invoking an interrupt. The former type is implemented with a list of timers, with regular checks to see if the timer has expired, and if so, processing the corresponding thread as soon as practicable. The latter type under the Macintosh operating system should only be used for short tasks; otherwise the system is likely to fail.

The symbol manager 19 associates names of objects with internal reference IDs. Given one, it will return the other. It is called upon by various modules throughout the system 100 to produce lists of messages, Elements, Modifiers, etc.

The component manager 20 (discussed in greater detail below) implements the extensibility of the architecture in accordance with the present invention, and includes the component API 21, a plurality of Modifier classes 22, the Service manager 23, and a plurality of Service classes 24.

Both the Modifier 22 and Service classes 24 are coupled to the system through the Component API 21, which is the application programmer's interface that enables the core 99 of the system 100 to communicate with the various Components (Modifiers and Services) created by programmers. The Component manager 20 permits programmers to add custom Modifiers and Services to the system. The Component API 21 actually permits Modifiers 22 and Services 24 to interface with each other as well as with core functions.

The service manager 23 inventories and manages the various Services 24, controlling, for example, how Modifiers become (or are removed as) clients of particular Services.

The Services 24 are, generally speaking, groups of functions or functionality accessible by a Modifier. Some key Services implement such vital functions as determining an object's parent, detecting collisions of Elements or providing time-of-day functionality.

The ability to add additional Services represents enormous extensibility of the functionality present in the system. For example, one could write an AppleScript™ Service which would allow scripts to be written through an Apple-Script Modifier and give access to the already-developed capabilities of the AppleScript language. Another example, discussed in more detail below, is to provide a "gravitational" service, with a gravity Modifier giving "mass" to its Elements.

Both Modifiers 22 and Services 24 use a form of dynamic binding, resolved at Runtime, implemented using the object model hereinafter described. This yields enormous flexibility in the overall design. For example, patch code can be provided separately and be incorporated into the system 100 during the Runtime binding process, overriding the existing code.

Finally, the cross-platform architecture 50 controls the access to low-level features that are platform-dependent. For each function that must be performed on the display 3 or through the operating system, a generic method call is made, which in turn makes the platform-dependent method call. This generic call may invoke a real function which prepares whatever overhead is required for the particular platform, or it may be simply a macro which invokes the platform-dependent function directly. The former scenario would occur where structures are not easily reconciled between platforms, as for example a window under the Apple Macintosh™ operating system as compared with one under Microsoft Windows™. Under these most extreme circumstances, a placeholder class is created to handle both implementations.

Thus, under the present invention, a title need not be "ported" to another platform—i.e., the code targeted for one platform need not be rewritten to run for a new platform. For example, the title can be built by title builder 51 in accordance with the platform-dependent methods for the various platforms supported by the system (e.g., Apple Macintosh™ 68K, PowerPC and Microsoft Windows™). In one embodiment, the particulars of dialog screens, for example the Modifier configuration dialogs discussed in depth earlier, are stored as device-independent scripts within the application, thus providing the dialogs for each platform transparently. This overall design philosophy prevents the various abstract functions from becoming too tightly bound to the implementations of a particular platform, which is the typical headache of the normal porting process. Typically, software quality assurance approaches would be fixated upon concentrating on only one platform implementation at a time, and freezing features until the overall structure is stable. The multi-platform approach here resolves this porting problem.

The functionality of the Runtime environment involves two major processes: (i) message targeting and dispatching, and (ii) event loop processing, both of which merit further discussion.

a. Message Targeting and Dispatching.

Typically object-oriented authoring systems provide no special mechanism for dispatching messages among objects. They simply rely on method-to-method function calls which necessitate a laborious search through function tables to access the proper methods. By contrast, under the principles of the present invention, messaging is accomplished by means more akin to a communication packet-switching system.

The problem posed in optimizing performance with regard to messaging is how to account for target destinations which may not yet exist at the time of authoring, yet not incur a time penalty for each message when the system searches tables for the proper target. This problem is exacerbated by the freedom afforded under the present invention to drag and drop objects from one environment to another.

The data structure for messaging in one embodiment of the invention is presented in Table III.

TABLE III

MESSAGE DATA STRUCTURE

| Member | Type | Description |
| --- | --- | --- |
| f_info | long | Flags describing the characteristics of the message, including whether the message be sent immediately, cascaded or relayed. |
| f_keysig | long | Special password for accessing proprietary Modifiers. |
| f_sender | void* | Identifies the sender of the message. |
| f_event | long | The ID code corresponding to the message name. |
| f_eventinfo | long | Adds any additional information for the message. |
| f_targetinfo | struct | The destination target information. |
| f_data | union | The various kinds of data (e.g. vector, another event) that can be sent with the message. |

Referring back to FIG. 1, consider the scenario in which the author desires that a Modifier M4 117 on Element E3 110 send a message to Element E2 109. Thus, the first step is to make available all possible destinations for Modifier M2 115 to the author in Edit Mode, as for example, through the Destination pop-up menu of the Modifier dialog. The Messaging Management 13 accesses the data structure of Modifier M4 117. Under the embodiment here, recalling the discussion above with respect to FIG. 25, one can readily understand how the Messaging Management 13 can access the ID cede of its parent, in this case Element E3 110. Knowing Element E3 110 allows Messaging Management 13 to access its data structure, yielding the ID code of parent Scene Sc1 106. It is clear that this process can thus be readily bootstrapped, to reproduce the entire Structural and Behavioral Hierarchies. Yet, in this embodiment, Messaging Management 13 only proceeds further to discern the chain of ancestors, from Scene Sc1 106 to Subsection SS1 104, Section S1 102 and Project 101. Element E3 110 could also yield its previous sibling, namely Element E2 109. However, in the current embodiment, the siblings of Element E3 108 are obtained in a different manner.

Knowing the parent Scene Sc1 106, one can obtain the pointer to its first child, namely E1 108. Then, Messaging Management 13 proceeds down the sibling list, namely Element E1 108, Element E2 109 and ending here with Element E3 110. Messaging Management 13 does this by broadcasting an identification request message to the Scene Sc1 106, which filters down one level so that the children of Scene Sc1 106 identify themselves as well. The process of locating the siblings of modifier M4 117 employs an analogous identification request broadcast, this time to Element E3 110.

The actual translation of ID codes into names for presentation to the author is accomplished by the Symbol Manager 19, which maintains all such name-ID code correspondences. Thus, the Destination pop-up menu is populated with all the actual names of these Elements and Modifiers, including Element E2 109. Thus, when the author references a target by name, the appropriate ID code is stuffed directly into the f_targetinfo piece of the message data structure. This whole process was referred to above as Direct Targeting.

However, the author might not want to reference by name, as for example, in the interests of reusability. Thus, the author can reference a target by "tag," a stand-in for most of those very same destinations presented in the Destination pop-up by name, and as described above as Relative Targeting in conjunction with Table II. Unlike the bootstrapping process discussed above, this process resolves the ID codes by proceeding directly up through the Structural and Behavioral Hierarchies, accessing the nearest-neighbor sibling Elements directly from the Element's next and previous Element pointers, rather than by the "identification request broadcast" procedure. Once the proper ID code has been resolved at Runtime in the first instance, the ID code can be stuffed into f_targetinfo, allowing the messaging to proceed in a targeted manner thereafter.

The embodiment discussed above permits targeted messaging to initial destinations within a somewhat fixed scope. It is suitable in most instances where there is a close relationship among Elements, or the number of Elements is rather small. To communicate to an Element outside this small family of Elements, in this embodiment, requires targeting the most recent common ancestor Element. The message will cascade down to that Element's progeny, including the real target Element.

For example, Modifier M2 115 could not target Element E4 111 directly in this embodiment, because the parent of Modifier M2 115 (Element E2 109) is neither an ancestor, child or sibling of Element E4 111; rather it is only an "uncle" of Element E4 111. Thus, Modifier M2 115 could target the most common ancestor of Element E2 109 and Element E4 111, that being Scene Sc1 106. Thus, Scene Sc1 106 would pass the message to its children, Elements E1 108, E2 109 and E3 110. It is worth noting that in the embodiment discussed here, Element E1 110 would pass the message to Element E4 111 before the message is passed from Element E1 108 to Element E2 109 (showing a preference for one's children over one's siblings).

In an alternate embodiment, however, it may be desirable to modify the Structural and Behavioral Hierarchies at Runtime, through Dynamic Creation (i.e., instantiation of objects), Transplantation or Adoption. Under this scenario, the destination might best be resolved each time the message needs to be sent. This would allow Relative Targeting to work, even though we have, in essence, "moving targets." To permit an author to achieve these dynamic functions, one merely need create a set of Modifiers which specify the conditions under which such events can occur.

b. Event Loop Processing.

The management of all tasks related to the execution of an application requires allocation of processor time among such tasks. Thus, with reference to FIG. 28, this process starting from block 250 may be described. In one embodiment, utilizing the Apple Macintosh™ operating system, various tasks may operate concurrently under what is known as cooperative multitasking, meaning that a task must surrender use of the computer's processor in order that another task may be serviced (as opposed to pre-emptive multitasking, where the processor may be usurped by another task without a declared surrender by the fast task). Thus, the decision box 251 represents the release of the processor by the operating system (including other applications and background network functions, for example) to system 100, which then performs pending tasks if the operating system is in what is termed here as an "idle cycle."

If the processor is not idle, and the operating system itself is not running some other task, the World Manager 10 determines whether there are any pending messages to any active Services or Modifiers at step 252. If there are any active Services or Modifiers, these Services and/or Modifiers are queried to determine whether processing such a message may be deferred at step 253. This is a decision that may be based on a lack of urgency, or whether the processing prompted by such message would hamper performance were it done at a time-critical moment, or various other factors. Thus, processing that needs to be done immediately is done at step 254 while deferred processing is scheduled through the posting of a thread at step 256 by the thread manager 18. One may even envisage a hybrid situation where some small amount of critical processing is done immediately while the rest is deferred through a posted thread. The final step 255 of the "non-idle" state is to relinquish the processor to the operating system to perform all its other tasks.

The idle cycle commences by a trigger for the animation of the Shared Scene 257. This step does not perform the actual drawing; rather, it is an opportunity to post draw commands for later implementation. This streamlines the actual drawing process, e.g., eliminating the need to draw portions of the display 3 due to motion in one layer when a covering layer that obscures the Element in the first layer continues to cover that portion of the display 3. It should be noted here that, whenever an Element is moved, prompting a draw command to show such movement, each of the Element's children is notified that the parent was redrawn, so each child Element can then post its own redraw command. Thus, children Elements can follow their parent Elements in accordance with the Hierarchical Relative Positioning mechanism discussed above. Next, animation of the currently active Scene is triggered at step 258 and similarly handled.

Next, all previously posted threads (either posted by Modifiers or Services at step 256, or by the system 100 itself) are processed at step 259. Thus, all motion Modifiers would proceed to move their Elements according to their prescribed manner of motion. Messenger Modifiers, if triggered, would post new messages to the system 100. Services would perform their "idle" processing, and so on.

Thereafter, all accumulated draw requests are performed at step 260. Each redraw command is specified by invalidating the old and new visible regions of the corresponding Element. As described above, that may be driven by posted requests from the Elements, or by Motion Modifiers, etc. There may be instances where particular Elements need to be notified that such drawing operations occurred. This decision is represented by step 261. For example, a QuickTime™ movie needs to know when to start its sound. Thus, such Elements would be so notified at step 262.

A similar housekeeping function is step 263, which inquires whether any sound files that were previously playing have actually ended. If so, then any necessary "end play" procedures can be executed (e.g., deallocating the memory taken up by the sound file). In other words, the corresponding Element receives this Environment Message and transitions to its "end play" state.

Finally, step 265 decides whether the idle process should relinquish control of the processor. There are titles, such as games, that have a significant amount of user interaction and screen updating that necessitate the use of a large fraction of the total processor time. On the other hand, a networked computer needs to perform regular background tasks to keep the network connection up and running. Thus, a sliding scale is established by the title's author, or set by a user, between the extremes of never giving up control (squeezing out all other tasks) and always giving up control (and suffering a performance penalty). The outcome of this decision step 265 is determined in accordance with this sliding scale.

When no system time is made available, the World Manager 10 must do the checking for the mouse 6 and keyboard 5 events. When a mouse down event occurs, the World Manager 10 will continue to track the mouse 6 while it is being dragged, although it will intermittently give up time to other threads, including the idle process. It is up to the World Manager 10, which knows the positions of all Elements, to determine which Element was selected in this manner.

C. Component API—"Programmer's-Eye View".

The current embodiment of the invention is geared toward almost unlimited extensibility. Programmers can add Components (Modifiers and Services that support them) that extend the system's architecture. These Components are indistinguishable from the system's built-in Modifiers and Services, which implement much of the system's external architecture discussed above. Thus, from the author's perspective, the system is extended seamlessly by the addition of new Modifiers (and supporting Services) to which the author has full access.

With reference to FIG. 29, one sees a plurality of modifiers 22a, 22b, 22c, . . . , 22z and a plurality of services 24a, 24b, 24c, . . . , 24z coupled to the core 99 of system 100 through the component API 21 as plug-in Components.

The core 99 in this embodiment is implemented through ordinary C++ classes. However, the modifiers 22 and Services 24 are not ordinary C++ classes. To permit extensibility of the system, they are implemented through the "MOM" object model described below. In order to handle these "new" Modifier/Service classes, "wrapper" classes 94 and 95 of the ordinary C++ type are provided to interface with them as was discussed above in the context of FIGS. 25 and 26. Through these wrapper classes, the Service manager 23 controls the Services 24 and the world manager 10 and Component manager 20 instantiates Modifiers, such as Modifier 96 illustrated in FIG. 29. The world manager 10 also instantiates Elements, such as Element 97, which are coupled to corresponding instances of a media player class 12 and an asset class 11.

It will be well understood to those of ordinary skill in the art that the media player classes could themselves be migrated out of the core 99, operating under the object model of the present invention and connected through a wrapper class and an API analogous to the Component API 21, making the types of media the system 100 can interact with an extensible feature as well.

1. Object Model.

The object model underlying this invention can be described as "shock proof." It lies along a spectrum in between "rugged" and "fragile" object models. A rugged object model would permit a programmer to change dynamically virtually any aspect of the class hierarchy (e.g., adding, modifying or deleting parent classes, subclasses or intermediate classes) without requiring recompilation or other modifications of existing classes. A fragile object model, on the other hand, would not permit a programmer to make any such changes dynamically.

The mFactory Object Model ("MOM") of this embodiment represents a compromise between these two extremes. Rather than incurring the overhead and performance penalties of a rugged object model, MOM permits a programmer dynamically to add subclasses, or add methods and/or fields to or otherwise augment superclasses, provided that the order in the class hierarchy is preserved. In this manner, most of the functionality that a user/author would desire as extensions to the system can be provided with minimal overhead, as compared to a rugged object model.

One aspect of MOM is that, at compilation time, each class identifies its associated superclasses and their estimated sizes. At Runtime, the class hierarchy is verified, particularly whether the sequence of classes is preserved. If it is preserved, then MOM adjusts for any differences in the sizes of the class structures by changing the offset field for each class structure to reflect the new difference in size. This permits new fields to be added to each class structure or entries to be added to the virtual function table (vtable) dynamically without global recompilation. If the class sequence is not preserved, the system will not crash; rather, the affected object(s) simply will not run.

Another aspect of MOM is its use of virtual tables. Programmers can access the virtual tables of their classes as well as the virtual tables of the superclasses above. The tables are created by the system and resolved upon loading. One can add fields and methods, though one cannot later rearrange them without a full recompile. One key advantage of this construct is that adding fields and methods to a superclass does not require recompilation of its subclass below.

With reference now to FIG. 30, the operation of MOM is described in detail. In FIG. 30, one sees a class hierarchy of classes "A", "B" and "C" represented by "self" class structures 126a for base class "A", 126b for class "B", and 126c for class "C". Prepended to each of the class structures is a pointer to the class' entry in vtabs 127, a table with pointers to each of the virtual tables present in the A/B/C class structure. In one embodiment, the pointer preceding the "self" structure is not directly accessed by the programmer, but rather is provided indirectly through a function call, relieving the programmer from the implementational details thereof.

From the pointer to the class structure 126c for class "C", for example, the pointer to its corresponding entry in vtabs 127 is obtained. From the appropriate pointer in vtabs 127 one can then recover the pointer into the appropriate vtable 128c for class "C". With such a pointer, one can then obtain the actual function pointer in the methods storage 129 to the appropriate method 129a, 129b, 129c, etc. In one embodiment, the vtable contains not only the function pointer, but the slot number of the class containing the version of the method that class "C" will call. Thus, if vtable 128c had for a particular function a slot number of "2", it would mean "C's" function would be called; if it had a slot number of "1", "B's" function would be called, and thus a slot number of "0" would designate the use of "A's" function, i.e. no overriding.

It is thus clear how the system is polymorphic, in that you can both override (replace the existing functionality) and overload (add to the existing functionality) methods of a subclass. As our example of overloading, for the "CompConstructor" method 129b shown here (which represents the method that creates or "constructs" a Component instantiation for class "C"), one could perform all the construction necessitated by class "C" itself, but rely on the construction performed by class "B" through an "Inherit" function which invokes "B's" class through its slot number. In the embodiment discussed here, the programmer's selection of either overloading or overriding is invoked through a function call, sparing the programmer from the implementational details of this bootstrapping. In actuality, the base class methods are accessed through C-function calls which reference the base class method through the corresponding slot number in the vtable.

With the above mechanism in place, it is clear how the "shock proof" mechanism of MOM works. If a programmer wished to add a new method 129z, say, to class "B", such method would be appended to the end of the existing methods 129a, 129b, 129c, etc. (though this time for class "B"). A new entry pointing to this method would be made in vtable 128b, at the end of that list. This would necessitate expanding the size of vtable 128b, and thus subsequent vtables (in this case vtable 128c) would be pushed back accordingly. The corresponding entries in vtabs 127 for the vtables subsequent to class "B" would thus also be updated to reflect this offset change. Changes in any of the class self data structures 126 themselves will be discussed in the context of Modifiers below.

A further advantage of this implementation is that a programmer can write Components as "C" functions, and MOM will treat these functions as methods of an inherited subclass. All the apparatus, as mentioned above, for maintaining this class hierarchy is hidden to such programmers through function calls.

2. Component Methods.

On an object-oriented level, Components comprise a MOM class hierarchy. The base Component class, "__Component", provides for three mandatory methods: (i) a creation/instantiation routine; (ii) a duplication routine; and (iii) a deletion routine. The mandatory methods are those which the core provides no default for, or for which the class would have no independent meaning absent its own method.

In accordance with the object authoring interface discussed above, these would be invoked, for example, when: a Modifier is dragged from the Modifier palettes 35a or 35b; an existing Modifier is selected and the "Duplicate" menu item is selected or the "Command-D" key sequence is typed; or, when an existing Modifier is selected and the "Delete" key is typed. The various Components are either direct subclasses of __Component, or themselves may form a hierarchy, such as the Messenger Modifier having as a subclass the If Messenger.

In addition to the mandatory methods listed above, a typical Modifier would include at least two more methods:

(i) presenting the author with the Modifier's configuration settings; and (ii) committing the author's modifications of those settings to memory. These would be invoked, respectively, when the author double-clicked on the Modifier's icon to bring up the Modifier's dialog box, and when the author clicked the "OK" button in lieu of the "Cancel" button to save all author changes.

A representative sample of the virtual functions of _Component in the current embodiment are described in Table IV as follows.

TABLE IV

| BASE COMPONENT CLASS FUNCTIONS | | |
|---|---|---|
| Name | Description | Comments |
| CompInit | entry point to Component methods (main function in C program). | Mandatory methods |
| CompConstructor | Create Component. | |
| CompCopyConstructor | Duplicate Component. | |
| CompDestructor | Destroy Component. | |
| CompEditorOpen | Prepare for Modifier edit. | Editor methods |
| CompEditorAccept | Commit edits to Modifier. | |
| CompProcessMessage | Act on message received. | Message processing methods |
| CompEventCount | Query Component as to the number of events it responds to. | |
| CompGetEvent | Query Component as to a particular event it responds | |
| CompSetEvent | Set Component to respond to a particular event. | |
| CompGetService | Get pointer to Service. | Service methods |
| CompAddClient | Register Component to Service. | |
| CompDeleteClient | Unregister Component from Service. | |
| CompGetProperty | Get stored Variable. | Variable methods |
| CompGetPropertyCount | Get number of stored Variables. | |
| CompSetProperty | Store Variable. | |
| CompGetSaveInfo | Asks a Component what revision it is, and its size. | Save/Restore methods |
| CompRestoreComponent | Restores the state of the Component as previously saved. | |
| CompSaveComponent | Saves the state of the Component upon exiting application. | |
| CompAddThread | Adds a new thread for execution. | Thread methods |
| CompKillThread | Deletes a given thread from further execution. | |
| CompCalculateDrawParams | Particular drawing functionalities, especially to alternate screen "GWorld". | Miscellaneous methods |
| CompDrawDeviceContext | | |
| CompDrawMedia | | |
| CompGetClipRegion | | |
| CompGetMargins | | |
| CompPostDrawMedia | | |
| CompDrawGWorld | | |
| CompPostDrawGWorld | | |
| CompPreDrawWorld | | |
| CompEditorAcceptChanges | Particular editor functionalities. | |
| CompEditorDeclineChanges | | |
| CompEditorIdle | | |
| CompEditorItemAdjustCursor | | |
| CompEditorItemChanged | | |
| CompEditorCustomDraw | | |
| CompEditorCustomClick | | |
| CompEditorItemTyping | | |
| CompEditorItemTyping | | |
| CompEditorValidateChanges | | |

TABLE IV-continued

| BASE COMPONENT CLASS FUNCTIONS | | |
|---|---|---|
| Name | Description | Comments |
| CompOpenMediaStream | Access to particular location in file of stream created by another | |

When a Component is first registered (as discussed below), a structure is created containing any class-wide data (in C language syntax):

```
typedef struct {
    struct**      f_vtabs;
    long*         f_soffsets;
    short         f_cindx;
} MFCDRec;
``` where "f_vtabs" represents the pointer to the vtabs table, i.e. the table which points to all virtual tables, from which the class' virtual table may be derived; "f_soffsets" is a table of offsets from the root of each self record in each of the base classes; and "f_cindx" is the Component index, which is an index maintained by the Component Manager 20 which allows the Component to access common information about such Component, such as its name. This structure is appended with the instance data.

An offset is used to allow for any changes in the size of structures of classes above it. Thus, the offsets are calculated at registration time (described below), allowing pointers to be calculated up the class hierarchy through the f_soffsets table. It should be noted that f_vtabs is assigned at the end of registration, when the objects have been loaded and all offsets in vtable sizes have been adjusted accordingly.

In actuality, the embodiment of MFCDRec in the Apple Macintosh™ 68K implementation contains one more structure member, "f_A4", which is a long integer. One drawback of the 68K system is the inability of code resources to have their own globals, such as strings or initialized variables. A normal application can have such globals, with register A5 pointing to the top of such global data. Thus, particular globals would be accessed via offsets with respect to A5.

Register A4 is used as the pointer to a code resource. Thus, if one code resource calls another's code resource, one could not know where that code resource's globals were, as there was no way of knowing what that code resource's A4 value was. Thus, dynamic loading on the 68K could not include globals, unless one was prepared to save and restore A4 pointers each time one code resource called another.

In the present embodiment, the Component can store the A4 value as well as the slot number of the vtable methods. Thus, there is no need to bracket method calls from one Component to another which set up and restore the values for A4. Thus, a transparent mechanism is provided to access globals within each Component.

An example of an instance data structure is presented in the case of a "gravity" Modifier, which would add "mass" to Elements, prompting them to "fall" in the presence of the gravitational "force," implemented as discussed below, through a Service. Thus, the structure for the instance data could be as described in Table V:

TABLE V

SAMPLE INSTANCE DATA STRUCTURE

| Member | Submember | Type | Description |
|---|---|---|---|
| f_enableEvent | f_type | short | Specifies the enabling event. |
| | f_event | long | |
| | f_event_info | long | |
| f_disableEvent | f_type | short | Specifies the disabling event. |
| | f_event | long | |
| | f_event_info | long | |
| f_mass | f_type | short | Specifies the Element's "mass". |
| | f_value | double | |
| f_lastvector | f_type | short | Specifies the Element's "position". |
| | f_angle | double | |
| | f_magnitude | double | |
| f_pixelvelocity | f_type | short | Specifies the Element's "velocity" in pixels. |
| | f_value.PNTX | short | |
| | f_value.PNTY | short | |
| f_totalMoved | PNTX | short | Specifies the total displacement since the Element started falling. |
| | PNTY | short | |
| f_startTime | — | long | Specifies the time the Element started falling. |

For the class-wide data one could have simply (in C language syntax):

```
typedef struct {
    double          g_constant;
} MYClassRec,    *MFClassPtr;
``` where g_constant is the gravitational "constant," expressing the overall strength of the gravitational force. By making it class-wide data, one could then easily override this data (e.g., with the electrical "constant," turning the gravity Modifier into an "electrical force" Modifier, the mass being replaced by electrical charge), yet leaving undisturbed all other mechanisms of the gravitational Modifier.

3. Registration Process.

Having explained what Components are and how they are created, the process of seamlessly integrating them into the system is now described.

In one embodiment of the invention, Components are loaded into the system at boot-up time. They are stored in "kits", special files containing code resources. In the Apple Macintosh™ 68K operating system, these code resources would be designated of type "XOBJ," each code resource accessible through its identification number and name. In the Macintosh PowerPC™ system, they would be stored as code fragments. Under Microsoft Windows™, these kits would be dynamic-link libraries (DLL's) with a particular file extension, e.g. ".MOM."

The process by which each Component becomes known to the core 99 is called registration. Each Component is identified through a unique 16 character ID string. In one embodiment, this ID string is the numeric representation of the exact time the Component was first created. The revision number of a particular Component is controlling in the event the application encounters the same Component (as evidenced by its ID string) among multiple kits. This is a very useful feature in the event patch code, bug fixes or enhancements for such Component are provided. If the core 99 encounters Components with identical ID string and revision numbers, then the system will retain the first one registered.

The actual registration or Component loading process is now described, with reference to FIG. 31. The process, which starts at step 275, first scans a directory or directories for kit files in step 276. In one embodiment, this would be a special directory named "Resources" at the same level in the directory structure as the application. Next, all kit files are identified at step 277. The file types for the various platforms provide the identifying mechanism as discussed earlier. The total number of Components is determined in step 278. Then, allocating the tables for accomodating all the Components counted is done at step 279.

Steps 280–283 represent a subprocess which loops, in three passes, through each of the kits identified at step 277 above. In step 280, the system initializes the serf records for each Component from the given kit, based on the Component's stored values for the sizes therefor and its class structure order. In step 281, the system initializes each of the methods for each Component as necessary, i.e. filling in the methods that are being overridden by such Component. In step 282, the virtual tables and vtabs table are created, with slot numbers inserted into the virtual tables, and actual sizes of self records established by walking up the chain of the real self records in the class hierarchy. The decision at step 283 determines whether the process should loop back to process further kits. Otherwise, the process terminates at step 284.

It can thus be understood, as an additional advantage, how this object model compensates for platform migration in that readjustments are made in the structure offsets that owe to the difference in byte alignments in data structure packing on one platform as compared with another.

4. Core and Service Utilities.

Services can be thought of as providing two basic types of functions: (i) as a repository of common functionality that can be accessed by different Modifiers; and (ii) as a server, by which various subscribed client Components are serviced. However, Modifiers as well as Services could be configured as servers, clients or both.

An example of the former would be a Service performing common housekeeping functions, or a library of mathematical or string functions. An example of the latter would be a collision Service that needs to know where all Elements are positioned in order to decide whether any two Elements have collided. The collision Messenger is the client of the collision Service for an Element that desires to be informed of collisions.

The Graphic Modifier, for example, requires no Service to provide color to its parent Element. However, if one wanted to ensure that the colors of all on-screen objects do not "clash", one might write a "fashion" Service that monitored all such colors and informed an "enhanced" Graphic Modifier of a clash.

One advantage of delegating a lot of functionality to a Service is that it keeps the Modifier's size down, certainly a concern when Modifiers will be multiply instantiated. Another advantage of being a Service is that it may be referenced in Modifier methods by name when set up to be a server, rather than applying slot numbers through vtables to be accessed.

As was seen above, Modifiers and Services interact in a very simple manner. Modifiers may be "users" of a particular Service. Therefore, they must notify the Service when to add or delete them from the list of active users thereof. For example, to write a gravitational Service, one must take into account how all objects with "mass" interact with one another, and so such a Service must know which Elements are "massive", i.e. contain a gravitational Modifier. Thus, the gravitational Service, knowing all the masses and positions, can apply the law of gravitation to change the positions of each massive Element according to the time slice involved. The List class, which maintains a dynamic list of clients, would reflect the active "users" or clients of the gravitational service.

As discussed above, the class structures and registration processes are entirely analogous for Services as they were for Modifiers. In fact, the only distinction between Services and Modifiers, from a data structure viewpoint, is that a Modifier has a flag set which indicates that it should be added to a Modifier Palette 35a or 35b, while a Service has this flag clear.

While Modifiers may be multiply instantiated as the need arises, it would be atypical that a Service be instantiated more than once. A notable exception would be to instantiate a "GWorld," an offscreen graphics world, as often as needed, especially for applications that are very graphics-intensive.

Referring once more to FIG. 26, one can see that the instantiated Services 168, 169 and 170 (again represented by double rectangles to signify their special class nature) are accessed through service wrappers 165, 166 and 167, respectively. The Services are thus referenced through a list 164, preferably maintained by the Service manager 23.

Because Services are not part of the Behavioral Hierarchy and are not visible to authors (as are Modifiers), they need not maintain the same pointers linking them together. In essence, they are independent objects called upon by Modifiers for support.

The MOM architecture above permits many modules inside the core 99 to be migrated easily into Components. For example, there is nothing to preclude the media player classes 12, the draw engine for the rendering manager 14, the memory manager 17, the file I/O for the object loader 16 or the database management system for the asset manager 7 from being implemented as a Service rather than being in the core 99. Thus, if one needed to scale up the system to handle an enormous number of objects, one could replace the database system of the asset manager 7 with a heavy-duty relational database system.

D. Examples.

Now that the functionality of an embodiment of the present invention has been explained, the true power of this invention, with respect to its ease of design and reusability, can be illustrated through particular working examples.

1. Snake.

This example serves to demonstrate how "Hierarchical Relative Positioning" and Relative Targeting of messages can be used to great advantage in producing a chained object whose overall motion is complicated, yet is achieved by simple motion and coordination between adjacent links in the chain.

In this example, illustrated in FIG. 32, an implementation of a snake is explained. In the layout view window 320, one notes five ovals representing the segments of the snake (SnakeHead 450, SnakeMiddle (1) 460, SnakeMiddle (2) 470, SnakeMiddle (3) 470 and SnakeTail 490). One may note that each segment has a Graphic Modifier, respectively 451, 461, 471, 481 and 491, that can be configured with a distinct color for eye-pleasing effect.

With respect to the Structural Hierarchy, SnakeHead 450 is the parent of SnakeMiddle (1) 460, which in turn is the parent of SnakeMiddle (2) 470, which in turn is the parent of SnakeMiddle (3) 470, which itself is the parent of SnakeTail 490. Thus, in accordance with Hierarchical Relative Positioning, movement by SnakeHead 450 is "added" to that of SnakeMiddle (1) 460, both of which "add" to the motion of SnakeMiddle (2) 470, and so on, until SnakeTail 490 is at the mercy of the motion of all its ancestors.

Each of SnakeMiddle (1) 460, SnakeMiddle (2) 470, SnakeMiddle (3) 470 and SnakeTail 490 is equipped with an identically configured Full Motion Modifier, respectively parts 462, 472, 482 and 492. Each has a path that consists of a sixteen step are which starts from the horizontal baseline (where the segment is lined up with its parent), takes four increments to rotate 45° about its parent, eight more to bring it to −45° of its parent, and then four more increments back to the baseline. These motions are out of phase in order to avoid the cumulative curling that could rotate the snake into a circle!

Thus, timer messengers are placed on each of these segments, respectively 463, 473, 483 and 494. Each is set to delay for one-half second and then transmit a "PreviousLinkStarted" message to its parent, with the cascade option turned off. With each of these segments triggered to start its Full Motion Modifier upon receipt of this same message, it is clear how a half-second time lag in the motion builds up in the snake. Notice that by turning off the cascade option, the middle segments are not confused by the message they sent and the message they received, even though named identically for reusability. It is clear that one could use different names for each segment's communication with the following one. Yet, one of the strengths of this design, its reusability, shows that one could add an indefinite number of "SnakeMiddle" segments and the snake would still work.

It is important to provide a mechanism to start the wriggling process. Thus, a Messenger 492 sitting on the SnakeTail 490 acts as a detector, waiting for a MouseDown event on that segment (as if one stepped on the snake). This Messenger 492 is programmed to send the PreviousLinkStarted message to SnakeTail 490 itseft, thus "faking" the propagation of this message from a non-existent segment behind.

On the SnakeHead 450, the PreviousLinkStarted message is interpreted differently. Rather than triggering an arcing motion, it triggers the SnakeHeadMotion 453 vector motion Modifier, which causes the entire snake to propagate in the direction of SnakeHeadVector 452. Thus, once the whole snake starts wriggling, it can start actually moving ahead. A Boundary Detection Messenger 455 detects whether the snake hits a wall, triggering a WallHit message which disables SnakeHeadMotion 453 and causes SnakeHit Sound 454 to echo the event.

It is clear that this design is very much an abstraction of a snake. Certainly, one could replace the ovals and arc motion with separate mToon sequences showing each snake segment swaying back and forth, each out of phase but joining smoothly with the adjacent segment so that it looks like one continuous snake. This would certainly build very easily on the architecture provided.

2. Fish.

This example serves to illustrate how an object may encapsulate differing Behaviors which are in competition with one another, yet coordinate with similar objects to produce a global or "collective" Behavior. In this example, illustrated in FIG. 33, an implementation of a school of fish is explained. In the layout view window 320, one notes three fish 360, 400 and 440 in Scene-A 350. The Graphic Modifier 356 is present simply to give the aquarium a pleasant sea color.

Before proceeding further into the implementation, it is useful to consider the physical model upon which this example is based. Fish have a tendency to school. Thus, there must be a certain probability that a fish, seeing another fish proceed in one direction, will follow that other fish. On the other hand, fish may spontaneously change direction. This may be due to the perception of a threat, food, another fish approaching too close, sheer caprice, etc. Thus, these two tendencies, to school or to change direction, are in tension with one another. Furthermore, if a fish is constrained to an aquarium, it must at some point reverse direction, otherwise it will crash into a wall. For simplicity's sake, the speed, though not direction, of each fish is constant.

Each of these fish 360, 400 and 440 is an mToon Element with an identical Behavioral Hierarchy, hence personality. Thus, the representation of the Behavioral Hierarchy from Modifier 361 through 398, contained in fish 360 and seen in the structure view window 330 is the same for fishes 440 and 440. Each fish has four Behaviors: StayInTank 370, Trend-Setting Behavior 380, Schooling Behavior 390 and ChangeVector 395. Most of these Behaviors, as will be seen, are driven by the Tick Messenger 366, which is like the "heart beat" of the fish, sending out a "Tick" message once per second.

There are two vector Variables (MyVelocity 362 and NewVelocity 363) which respectively define the fish's present and future headings. The actual motion is performed by the Vector Motion Modifier 365, which is keyed to MyVelocity 362. The Drag Motion Modifier 364 is simply there to allow the user to drag the fish around at will during Runtime. Finally, the Transparent Graphic Modifier 361 is there to give the background of the mToon the aquarium color.

There are some significant Variables placed at the Scene level which govern overall fish behavior: SchoolingProbability 351, SwitchProbability 352 and MaxSwitchAngle 355. These could probably be incorporated into the fish so that one could have different types of fish with slightly different swimming characteristics. SchoolingProbability 351 is the probability a fish will follow another, given its heading. SwitchProbability 352 is the probability that a fish will strike out on its own new heading. MaxSwitchAngle 355 defines a maximum change in angle if a fish does strike out on its own. Thus, if MaxSwitchAngle 355 was equal to forty-five degrees, then the new heading of the fish would be within ±45° of its original heading. Two less significant Variables, TopBottom 353 and LeftRight 354, are simply used as mnemonics for whether a fish has reached the vertical or horizontal constraints of the tank, respectively.

The StayInTank 370 Behavior constrains the fish to stay in the tank. Thus, TB Border Detection Messenger 371 and LR Border Detection Messenger 372 respectively detect whether the fish has reached the vertical and horizontal borders of Scene-A 350. When either happens, the respective Messenger would send a HitBorder message to the fish, with data equal to the values of TopBottom 353 or LeftRight 354, respectively. The BounceOffBorder 373 Miniscript Modifier, based on a HitBorder message, executes the following script:

```
if incoming = TopBottom then
    set NewVelocity.angle to (360-MyVelocity.angle)
else if incoming = LeftRight then
    set NewVelocity.angle to (180-MyVelocity.angle
end if
send "ChangeVector" to Element
```

Thus, the new heading is a reflection off the aquarium wall of the present heading, and such new heading is communicated to the fish. A BounceSound 374 sound Modifier, triggered also by the HitBorder message, is added for extra effect.

The Trend-Setting Behavior 380 implements how a fish strikes out on its own. The if Messenger DecideToRandomlySwitch 381, triggered every time the Tick message is received from Tick Messenger 366, sends a message SwitchDirection to the Element when the SwitchProbability 352 exceeds a random number from 1 to 100. The miniscript Modifier InvokeRandomDirection 382, triggered by the SwitchDirection message, executes this script:

```
set NewVelocity.angle to (MyVelocity.angle + rnd(2*MaxSwitchAngle) -
    MaxSwitchAngle)
send "ChangeVector" to Element
```

Thus, the new heading varies from the present heading by as much as MaxSwitchAngle 355, and such new heading is communicated to the fish.

The Schooling Behavior 390 implements the tendency to conform. It is premised on the fact that each fish would notice the heading of other fish in the school. To simulate this, each fish broadcasts to Scene-A 350 a "MyHeading" message with the actual vector MyVelocity 363 as data. It is triggered upon the receipt of the Tick message, plus an additional time delay, via the DelayedMyHeadingBroadcast timer Messenger 392. This delay simulates a "reaction time" for the other fish. By virtue of the broadcast to Scene-A 350, each fish will get this MyHeading message. This triggers the Schooling Decision 391 miniscript:

```
if rnd(99) < SchoolingProbability then
    set NewVelocity.angle to incoming.angle
end if
send "ChangeVector" to Element
```

Thus, the new heading will be equal to the heading of the other fish that sent the MyHeading message, with such new heading communicated to the fish.

The ChangeVector 395 behavior actually implements a change in heading, based on the ChangeVector message issued by any of StayInTank 370, Trend-Setting Behavior 380 or Schooling Behavior 390. It executes the following miniscript Modifier 398 script:

```
if NewVelocity.angle < 0 then
    set NewVelocity.angle to (360 + NewVelocity.angle)
end if
if ((NewVelocity.angle > 90) and (NewVelocity.angle < 270)) then
    set Element.range to LeftCelRange
else.
    set Element.range to RightCelRange
end if
set MyVelocity.angle to NewVelocity.angle
```

NeWVelocity 363 is fast corrected to be within 0 to 360 degrees. Then, the script determines whether the new heading is directed to the left, in which case a left-swimming range of animation cels of the mToon specified by LeftCelRange 396 is used; otherwise, the right-swimming range, RightCelRange 397 is used. Finally, the NewVelocity 363 is committed to the fish's actual velocity, MyVelocity 362.

It is clear that this fish could be improved by allowing for a more continuous range of animation cels based more closely on the fish's heading, and this can certainly be done in a straightforward fashion. One could also have schools form into "superschools," where each fish has a fictitious parent, its school, which itself has a heading, say the average heading of all fish in the school. The school would then broadcast to other schools. Thus, each school might influence the other schools to follow them, though with less probability than one fish within a school influences a sibling school member. This would allow a lot of the mechanisms built into the fish to be recycled at the school level. if one were dissatisfied with this fiction of the school parent, one could simply build a more complex schooling behavior into the fish, such as being influenced less by the headings of more distant fish than closer ones. The possibilities are certainly endless.

3. Windowing System.

This final example illustrates how the present invention provides selective reusability of object containers in new environments. As was discussed earlier, the difficulty of "mixing and matching" objects across different environments is a fundamental limitation of conventional OOP systems.

This example presents two similar, yet distinct, implementations of simple windowing systems created with an embodiment of the present invention. Each system develops complex functionality in a modular manner. The example then illustrates how easily individual modules of one system can be reused in the environment of the other system, with little or no effort (much less programming) on the part of the author.

The example intentionally mimics the public data structures and methods likely to be present in a traditional OOP implementation of a similar system (such as the windowing system described earlier with respect to the background of this invention). In this manner, the distinctions between the interdependencies of classes in an OOP class hierarchy and this system's isolation of an object container's dependencies on its external environment, should become quite evident.

Figure 34A:
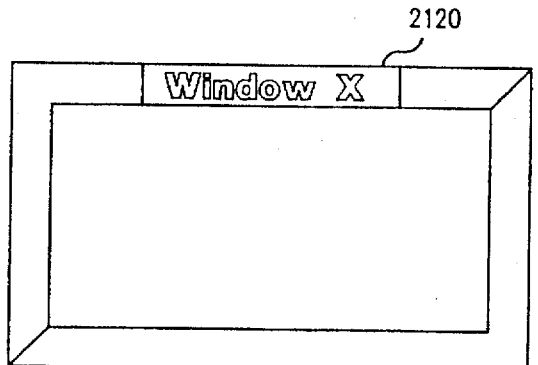
Figure 34B:
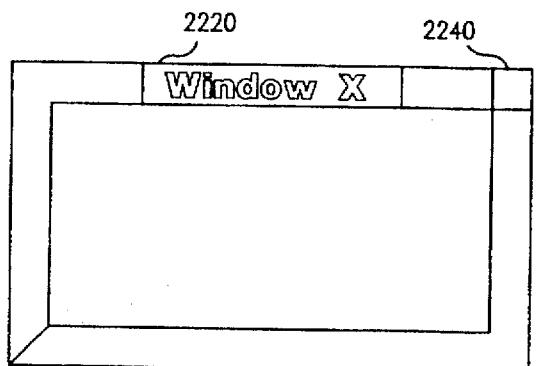
Figure 34C:
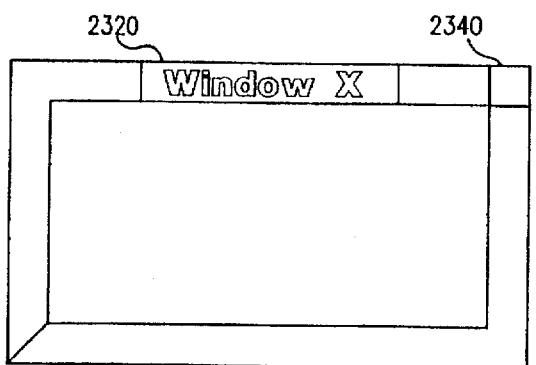

With reference to FIGS. 34(a)–34(g), this example will now be discussed in detail. A bevelled window 2100 with title bar 2120, labelled "Window X," is shown in FIG. 34(a). It can be analogized to the public interface to the base class of the window class hierarchy described above. Analogizing to a derived class, a minimize box 2240 is added to the bevelled window 2200, with title bar 2220, as illustrated in FIG. 34(b). Clicking on the minimize box 2240 reduces the window 2200, together with the title bar 2220, to a small icon (not shown). Finally, dragging capability is added, again analogous to a derived class from a minimize class which in turn was derived from the bevelled window class. In this regard, bevelled window 2300 can be dragged on display 3 by clicking and dragging a mouse 6 on title bar 2320.

Figure 34D:
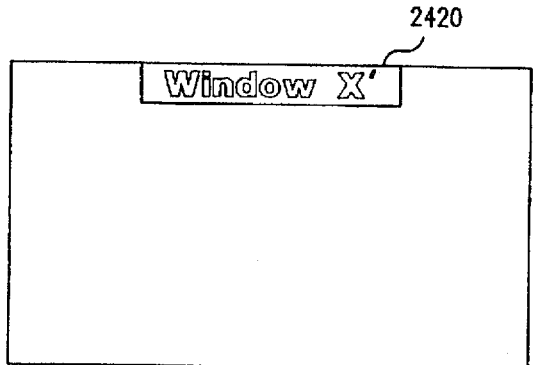
Figure 34E:
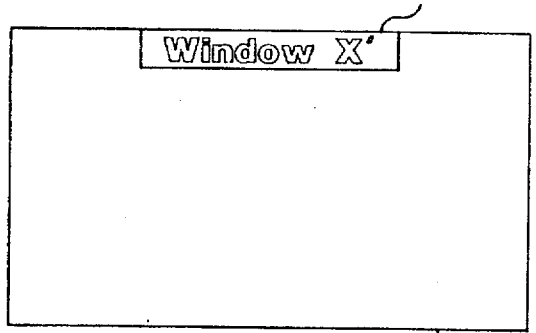

The alternative windowing system, illustrated in FIG. 34(d), includes a simple window 2400 (no bevel) with title bar 2420, labelled "Window X" to denote its pedigree separate from "Window X". In lieu of the minimize capability of the first windowing system, a "window shade" capability is added to window 2500 with title bar 2520. Double clicking this title bar 2520 causes the window 2500 to be hidden, reducing the display 3 area taken up by the window by an alternative means to icon minimization.

Figure 34F:
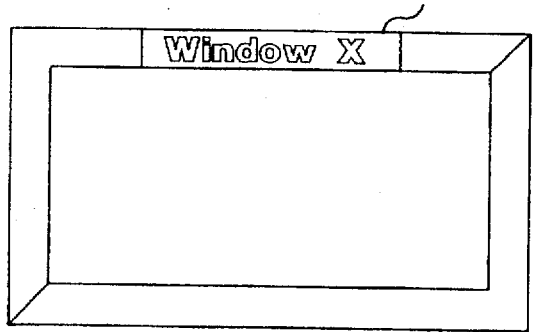

In FIG. 34(f), the bevelled window 2600, with title bar 2620, operates with functionality from both systems. The window 2600 may be dragged around freely via title bar 2620 as in the initial system, but the minimize capability has been replaced with the "window shade" feature from the second system.

Figure 34G:
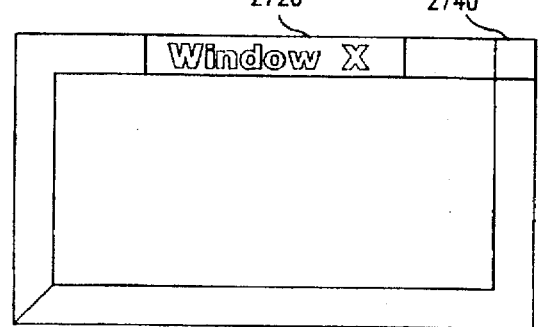
Figure 35A:
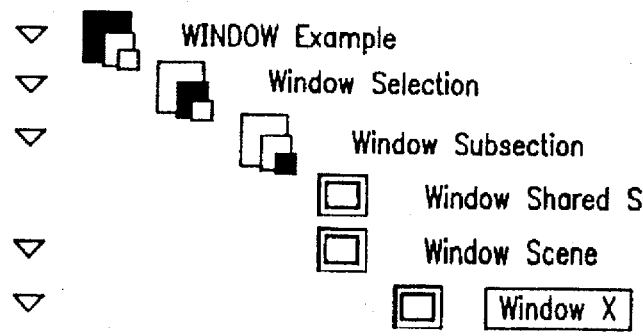

Finally, FIG. 34(g) shows the full hybridization of the two systems. The minimize capability is added back in, in addition to the "window shade" feature. Bevelled window 2700 may be dragged around by its title bar 2720, minimized to an icon by clicking on minimize box 2740, and may be "drawn up" in shade fashion through a double click on title bar 2720.

All features continue to operate in their new environment, with very little integration required beyond simple interface issues. The isolation of dependencies at each step of the process are of particular interest.

The implementation of these windowing systems is described below in detail with reference to FIGS. 35(a)–35(g). Apart from the purely structural Elements of Project "WINDOW Example" 2000 (namely Window Section 2010, Window Subsection 2020, Window Shared Scene 2030 and Window Scene 2040), Window X 2100 (illustrated in FIG. 35(a)) contains various Modifiers analogous to the "public interface" of an OOP class.

For example, the name of Window X 2100 is stored in string Variable Modifier Name 2101. The coordinates of its bounding rectangle are stored in Point Variable Modifiers BoundingRect_TopLeft 2102 and BoundingRect 2103, while Graphic Modifier 2104 provides its color, and Image Effect Modifier 2105 its bevelled appearance.

Miniscript Modifier "CREATE Window" provides a function akin to a creation or initialization method which often is executed at the beginning of the Scene 2040:

set position.x to BoundingRect_TopLeft.x set position.y to BoundingRect_TopLeft.y set height to BoundingRect_BottomRight.y—BoundingRect_TopLeft.y set width to BoundingRect_BottomRight.x—BoundingRect_TopLeft.x The position of Window X 2100 is set to the bounding rectangle's upper left-hand corner, and it's dimensions are set by the bounding rectangle's height and width.

The title bar "TitleBar" 2120 is a child of Window X 2100, and it too has a "public interface" comprised of point Variable Modifiers TitleRect_TopLeft 2123 and TitleRect_BottomRight 2124, which form the bounding rectangle of title bar 2120, with Text Style Modifier 2121 which sets the title's font size and style, a Graphic Modifier 2122 which sets its foreground and background colors (black and white, respectively).

The Miniscript Modifier "CREATE TitleBar" 2125 is the creation "method" for TitleBar 2120 and is executed at the beginning of Scene 2040.

set text to Name set TitleRect_TopLeft.x to 0 set TitleRect_TopLeft.y to 0 set TitleRect_BottomRight.x to BoundingRect_BottomRight.x—BoundingRect_TopLeft.x set TitleRect_BottomRight.y to 20 set position.x to (TitleRect_TopLeft.x+TitleRect_BottomRight.x–width)/2 set position.y to (TitleRect_TopLeft.y+TitleRect_BottomRight.y–height)/2

The text of TitleBar 2120 is set to Name 2101. The bounding rectangle of the title "area" is set to the top 20 pixels of Window X 2100, and the position of the TitleBar 2120 is centered within such bounding rectangle. Thus, the non-functional appearance of window 2120 in FIG. 34(a) is obtained.

Minimize box "MinBox" 2240, illustrated in FIG. 35(b), is then added to window "Window X+MinMax" 2200 with TitleBar 2200. The functions of all Modifiers 2201–2206 and 2221–2225 are identical to the corresponding Modifiers 2101–2106 and 2121–2125, and thus need not be repeated here.

However, both window "Window X+MinMax" 2200 and TitleBar 2226 have identical (in this example, aliased) versions, respectively 2207 and 2226, of Behavior Modifier MinMaxResponse. Its purpose will be understood in conjunction with a description of MinBox 2240. It too has a public interface comprised of a Boolean Variable Modifier MinFlag 2243 (which indicates whether the window 2200 is minimized or not), point Variable Modifiers BoxRect_TopLeft 2244 and BoxRect_BottomRight 2245 (which define the bounding rectangle of MinBox 2240), MinICONDimensions 2246 and the height and width of the minimized icon, the Image Effect Modifier 2241 (which gives MinBox 2240 a bevelled appearance when clicked on), and Graphic Modifier 2242 (to set its color.

Miniscript Modifier "CREATE MinBox" 2247 initializes MinBox 2240 at the beginning of Scene 2040 as follows:

set MinFlag to false
    set width to 20
    set height to 20
    set BoxRect_TopLeft.x to BoundingRect_BottomRight.x—BoundingRect_TopLeft.x–width
    set BoxRect_TopLeft.y to 0
    set BoxRect_BottomRight.x to BoxRect_TopLeft.x+width
    set BoxRect_BottomRight.y to BoxRect_TopLeft.y+height
    set position to BoxRect_TopLeft
    set MinICONDimensions to (40,40)

MinBox 2240 is initially maximized (as indicated by the flag being set to false), 20 pixels on a side, at the upper right hand corner of window 2200, with an iconized state of 40 pixels on a side.

MinMaxBehavior Modifier 2248 controls the minimizing operation. Receipt of a mouse down within the bounding rectangle of MinBox 2240 causes Miniscript Modifier DetectMinBoxSelect 2249 to be executed:

set MinFlag to not MinFlag
    send "MinBoxActivated" with MinFlag to element's parent The state of MinFlag 2243 is toggled and the message "MinBoxActivated" is sent, along with the new state of MinFlag 2243, to the parent of MinBox 2240, in a Relative Targeting fashion. This turns out to be the window 2200 itself. Thus, this message triggers the two instances of MinMaxResponse 2207 and 2226 on window 2200 and TitleBar 2200, respectively.

As seen under MinMaxResponse 2207, this aliased Behavior has two If Messenger Modifiers under it, "Max Response" 2208 and "Min Response" 2209. They each command the Element to be shown or hidden. Thus, window 2200 and TitleBar 2200 will either reappear or disappear when the MinBox 2240 is clicked. The receipt of the message "MinBoxActivated" by MinMaxBehavior 2248 causes Miniscript Modifier "MinMax Response" 2250 to be invoked:

```
if incoming = true then
    set width to MinICONDimensions.x
    set height to MinICONDimensions.y
    set position.x to - (element's parent.position.x)
    set position.y to scene.height - element's parent.position.y - MinICONDimensions.y
else
    send "Scene Started" to element
end if
```

If MinFlag 2243 is true (as the incoming data), MinBox 2240 is minimized by setting its dimensions to the icon dimensions MinICONDimensions 2246, and is placed in the lower left hand corner of Scene 2040 (including calculations of the relative coordinates of Parent window 2200). If MinFlag 2243 is false, a "Scene Started" Environment Message is sent to the Element, which is a shorthand way to reinvoke the initialization Miniscript Modifier "Create MinBox" 2247.

The window "Window X+MinMax+Drag" 2300 adds the dragging functionality to TitleBar 2320. MinBox 2340 is a passive beneficiary of this dragging ability by virtue of its status as a child of window 2300, thus being dragged due to Hierarchical Relative Positioning. Its implementation is identical to MinBox 2240 (including all its contained Modifiers), and thus need not be repeated again. Also, Modifiers 2301–2307 and 2321–2326 are identical to Modifiers 2201–2207 and 2221–2226 (including any contained Modifiers), respectively, and need not be described again.

The dragging ability is implemented through TitleBar DRAG Behavior 2327. Had TitleBar 2320 been the parent of window 2300 instead of its child, Hierarchical Relative Positioning would have handled the movement of window 2300 automatically. In any event, upon receiving a mouse down within TitleBar 2320, Messenger MouseDown 2329 sends a TitleBarMouseDown message to its Element's parent, namely window 2300. Similarly, a successive mouse up event will cause the TitleBarMouseUp message to be transmitted to window 2300. A mouse down also invokes the Miniscript Modifier CalcMouseOffset 2330, which calculates the offset, stored as point Variable MouseOffset 2328, between the mouse down and window 2300 positions.

set MouseOffset to mouse—element's parent.position.

Timer Messenger TitleBarMouseTracking 2331, which is respectively enabled and disabled by mouse downs and mouse ups, loops repeatedly with no time delay (meaning no delay within the limits of idle cycling) and sends the message TitleBarMouseTracking with MouseOffset 2328 as data.

The primary purpose of the TitleBar Drag Behavior 2327 is to invoke the Window Drag Behavior 2308 between the TitleBarMouseDown and TitleBarMouseUp messages, through its Follow Mouse Miniscript Modifier 2309, whose simple script is as follows:

set position to mouse—incoming.

Thus, resetting the position of window 2300 in accordance with MouseOffset 2328 (which was passed as data) brings the window 2300 into the position it would have been had it been dragged directly via a Drag Motion Modifier.

FIG. 35(d) introduces the implementation of the alternative windowing system, namely that built upon Window X' 2400. It is virtually identical to Window X, particularly with respect its use of Modifiers Name 2400, BoundingRect_TopLeft 2402, BoundingRect_BottomRight 2403, Graphic Modifier 2404, CREATE Window 2405, as well as Modifiers under TitleBar 2420. The sole difference is the lack of Image Effect Modifier 2105, and thus no beveling, as illustrated in FIG. 34(d).

The window "Window X'+WindowShade" 2500 introduces the "window shade" feature, as seen in FIG. 35(e). Modifiers 2501–2505 and 2521–2525 are familiar incarnations of previous windows and need not be described again. The window shade feature is implemented through WinShadeBehavior 2526 which relies on Window WinShade Response 2506. Thus, Boolean Variable Modifier WinShadeFlag 2527 stores the window shade "state" (up=true, down=false) of window, 2500, with Miniscript Modifier INITFlag 2529 simply initializing this state to false.

The invocation of the window shade feature is accomplished by a double mouse click on TitleBar 2520. The DetectDoubleClick Behavior 2530 detects a double mouse click. An INITFlag Miniscript Modifier 2532 sets a Boolean Variable Modifier ClickFlag 2531 to false at the beginning of Scene 2040. Upon the detection of a Mouse Up event inside TitleBar 2520, the MouseUpResponse Miniscript Modifier 2533 is run with the following script:

```
if ClickFlag = true then
        set WinShadeFlag to not WinShadeFlag
        send "WindowShadeActivated" with WinShadeFlag to element's
        parent
        set ClickFlag to false
else
        set ClickFlag to true
end if
```

Thus, the state of ClickFlag 2531 is toggled. If it was true, the state of WinShadeFlag 2527 is toggled and sent with message "WindowShadeActivated" to window 2500. Click Timer 2534 tracks the maximum length of time allowed in between single clicks of a double click, and is also invoked by the Mouse up event inside TitleBar 2520. When Clock Timer 2534 times out, it sends the message SingleClick, which invokes the SingleClick Miniscript Modifier 2535 which sets ClickFlag 2531 to false. In other words, if MouseUpResponse 2533 is not invoked before SingleClick 2535 is triggered, then the WindowShadeActivated message will not be sent.

The WindowShadeActivated message is received by the "WINDOW WinShadeResponse" Behavior 2506, which either triggers the If Messenger "ShadeDown Response" 2507 which commands the window 2500 to show or the If Messenger "ShadeUp Response" 2508 which commands the window 2500 to hide, depending on the state of WinShadeFlag 2527 (transmitted as data).

Finally, WinShade Sound 2528 provides a "window shading" sound effect, invoked when the TitleBar 2520 itself receives the WindowShadeActivated message, regardless of the state of WinShadeFlag 2527.

FIG. 35(f) illustrates how easily the minimizing feature in window 2300 can be replaced by the window shade feature from window 2500 and integrated into window "Window X+WindowShade+Drag" 2600, despite the fact that they come from two different environments (analogous to two different "class hierarchies").

"WINDOW WinShadeResponse" 2607 replaces MinMaxResponse 2307, WinShadeBehavior 2626 replaces MinMaxResponse 2326 within TitleBar 2620, and MinBox 2340 is removed. All other Modifiers (2601–2606, 2608, 2621–2625 and 2627) continue to operate as do their counterparts in the previous windows. And the window 2600 somehow just "works".

Though it utilizes MinBox 2340, Window 2600 (including its Window Drag Behavior 2308 and TitleBar Drag Behavior 2327) was not dependent on the existence of MinBox 2340. The fact that messages no longer cascade down to a MinBox does not affect the operation of the window, unlike the situation in which an OOP superclass is replaced, causing its tightly coupled former subclass to "break" in an effort to locate the missing (inherited) methods and data structures. Even had an explicit reference to a MinBox Modifier been left behind, this windowing system would not break. The affected Modifier would simply stop working until this dependency was identified and resolved (a task that still would not require the author to have access to the private data structures or methods of any object).

FIG. 35(g) shows how a window ALL 2700 could in fact incorporate both the features of window 2300 and 2500, i.e. have the window shade as well as the minimize feature. With comparison to window 2600 in FIG. 35(f), the MinMaxResponse 2707 has returned under window 2700, as has MinMaxResponse 2726 under TitleBar 2720. MinBox 2740 has been reintroduced, though with the addition of a "MINBOX WinShadeResponse" Behavior 2749 identical in function to the Window WinShadeReponse 2708. AH Modifiers 2701–2706, 2708, 2709, 2721–2728, and 2741–2748 again operate as do their counterparts in previous windows.

In summary, this example illustrates the modularity of the Elements and Behaviors of the current invention. In one respect, these object containers are quite independent of one another, relying on message broadcasting within the relatively narrow confines of the Structural and Behavioral Hierarchies. Adding a new Behavior from a foreign environment often requires either no additional work or the relatively simple integration of a copy of an existing Behavior within an existing Element. Even where dependencies exist, they are evident from the surface (i.e., the configuration of the Elements and Modifiers being transferred), as opposed to being inextricably intertwined with their former container environments, which often requires recompilation, access to third-party source code and, ultimately, fairly extensive programming.

Although the invention has been described in detail with reference to its presently preferred embodiments, it will be understood by one of ordinary skill in the art that various modifications can be made, without departing from the spirit and the scope of the invention. Accordingly, it is not intended that the invention be limited except as by the appended claims.

We claim:

1. An application development system comprising:
   (a) a first class of Element objects from which one or more Elements can be instantiated, the first class defining a first set of characteristics inherent to each Element object in the first class;
   (b) a second class of Modifier objects from which one or more Modifiers can be instantiated, the second class defining a second set of characteristics inherent to each Modifier object in the second class;
   (c) an instantiation mechanism that enables a first Element and a second Element to be instantiated from the first class of Element objects, and further enables a first Modifier to be instantiated from the second class of Modifier objects;
   (d) a first hierarchical linking mechanism that enables an author to link the first Element as a parent to the first Modifier, the first Element attaining the second set of characteristics while the first Element and the first Modifier remain linked; and
   (e) a second hierarchical linking mechanism that enables an author to link the first Element as a parent to the second Element, the first Element providing an environmental frame of reference for the second Element and the first Modifier.

2. An application development system comprising:
   (a) a first class of Element objects from which one or more Elements can be instantiated, the first class defining a first set of characteristics inherent to each Element in the first class;
   (b) a second class of Modifier objects from which one or more Modifiers can be instantiated, the second class defining a second set of characteristics inherent to each Modifier in the second class;
   (c) a third class of Element objects from which one or more Elements can be instantiated, the third class defining a third set of characteristics inherent to each Element in the third class;

(d) an instantiation mechanism that enables a first Element to be instantiated from the first class, and further enables a second Element to be instantiated from the third class, and further enables a first Modifier to be instantiated from the second class;

(e) a first hierarchical linking mechanism that enables the first Element to be linked to the first Modifier, the first Element providing an environmental frame of reference for the first Modifier, and attaining the second set of characteristics, while the first Element and first Modifier remain linked; and (f) a second hierarchical linking mechanism that enables the first Element to be linked to the second Element, the first Element providing an environmental frame of reference for the second Element while the first and second Elements remain linked, whereby the system enables the creation of an object hierarchy.

3. The application development system of claim 2 wherein the first and third classes are equivalent.

4. The application development system of claim 2 or 3 wherein:

(a) the first Element's set of characteristics includes a current position of the first Element;

(b) the second Element's set of characteristics includes a current position of the second Element; and (c) the environmental frame of reference provided by the first Element is manifested at least in part by a Hierarchical Relative Positioning mechanism that determines the current position of the second Element relative to the current position of the first Element.

5. An application development system comprising:

(a) a first class of Element objects from which one or more Elements can be instantiated, the first class defining a first set of characteristics inherent to each Element in the first class;

(b) a second class of Modifier objects from which one or more Modifiers can be instantiated, the second class defining a second set of characteristics inherent to each Modifier in the second class;

(c) an instantiation mechanism that enables a first Element to be instantiated from the first class, and further enables a first Modifier to be instantiated from the second class; and (d) a hierarchical linking mechanism that enables the first Element to be linked to the first Modifier, the first Element attaining the second set of characteristics while the first Element and first Modifier remain linked, whereby the system enables a form of object-based authoring through the modification of the behavior of an object without modifying the system's underlying class hierarchy.

6. The application development system of claim 5 wherein:

(a) the first Element's set of characteristics includes a current position of the first Element that is visually perceptible to a user of the system; and (b) the first Modifier's set of characteristics includes the ability to detect when the current position of the first Element crosses a predetermined boundary.

7. The application development system of claim 5 wherein the first Modifier's set of characteristics includes the ability to detect a collision between the first Element and another Element.

8. The application development system of claim 5 wherein:

(a) the first Element constitutes a first object container containing the first Modifier while the first Element and first Modifier remain linked; and (b) the system can discern automatically dependencies of that first object container.

9. The application development system of claim 8 wherein:

(a) the first Element's set of characteristics includes a current position of the first Element;

(b) the system further comprises a relative positioning mechanism that determines the current position of the first Element relative to a current position of an ancestor Element of the first Element; and (c) the dependencies of the first object container include the current position of the first Element.

10. The application development system of claim 8 wherein:

(a) the system further comprises an object configuration and messaging mechanism that allows the first Modifier to be configured to perform an action in response to the receipt of a specified message; and (b) the dependencies of the first object container include the specified message to which the first Modifier is configured to respond.

11. The application development system of claim 8 wherein:

(a) the system further comprises Variable Modifiers having a third set of characteristics inherent to each Variable Modifier, the third set of characteristics including the ability to store data on behalf of an Element;

(b) the system further comprises an object configuration and variable scoping mechanism that allows the first Modifier to be configured to access a second Variable Modifier, provided that the second Variable Modifier stores data on behalf of the first Element or an ancestor Element of the first Element; and (c) the dependencies of the first object container include the data stored by the second Variable Modifier.

12. An application development system comprising:

(a) a first class of Element objects from which one or more Elements can be instantiated, the first class defining a first set of characteristics inherent to each Element in the first class;

(b) a second class of Modifier objects from which one or more Modifiers can be instantiated, the second class defining a second set of characteristics inherent to each Modifier in the second class;

(c) an instantiation mechanism that enables a first Element to be instantiated from the first class, and further enables a first Modifier to be instantiated from the second class; and (d) a hierarchical linking mechanism that enables the first Element to be linked to the first Modifier, the first Element providing an environmental frame of reference for the first Modifier while the first Element and first Modifier remain linked, whereby the system enables the behavior of an Element to be modified.

13. The application development system of claim 2 or 12 wherein:

(a) the system further comprises a messaging mechanism that sends messages to Elements and Modifiers; and (b) the environmental frame of reference provided by the first Element is manifested at least in part by a Hierarchical Message Broadcasting mechanism that uses the messaging mechanism to broadcast a message sent to the first Element to descendants of the first Element.

14. The application development system of claims 2 or 12 wherein:
   (a) the system further comprises Variable Modifiers having a fourth set of characteristics inherent to each Variable Modifier, the fourth set of characteristics including the ability to store data on behalf of an Element; and
   (b) the environmental frame of reference provided by the first Element is manifested at least in part by a Hierarchical Variable Scoping mechanism that renders data stored in a Variable Modifier on behalf of the first Element accessible to descendants of the first Element.

15. The application development system of claim 5 or 12 wherein:
   (a) the first Element's set of characteristics includes a current position and a graphic representation of the first Element that are visually perceptible to a user of the system; and
   (b) the first Modifier's set of characteristics includes the ability to change the current position of the first Element over time.

16. The application development system of claim 5 or 12 wherein:
   (a) the first Element's set of characteristics includes a graphic representation of the first Element that is visually perceptible to a user of the system; and
   (b) the first Modifier's set of characteristics includes graphic attributes that alter the first Element's graphic representation.

17. An application development system comprising:
   (a) a first class of Behavior objects from which one or more Behaviors can be instantiated, the first class defining a first set of characteristics inherent to each Behavior in the first class;
   (b) a second class of Modifier objects from which one or more Modifiers can be instantiated, the second class defining a second set of characteristics inherent to each Modifier in the second class;
   (c) an instantiation mechanism that enables a first Behavior to be instantiated from the first class, and further enables a first Modifier to be instantiated from the second class; and
   (d) a hierarchical linking mechanism that enables the first Behavior to be linked to the first Modifier, the first Behavior providing an environmental frame of reference for the first Modifier while the first Behavior and first Modifier remain linked, whereby the system enables a behavioral hierarchy of Modifiers to be created.

18. The application development system of claim 17 wherein:
   (a) the system further comprises a messaging mechanism that sends messages to Behaviors and Modifiers; and
   (b) the environmental frame of reference provided by the first Behavior is manifested at least in part by a Hierarchical Message Broadcasting mechanism that uses the messaging mechanism to broadcast a message sent to the first Behavior to descendants of the first Behavior.

19. The application development system of claim 17 wherein:
   (a) the system further comprises Variable Modifiers having a fourth set of characteristics inherent to each Variable Modifier, the fourth set of characteristics including the ability to store data on behalf of a Behavior; and
   (b) the environmental frame of reference provided by the first Behavior is manifested at least in part by a Hierarchical Variable Scoping mechanism that renders data stored in a Variable Modifier on behalf of the first Behavior accessible to descendants of the first Behavior.

20. The application development system of claim 7, 12 or 17 wherein the second set of characteristics includes the ability to send a message to another Modifier.

21. An application development system comprising:
   (a) a first class of Element objects from which one or more Elements can be instantiated, the first class defining a first set of characteristics inherent to each Element in the first class;
   (b) a second class of Modifier objects from which one or more Modifiers can be instantiated, the second class defining a second set of characteristics inherent to each Modifier in the second class;
   (c) a third class of Behavior objects from which one or more Behaviors can be instantiated, the third class defining a third set of characteristics inherent to each Behavior in the third class;
   (d) a fourth class of Modifier objects from which one or more Modifiers can be instantiated, the fourth class defining a fourth set of characteristics inherent to each Modifier in the fourth class;
   (e) an instantiation mechanism that enables a first Element to be instantiated from the first class, and further enables a first Modifier to be instantiated from the second class, and further enables a first Behavior to be instantiated from the third class, and further enables a second Modifier to be instantiated from the fourth class; and
   (f) a hierarchical linking mechanism that enables:
      (1) linking of the first Element to the first Modifier and the first Behavior; and
      (2) linking of the first Behavior to the second Modifier, wherein the first Behavior attains the fourth set of characteristics while the first Behavior and second Modifier remain linked, and the first Element attains the second, third and fourth sets of characteristics, while the first Element, first Behavior and first and second Modifiers remain linked, whereby the first, second, third and fourth sets of characteristics define the first Element's personality.

22. An application development system comprising:
   (a) a plurality of object classes from which one or more objects can be instantiated, each class defining a set of characteristics inherent to each object in that class;
   (b) an instantiation mechanism that enables a first object having a first set of characteristics to be instantiated from the plurality of object classes, and further enables a second object having a second set of characteristics to be instantiated from the plurality of object classes, and further enables a third object having a third set of characteristics to be instantiated from the plurality of object classes, and further enables a fourth object having a fourth set of characteristics to be instantiated from the plurality of object classes; and
   (c) a hierarchical linking mechanism that enables:
      (i) creation of a first object container by linking the first object to the second object, wherein the first object provides an environmental frame of reference for the second object while the first and second objects remain linked;

(ii) creation of a second object container by linking the second object to the third object, wherein the second object provides an environmental frame of reference for the third object while the second and third objects remain linked; and (iii) replacement of the second object with the fourth object by breaking the links between the second object and the first and third objects, and establishing corresponding links between the fourth object and the first and third objects, such that the first object provides an environmental frame of reference for the fourth object, which in turn provides an environmental frame of reference for the third object, while the first, third and fourth objects remain linked, whereby the system enables selective reusability of an object container and the objects it contains.

23. The application development system of claim 22 wherein the first, second, third and fourth objects are Elements.

24. The application development system of claim 22 wherein the first and second objects are Elements, and the third object is a Modifier, and wherein the second object attains the third set of characteristics while the second and third objects remain linked.

25. The application development system of claim 22 wherein the first object is an Element, the second object is a Behavior and the third object is a Modifier, and wherein the first object attains the second and third sets of characteristics while the first, second and third objects remain linked.

26. The application development system of claim 22 wherein the first and second objects are Behaviors, and the third object is a Modifier, and wherein the first object attains the second and third sets of characteristics while the first, second and third objects remain linked.

27. An application development system comprising:

(a) a plurality of object classes from which one or more objects can be instantiated, each class defining a set of characteristics inherent to each object in that class; and (b) an instantiation mechanism that enables a first object having a first set of characteristics to be instantiated from the plurality of object classes, and further enables a second object having a second set of characteristics to be instantiated from the plurality of object classes, and further enables a third object having a third set of characteristics to be instantiated from the plurality of object classes; and (c) a hierarchical linking mechanism that enables creation of:

(i) a first object container by linking the first object to the second object, wherein the first object provides an environmental frame of reference for the second object while the first and second objects remain linked; and (ii) a second object container, replacing the first object with the third object, by breaking the link between the second object and the first object, and establishing a corresponding link between the second object and the third object, such that the third object provides an environmental frame of reference for the second object while the objects remain linked, whereby the system enables selection of a new object container for an object.

28. The application development system of claim 27 wherein the first, second and third objects are Elements.

29. The application development system of claim 27 wherein each of the first and third objects is either an Element or Behavior, and the second object is either a Behavior or Modifier.

30. The application development system of claim 27 wherein the dynamic object configuration and hierarchical linking mechanism allows configuration of the second object such that the replacement of the first object with the third object occurs dynamically, at runtime, upon the occurrence of a specified condition.

31. The application development system of claim 27 wherein the hierarchical linking mechanism further includes a touch-up mechanism that, upon the replacement of the first object with the third object, automatically identifies and resolves dependencies of the first, second and third objects.

32. The application development system of claim 31 wherein the dependencies include a current position of the first and third objects.

33. The application development system of claim 31 wherein the dependencies include a Variable accessed by the second object.

34. The application development system of claim 31 wherein the dependencies include a message to which the second object responds.

35. The application development system of claim 31 wherein:

(a) the dependencies include a first asset constituting a dependency of the second object and a second asset constituting a dependency of the third object, the system referencing each of the first and second assets both by a name and by a unique identifier; and (b) the touch-up mechanism, upon the replacement of the first object with the third object, resolves name and unique identifier conflicts by:

(i) replacing the unique identifier of the first asset with the unique identifier of the second asset, if the name of the first and second assets are equivalent; and (ii) assigning a new unique identifier to the first asset if the unique identifiers, but not the names, of the first and second assets are equivalent.

36. An application development system comprising:

(a) a plurality of object classes from which one or more objects can be instantiated, each class defining a set of characteristics inherent to each object in that class;

(b) an instantiation mechanism that enables a first object, a second object and a third object to be instantiated from the plurality of object classes; and (c) a hierarchical linking mechanism that enables creation of:

(i) a first object container, by linking the first object to the second object, wherein the first object provides an environmental frame of reference for the second object while the first and second objects remain linked; and (ii) a first object hierarchy within the first object container, by linking the second object to the third object, thereby creating a second object container wherein the second object provides an environmental frame of reference for the third object while the second and third objects remain linked; and (d) a Hierarchical Message Broadcasting mechanism that broadcasts a message sent to the first object container to the second and third objects included within the first object hierarchy, whereby the system enables the broadcasting of messages within an object hierarchy.

37. The application development system of claim 36 wherein:
  (a) the instantiation mechanism further enables a fourth object to be instantiated from the plurality of object classes;
  (b) the hierarchical linking mechanism further enables linking of the first object to the fourth object, wherein the first object provides an environmental frame of reference for the fourth object while the first and fourth objects remain linked;
  (c) the system further comprises an object configuration and messaging mechanism that enables the third object to be configured to send a message to a runtime object container that contains the third object when the message is sent at runtime; and
  (d) if the first object is a runtime object container of both the third and fourth objects, the message sent by the third object to the first object will be broadcast to the fourth object by the Hierarchical Message Broadcasting mechanism,
whereby an object can be configured to send a message to another object by relatively targeting the lowest common ancestor of the two objects.

38. The application development system of claim 36 further comprising an object configuration and messaging mechanism that enables an object to be configured to send a message to a specified destination Element and limit its broadcasting, via the Hierarchical Message Broadcasting mechanism, such that the message will not cascade to any Elements contained within the destination Element.

39. The application development system of claim 36 further comprising an object configuration and messaging mechanism that enables an object to be configured to send a message to a specified destination object and limit its broadcasting, via the Hierarchical Message Broadcasting mechanism, such that the message will not be relayed beyond the first object configured to respond to the message.

40. An application development system comprising:
  (a) a plurality of object classes from which one or more objects can be instantiated, each class defining a set of characteristics inherent to each object in that class;
  (b) an instantiatiOn mechanism that enables a first object and a second object to be instantiated from the plurality of object classes;
  (c) a hierarchical linking mechanism that enables creation of an object container by linking the first object to the second object, wherein the first object provides an environmental frame of reference for the second object while the first and second objects remain linked; and
  (d) an object configuration and messaging mechanism that enables configuration of the second object to send a message to a runtime object container that contains the second object when the message is sent at runtime,
whereby the system enables the relative targeting of message destinations.

41. An application development system comprising:
  (a) a first class of Element objects from which one or more Elements can be instantiated, the first class defining a first set of characteristics inherent to each Element in the first class;
  (b) a second class of Modifier objects from which one or more Modifiers can be instantiated, the second class defining a second set of characteristics inherent to each Modifier in the second class;
  (c) an instantiation mechanism that enables a first Element to be instantiated from the first class, and further enables a first Modifier to be instantiated from the second class;
  (d) a hierarchical linking mechanism that enables the first Element to be linked to the first Modifier, the first Element attaining the second set of characteristics while the first Element and the first Modifier remain linked; and
  (e) a component API that enables:
    (i) creation of a third class of Modifier objects, the third class defining a third set of characteristics inherent to each Modifier in the third class; and
    (ii) integration of the third class of Modifiers into the system such that the instantiation mechanism can be used to instantiate a second Modifier from the third class, and the hierarchical linking mechanism can be used to link the first Element to the second Modifier, wherein the first Element attains the third set of characteristics while the first Element and second Modifier remain linked,
whereby the system's component API enables the functionality of the system to be extended.

42. The application development system of claim 41 wherein the third class is a subclass of the second class.

43. The application development system of claim 41 wherein:
  (a) the system further comprises a fourth class of Modifier objects from which one or more Modifiers can be instantiated, the fourth class constituting a subclass of the second class and inheriting at least some of the second set of characteristics, and defining a fourth set of characteristics inherent to each Modifier in the fourth class; and
  (b) the component API further enables:
    (i) addition of one or more methods or data structures to the second class, via the component API, without access to or recompilation of source code defining the second class, thereby defining a supplemental set of characteristics, in addition to the second set of characteristics, inherent to each Modifier in the modified second class; and
    (ii) integration of the modified second class of Modifiers into the system such that the instantiation mechanism can be used to instantiate a third Modifier from the fourth class, and the hierarchical linking mechanism can be used to link the first Element to the third Modifier, wherein the first Element attains the supplemental set of characteristics, in addition to the fourth set of characteristics, while the first Element and third Modifier remain linked,
whereby the system's component API enables the functionality of an existing superclass of the system to be extended.

44. An application development system comprising:
  (a) a first class of Element objects from which one or more Elements can be instantiated, the first class defining a first set of characteristics inherent to each Element in the first class;
  (b) an instantiation mechanism that enables a first Element to be instantiated from the first class; and
  (c) a media linking mechanism that enables:
    (i) linking of the first Element to a first media item having a first media data type, such that the first Element will take on the appearance of the first media item during runtime while the first Element and first media item are linked;
    (ii) breaking of the link between the first Element and the first media item; and
    (iii) linking of the first Element to a second media item having a second media data type, such that the first Element will take on the appearance of the second media item during runtime while the first Element and second media item are linked, whereby the system enables an Element to be morphed among different media data types.

45. The application development system of claim 44 wherein the media linking mechanism further comprises an object configuration and dynamic linking mechanism that enables configuration of the first Element such that the system dynamically, upon the occurrence of a specified runtime condition, breaks the link between the first Element and the first media item and establishes a link between the first Element and the second media item.

46. An application development system comprising:

(a) a first class of Element objects from which one or more Elements can be instantiated, the first class defining a first set of characteristics inherent to each Element in the first class;

(b) a second class of Element objects from which one or more Elements can be instantiated, the second class defining a second set of characteristics inherent to each Element in the second class;

(c) a third class of Variable Modifier objects from which one or more Variables can be instantiated, the third class defining a third set of characteristics inherent to each Variable in the third class, the third set of characteristics including the ability to store data on behalf of an Element;

(d) an instantiation mechanism that enables a first Element to be instantiated from the first class, and further enables a second Element to be instantiated from the second class, and further enables a first Variable to be instantiated from the third class;

(e) an alias mechanism that enables creation of an alias of the first Variable having a first value, from which aliased copies of the first Variable can be made; and (f) a hierarchical linking mechanism that enables the first Element to be linked to a first aliased copy of the first Variable, and to link the second Element to a second aliased copy of the first Variable, such that the first aliased copy of the first Variable stores the first value on behalf of the first Element, and the second aliased copy of the first Variable stores the first value on behalf of the second Element;

(g) wherein the alias mechanism causes any change at runtime to the first value stored by the first aliased copy of the first Variable to be reflected dynamically in the second aliased copy of the first Variable, such that the first and second aliased copies of the first Variable store the same value at any give time during runtime, whereby the system provides dynamically aliased Variables.

47. An application development system comprising:

(a) a first class of Element objects from which one or more Elements can be instantiated, the first class defining a first set of characteristics inherent to each Element in the first class;

(b) an instantiation mechanism that enables a first Element to be instantiated from the first class;

(c) a media linking mechanism that enables the first Element be linked to a first media item having a cel-based animation data format, such that the Element will take on the appearance of the cels of the first media item at a specified animation rate during runtime; and (d) an object configuration and animation range selection mechanism that enables the first Element to be configured to play a specified range of cels of the first media item during runtime upon the occurrence of a specified condition, whereby the system enables dynamic changes to a portion of an animation that is played during runtime upon the occurrence of a specified condition.

48. An application development system comprising:

(a) a plurality of object classes from which one or more objects can be instantiated, each class defining a set of characteristics inherent to each object in that class;

(b) an instantiation mechanism that enables a first object, a second object, a third object, a fourth object and a fifth object to be instantiated from the plurality of object classes; and (c) a hierarchical linking mechanism that enables creation of:

(i) a first object container in a first application, by linking the first object to the second object, wherein the first object provides an environmental frame of reference for the second object while the first and second objects remain linked;

(ii) a first object hierarchy within the first object container, by linking the second object to the third object, thereby creating a second object container wherein the second object provides an environmental frame of reference for the third object while the second and third objects remain linked; and (iii) a third object container in a second application, by linking the fourth object to the fifth object, wherein the fourth object provides an environmental frame of reference for the fifth object while the fourth and fifth objects remain linked; and (c) an object library mechanism that enables copying of:

(i) the second object container from the first application into a first object library upon breaking the link between the first and second objects; and (ii) the second object container from the first object library into the second application, and linking of the fourth object using the hierarchical linking mechanism, wherein the fourth object provides an environmental frame of reference for the second object container while the second, third and fourth objects remain linked, whereby the system enables selective reusability of object containers across applications.

* * * * *